US012669913B2

(12) United States Patent
Joung

(10) Patent No.: US 12,669,913 B2
(45) Date of Patent: Jun. 30, 2026

(54) SERVER FOR GUIDING ACCOMPLISHMENT OF PERSONAL DREAMS, AND OPERATING METHOD THEREFOR

(71) Applicant: Joo Young Joung, Daejeon (KR)

(72) Inventor: Joo Young Joung, Daejeon (KR)

( * ) Notice: Subject to any disclaimer, the term of this patent is extended or adjusted under 35 U.S.C. 154(b) by 283 days.

(21) Appl. No.: 18/284,819

(22) PCT Filed: Mar. 29, 2022

(86) PCT No.: PCT/KR2022/004460
§ 371 (c)(1),
(2) Date: Sep. 28, 2023

(87) PCT Pub. No.: WO2022/211468
PCT Pub. Date: Oct. 6, 2022

(65) Prior Publication Data
US 2024/0184429 A1 Jun. 6, 2024

(30) Foreign Application Priority Data

Mar. 29, 2021 (KR) ........................ 10-2021-0040726

(51) Int. Cl.
| | |
|---|---|
| *G06F 3/0484* | (2022.01) |
| *G06F 3/04817* | (2022.01) |
| *G06F 3/0482* | (2013.01) |
| *G06F 16/54* | (2019.01) |
| *G06Q 10/40* | (2026.01) |

(52) U.S. Cl.
CPC ........ *G06F 3/0484* (2013.01); *G06F 3/04817* (2013.01); *G06F 3/0482* (2013.01); *G06F 16/54* (2019.01); *G06Q 10/40* (2026.01)

(58) Field of Classification Search
CPC .... G06F 16/54; G06F 3/0484; G06F 3/04817; G06F 3/0482; G06F 16/58; G06F 16/50; G06F 16/55; G06Q 50/01; G06Q 10/40
See application file for complete search history.

(56) References Cited

U.S. PATENT DOCUMENTS

| | | | |
|---|---|---|---|
| 7,325,198 B2 * | 1/2008 | Adcock ................... | G06F 16/54 |
| | | | 715/722 |
| 2007/0011152 A1 * | 1/2007 | Ikezawa ................... | G06F 16/58 |
| 2014/0071160 A1 * | 3/2014 | Sugiura ................... | G06T 11/60 |
| | | | 345/619 |
| 2016/0246880 A1 * | 8/2016 | Battiah ................... | G09B 5/02 |

(Continued)

FOREIGN PATENT DOCUMENTS

| | | |
|---|---|---|
| JP | 2004-178260 A | 6/2004 |
| KR | 10-2012-0015619 A | 2/2012 |

(Continued)

*Primary Examiner* — Nicholas Ulrich
(74) *Attorney, Agent, or Firm* — Maschoff Brennan

(57) ABSTRACT

A server includes a memory and a processor configured to guide accomplishment of personal goals. The processor displays a role name and a modifier on a first area of a display. A number of cheers, goals, or posts are displayed on a second area located below the first area. A plurality of object areas representing images of the posts are displayed on a third area located below the second area according to a predetermined arrangement. Each object area corresponds to a specific date within a time period

13 Claims, 49 Drawing Sheets

(56) References Cited

U.S. PATENT DOCUMENTS

2016/0275436  A1*    9/2016   Kurjanowicz  ...  G06Q 10/06398
2016/0291811  A1*   10/2016   Bastide  .................. G06Q 50/01

FOREIGN PATENT DOCUMENTS

KR      10-2013-0094469  A      8/2013
KR      10-2015-0030331  A      3/2015
WO          2008/099441  A1     8/2008

* cited by examiner

FIG. 2B

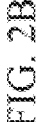

211

212

221

9:41

< DREAM FUNDING +

PLEDGE ACHIEVEMENT RATE 90% | PLEDGE RELIABILITY AAA | COMMUNICATION GOOD

CLOUD FUND 3 NFT ISSUANCE 3

| FUNDING LIST | STATE |

I WANT TO EXHIBIT AT AN ARCHITECTURE FAIR. — 33 DAYS LEFT

I WANT TO READ AND ANALYZE ARCHITECTURE BOOKS — FUNDING COMPLETED ACHIEVING PLEDGES

I WANT TO GO ON A FIELD TRIP TO AN ARCHITECTURE FAIR. — FUNDING COMPLETED FAILED PROMISE

D-life FEED CERTIFICATION PROFILE

9:41

< DREAM FUNDING +

PLEDGE ACHIEVEMENT RATE 90% | PLEDGE RELIABILITY AAA | COMMUNICATION GOOD

CLOUD FUND 3 NFT ISSUANCE 3

| FUNDING LIST | STATE |

HOMEPAGE ARCHITECTURAL MODEL PHOTO COLLECTION — 11 DAYS LEFT

NATURE-FRIENDLY ARCHITECTURE PANORAMIC VIEW — SUCCESSFUL BID

CONCERT R SEAT FREE PASS (UNLIMITED) — SUCCESSFUL BID

D-life FEED CERTIFICATION PROFILE

Figure 3C:
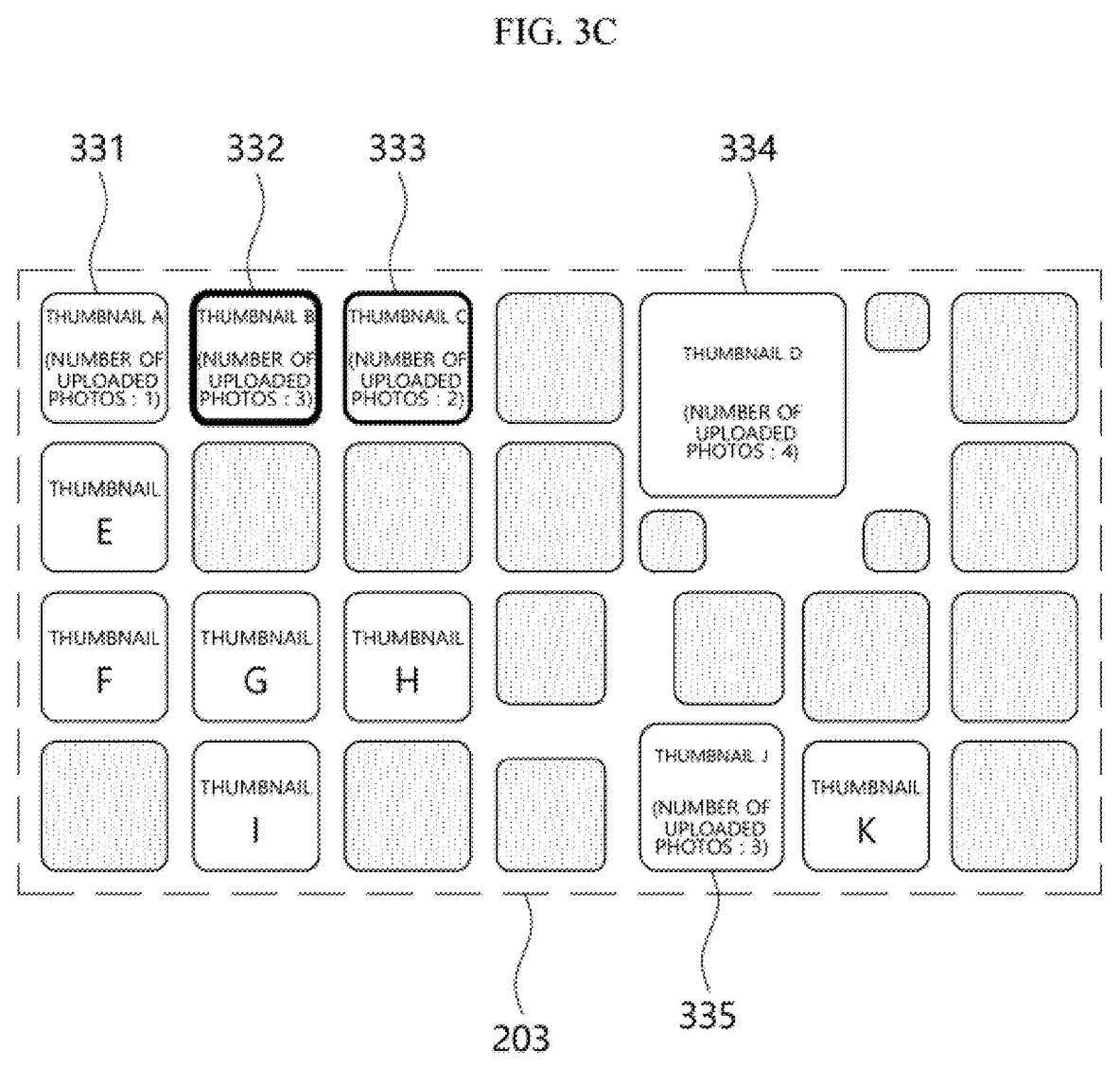

331
THUMBNAIL A
(NUMBER OF UPLOADED PHOTOS : 1)

332
THUMBNAIL B
(NUMBER OF UPLOADED PHOTOS : 3)

333
THUMBNAIL C
(NUMBER OF UPLOADED PHOTOS : 2)

334
THUMBNAIL D
(NUMBER OF UPLOADED PHOTOS : 4)

THUMBNAIL E

THUMBNAIL F

THUMBNAIL G

THUMBNAIL H

THUMBNAIL I

THUMBNAIL J
(NUMBER OF UPLOADED PHOTOS : 3)
335

THUMBNAIL K

Figure 4:
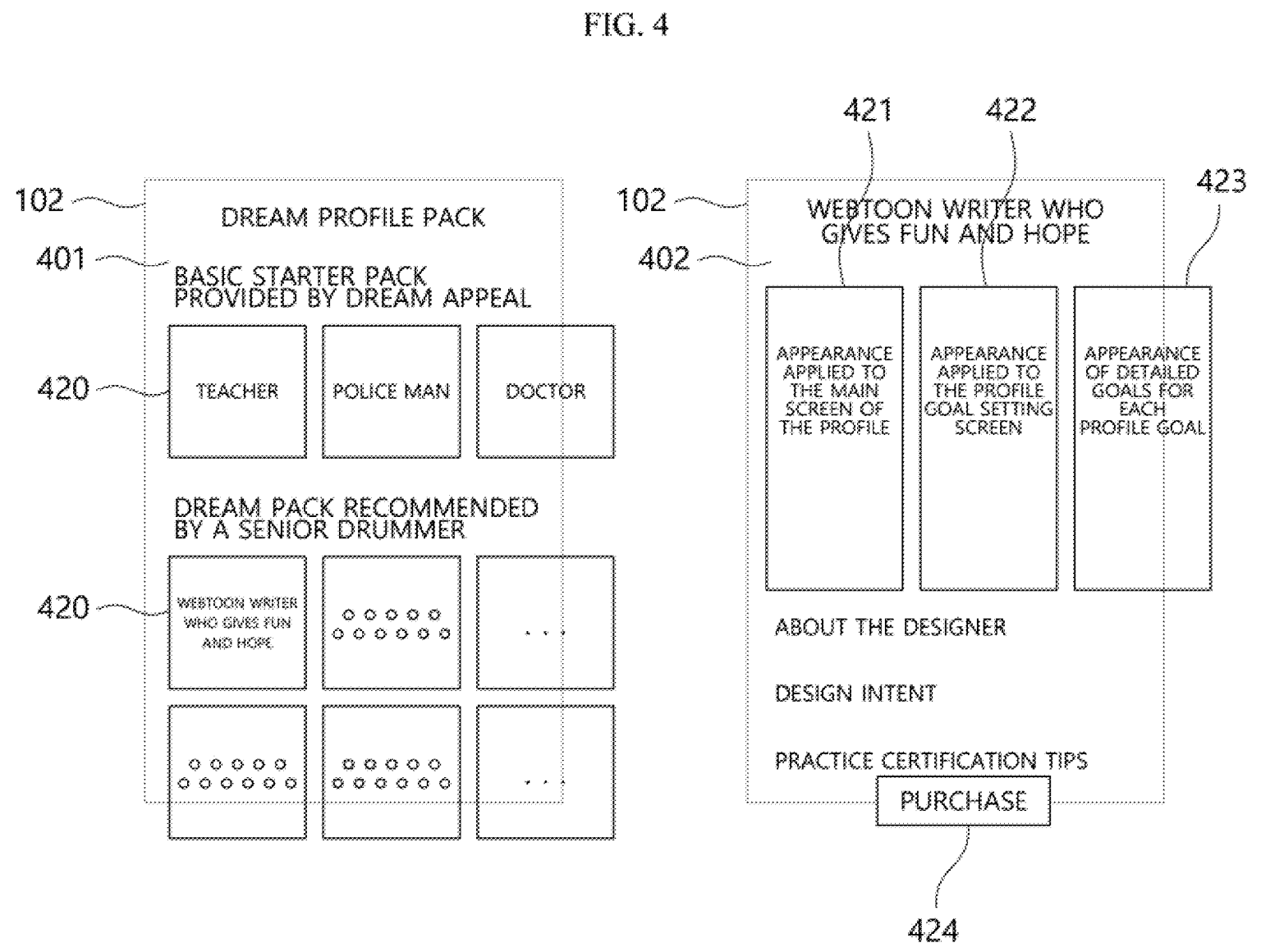

WEBTOON WRITER WHO
GIVES FUN AND HOPE

422

421

APPEARANCE
APPLIED TO
THE MAIN
SCREEN OF
THE PROFILE

APPEARANCE
APPLIED TO
THE PROFILE
GOAL SETTING
SCREEN

APPEARANCE
OF DETAILED
GOALS FOR
EACH
PROFILE GOAL

ABOUT THE DESIGNER

DESIGN INTENT

PRACTICE CERTIFICATION TIPS

PURCHASE

424

102

402

DREAM PROFILE PACK

BASIC STARTER PACK
PROVIDED BY DREAM APPEAL

TEACHER

POLICE MAN

DOCTOR

DREAM PACK RECOMMENDED
BY A SENIOR DRUMMER

WEBTOON WRITER
WHO GIVES FUN
AND HOPE

9:41 dream appeal

Figure 5B:
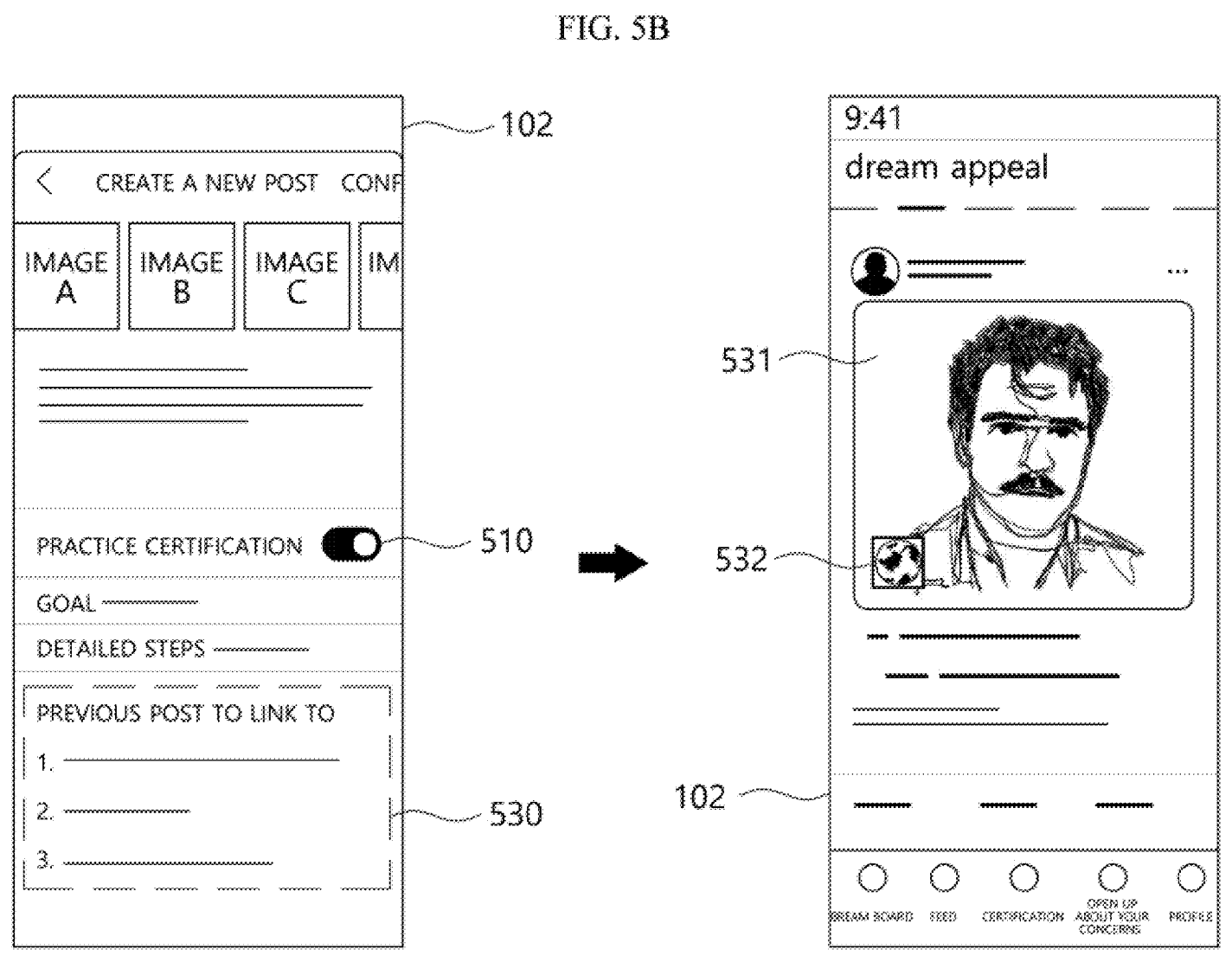

531

532

102

102

510

530

CREATE A NEW POST    CONF

IMAGE A    IMAGE B    IMAGE C    IM

PRACTICE CERTIFICATION

GOAL

DETAILED STEPS

PREVIOUS POST TO LINK TO

1.

2.

3.

DREAM BOARD    FEED    CERTIFICATION    OPEN UP ABOUT YOUR CONCERNS    PROFILE 610    102

Figure 8C:
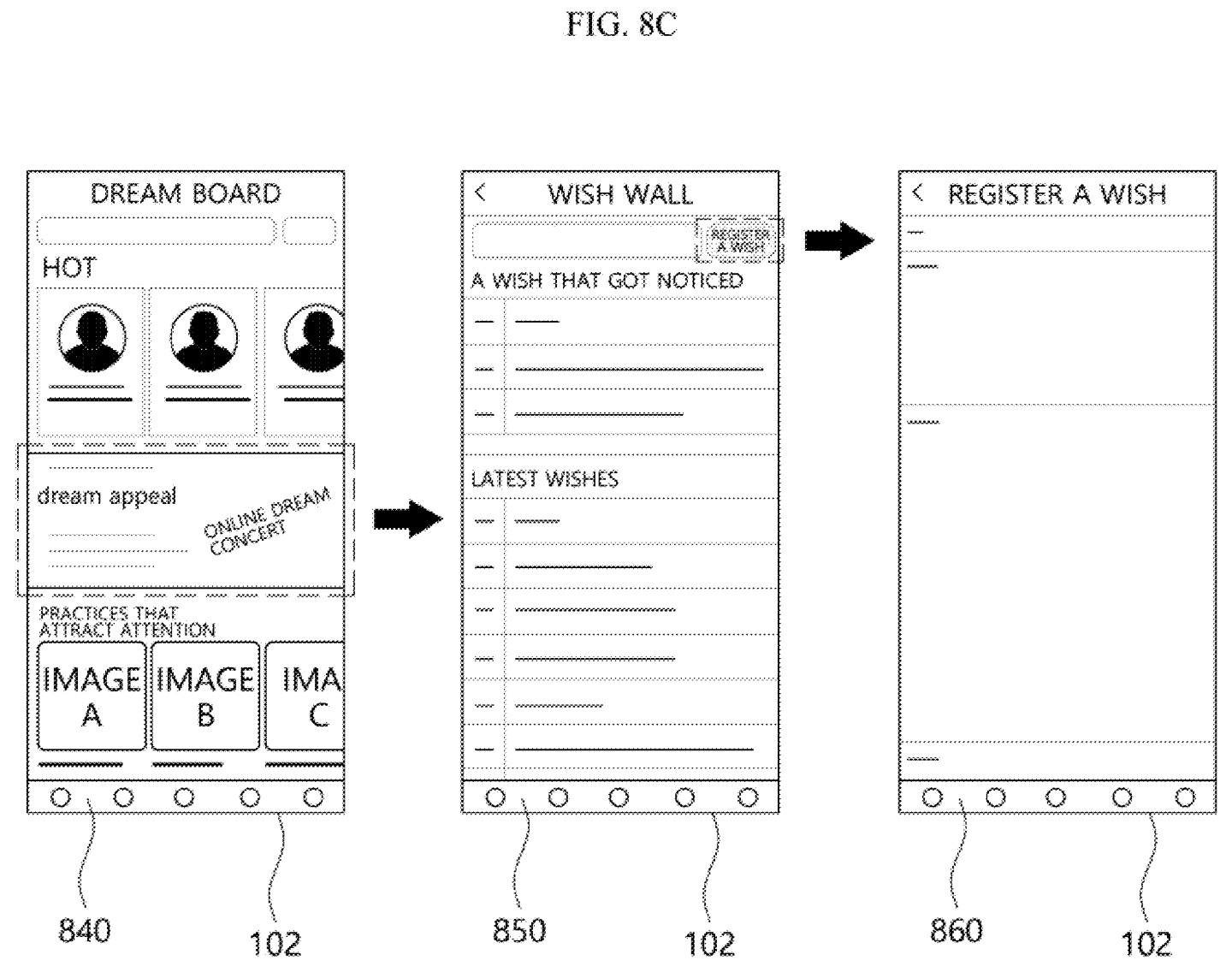

DREAM BOARD

HOT dream appeal

ONLINE DREAM CONCERT

PRACTICES THAT ATTRACT ATTENTION

IMAGE A

IMAGE B

IMA C

840

102

WISH WALL

A WISH THAT GOT NOTICED

LATEST WISHES

850

102

REGISTER A WISH

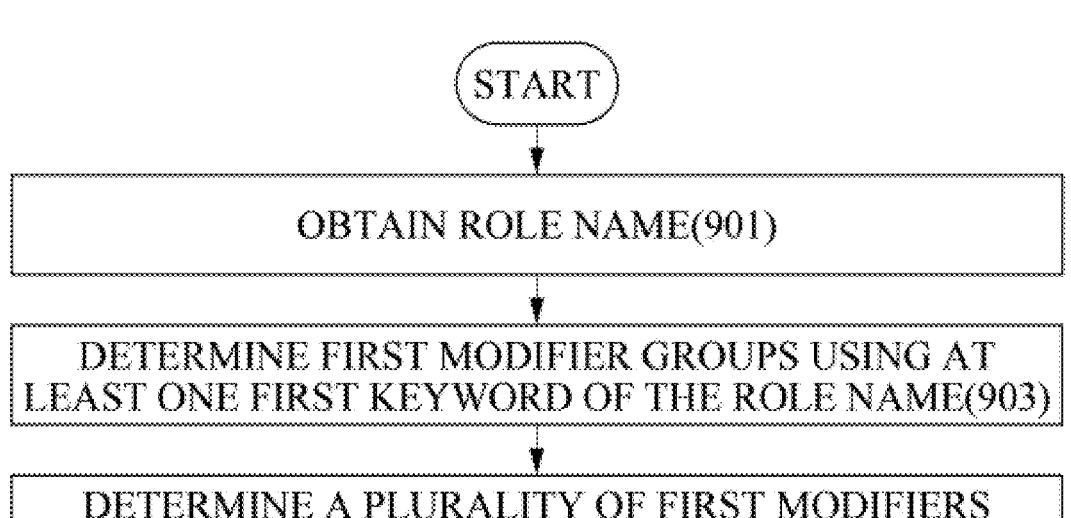

START

OBTAIN ROLE NAME(901)

DETERMINE FIRST MODIFIER GROUPS USING AT
LEAST ONE FIRST KEYWORD OF THE ROLE NAME(903)

DETERMINE A PLURALITY OF FIRST MODIFIERS
CORRESPONDING TO EACH OF THE FIRST MODIFIER
GROUPS BASED ON AGE INFORMATION AND GENDER
INFORMATION OF THE USER ACCOUNT
CORRESPONDING TO THE USER DEVICE(905)

SENDING A PLURALITY OF FIRST
MODIFIERS TO THE USER DEVICE(907)

END

Figure 10A:
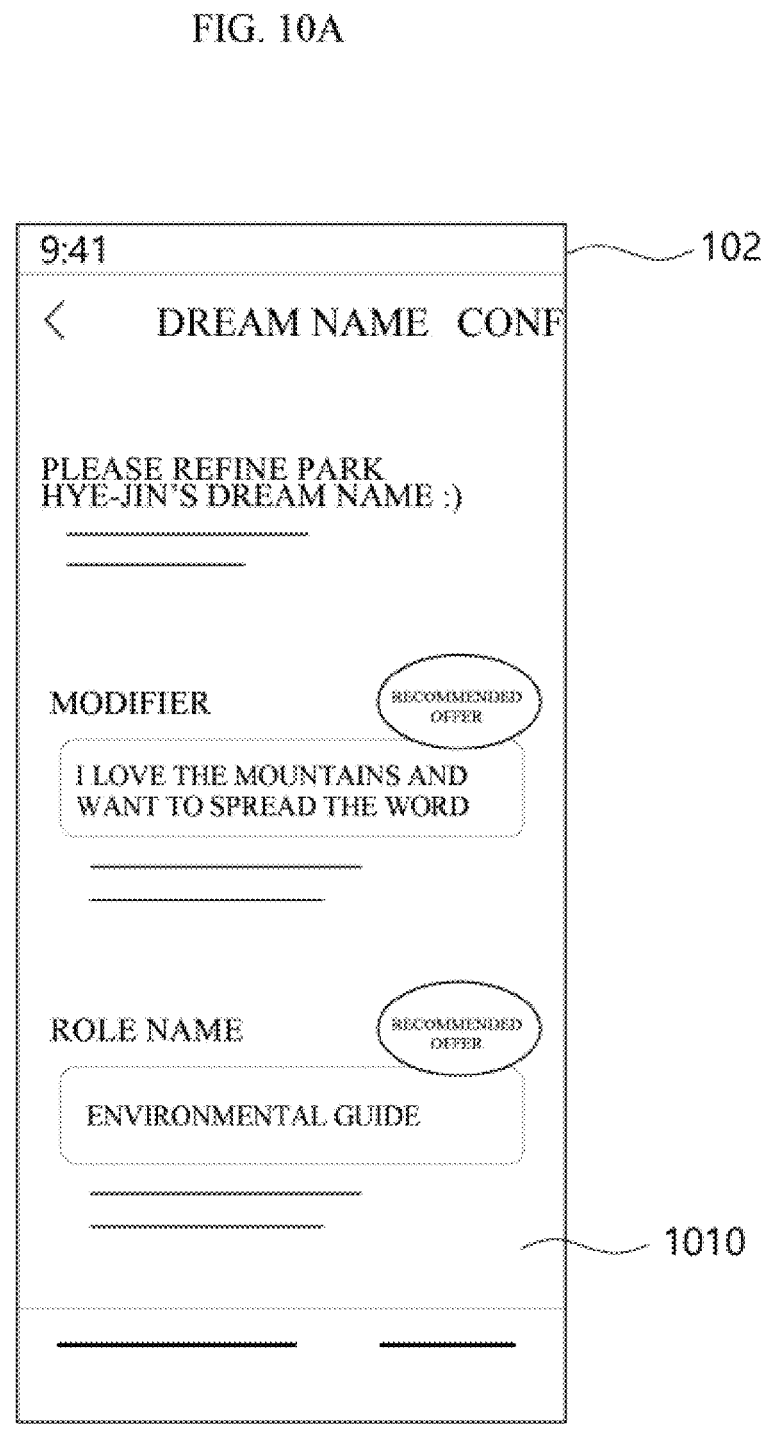

<     DREAM NAME CONF

PLEASE REFINE PARK
HYE-JIN'S DREAM NAME :)

MODIFIER    RECOMMENDED OFFER

I LOVE THE MOUNTAINS AND
WANT TO SPREAD THE WORD

ROLE NAME    RECOMMENDED OFFER

ENVIRONMENTAL GUIDE

CUSTOMIZED MODIFIER RECOMMENDATIONS    CONF

CHOOSE THE MODIFIER YOU LIKE      ~ 102

ENVIRONMENTAL GUIDE CUSTOM MODIFIER

| | | | |
|---|---|---|---|
| LOVING | WIDELY KNOWN | LEADING THE WAY IN PROTECTING NATURE | KIND |

POPULAR MODIFIERS THESE DAYS

| | | | |
|---|---|---|---|
| KIND | HELPING THE WEAK | REALIZING JUSTICE | CONFIDENT |

SOCIAL UNIVERSAL SERIES MODIFIER

| | | | |
|---|---|---|---|
| WORLD PEACE | EQUAL | ENVIRONMENTAL PROTECTION | RIGHTEOUS |

ACHIEVEMENT SERIES MODIFIER

| | | | |
|---|---|---|---|
| INFLUENTIAL | RECOGNIZED | SUCCESSFUL | CAPABLE |

GROWTH SERIES MODIFIER

| | | | |
|---|---|---|---|
| WISE | FREE | HIGHLY CREATIVE | ALWAYS TRYING |

1020 ~ MODIFIER THAT FOCUSES ON THE STYLE OF COMMUNICATION TO OTHERS

| | | | |
|---|---|---|---|
| GIVING PLEASURE | GIVING FAITH | CONVEYED IN AN EASY-TO-UNDERSTAND MANNER | GIVES HAPPINESS |

POPULAR MODIFIERS FOR MEN AGED 17-19

| | | | |
|---|---|---|---|
| A RICH MAN WHO GIVES A LOT | REALIZING JUSTICE | ARRESTED ALONE | LOVED BY FANS |

FIG. 10C

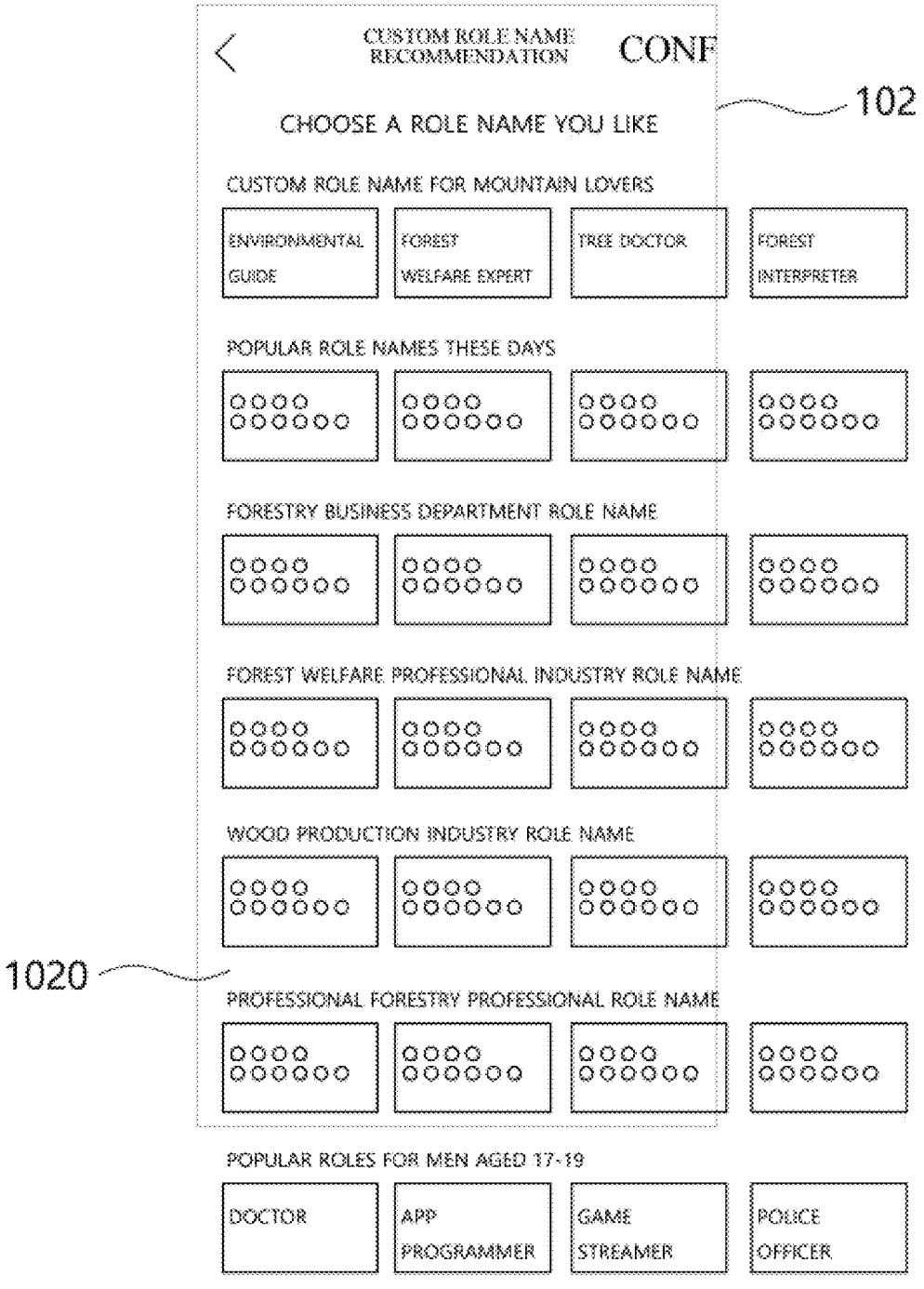

102

1020

CUSTOM ROLE NAME RECOMMENDATION    CONF

CHOOSE A ROLE NAME YOU LIKE

CUSTOM ROLE NAME FOR MOUNTAIN LOVERS

| ENVIRONMENTAL GUIDE | FOREST WELFARE EXPERT | TREE DOCTOR | FOREST INTERPRETER |

POPULAR ROLE NAMES THESE DAYS

FORESTRY BUSINESS DEPARTMENT ROLE NAME

FOREST WELFARE PROFESSIONAL INDUSTRY ROLE NAME

WOOD PRODUCTION INDUSTRY ROLE NAME

PROFESSIONAL FORESTRY PROFESSIONAL ROLE NAME

POPULAR ROLES FOR MEN AGED 17-19

| DOCTOR | APP PROGRAMMER | GAME STREAMER | POLICE OFFICER |

Figure 11A:
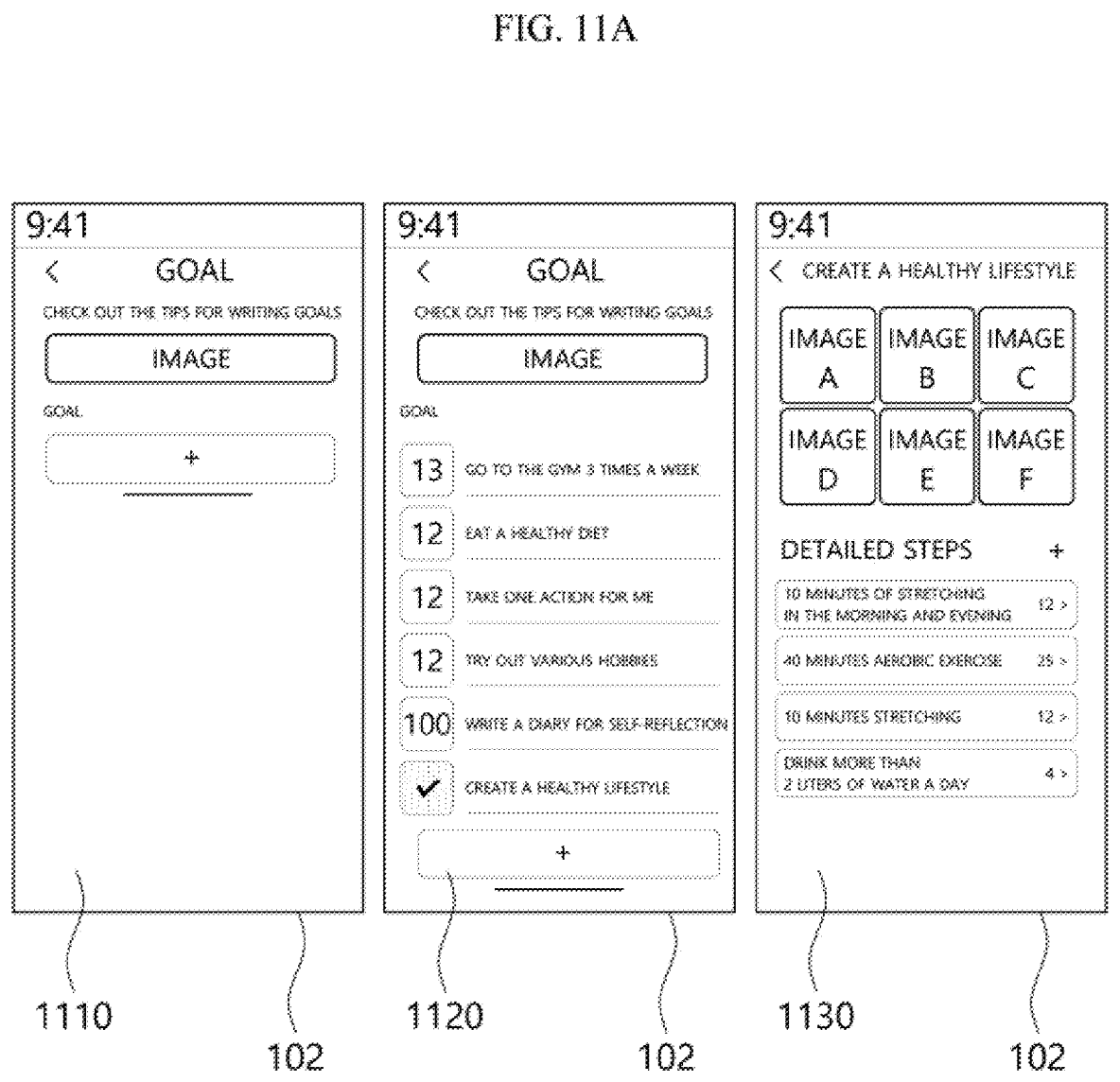

< GOAL

CHECK OUT THE TIPS FOR WRITING GOALS

IMAGE

GOAL

+

1110

102

9:41

< GOAL

CHECK OUT THE TIPS FOR WRITING GOALS

IMAGE

GOAL

13 GO TO THE GYM 3 TIMES A WEEK

12 EAT A HEALTHY DIET

12 TAKE TIME ACTION FOR ME

12 TRY OUT VARIOUS HOBBIES

100 WRITE A DIARY FOR SELF-REFLECTION

✓ CREATE A HEALTHY LIFESTYLE

+

1120

102

9:41

< CREATE A HEALTHY LIFESTYLE

IMAGE
A

IMAGE
B

IMAGE
C

IMAGE
D

IMAGE
E

IMAGE
F

DETAILED STEPS +

10 MINUTES OF STRETCHING
IN THE MORNING AND EVENING 12 >

40 MINUTES AEROBIC EXERCISE 25 >

10 MINUTES STRETCHING 12 >

DRINK MORE THAN
2 LITERS OF WATER A DAY 4 >

RECEIVE MODIFIER AND ROLE
NAME FROM USER DEVICE(1301)

DETERMINE A PLURALITY OF FIRST PRACTICE GOALS
BASED ON AT LEAST ONE KEYWORD OF THE MODIFIER(1303)

BASED ON THE TOTAL NUMBER OF ACTIONS,
THE TOTAL NUMBER OF IMAGES, AND THE TOTAL
NUMBER OF GOALS OF THE USER ACCOUNT, DETERMINE
AT LEAST ONE FIRST ACTION GOAL AMONG
THE PLURALITY OF FIRST ACTION GOALS(1305)

DETERMINE A PLURALITY OF ACTION GOAL GROUPS
BASED ON THE ROLE NAME AND ACTION GOAL
REGISTERED IN THE USER ACCOUNT.(1307)

BASED ON THE NUMBER OF ACTIONS AND THE NUMBER
OF IMAGES FOR THE REGISTERED PRACTICE GOALS,
DETERMINE AT LEAST ONE SECOND PRACTICE
GOAL CORRESPONDING TO EACH OF THE PLURALITY
OF PRACTICE GOAL GROUPS(1309)

SENDING AT LEAST ONE FIRST ACTION GOAL AND AT LEAST
ONE SECOND ACTION GOAL TO THE USER DEVICE(1311)

FIG. 17

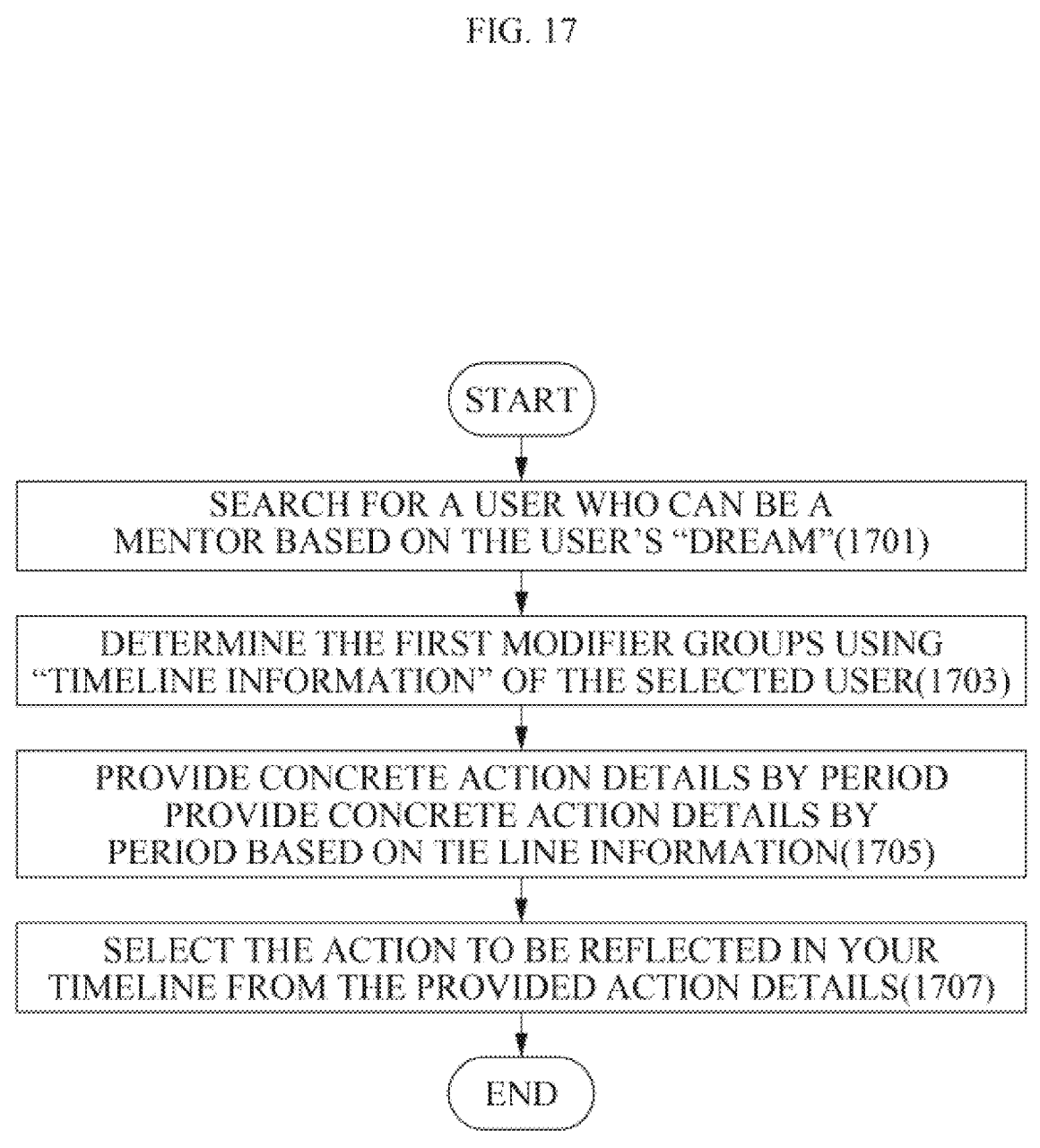

START

SEARCH FOR A USER WHO CAN BE A
MENTOR BASED ON THE USER'S "DREAM"(1701)

DETERMINE THE FIRST MODIFIER GROUPS USING
"TIMELINE INFORMATION" OF THE SELECTED USER(1703)

PROVIDE CONCRETE ACTION DETAILS BY PERIOD
PROVIDE CONCRETE ACTION DETAILS BY
PERIOD BASED ON TIE LINE INFORMATION(1705)

SELECT THE ACTION TO BE REFLECTED IN YOUR
TIMELINE FROM THE PROVIDED ACTION DETAILS(1707)

END

JOB
RECOMMENDATION

JOB
RECOMMENDATION
ALGORITHM(1830)

THE DREAM THAT SUITS XXX IS

| JOB 1 | JOB 4 |
| JOB 2 | JOB 5 |
| JOB 3 | JOB 6 |
| VIEW MORE RECOMMENDED JOBS | WRITE YOUR OWN JOB |

1825

1820

SURVEY

DREAM POWER TEST

PSYCHOLOGICAL TEST

APTITUDE TEST

TENDENCY INFORMATION

PRACTICE GOAL

ABILITIES

AREAS OF INTEREST

DREAM INFORMATION OF THE AUTHOR OF THE POST THAT WAS SUPPORTED

DREAM INFORMATION OF USERS REGISTERED AS FRIENDS

KEYWORDS IN DAILY POSTS POSTED BY YOURSELF

KEYWORD INFORMATION

DREAM PIONEER
MODE

2715

2710

102

YOU ARE A DREAM PIONEER
EMBARKING ON A JOURNEY

TO FIND YOUR DREAMS

WE HOPE THAT THROUGH THE
DREAM APPEAL, YOU WILL BE
ABLE TO SEE PEOPLE

APPROACHING VARIOUS DREAMS,

EXPERIENCE VARIOUS DREAMS,
AND PIONEER THE DREAM
YOU WANT.

2720

BASE INFORMATION

EX. MAJOR LEAGUE PITCHER THROWING A FASTBALL

FIG. 35

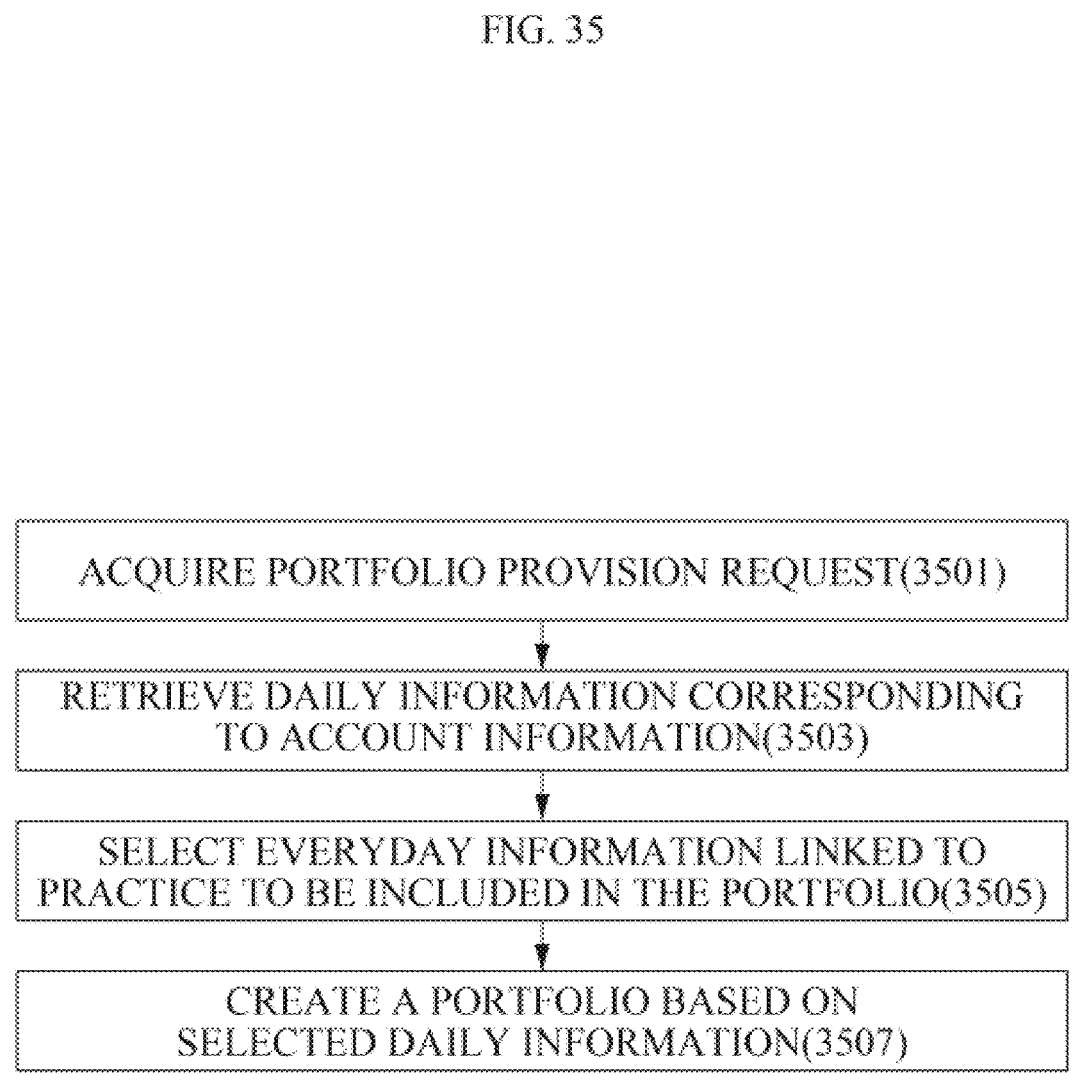

```
┌─────────────────────────────────────────────────────┐
│     ACQUIRE PORTFOLIO PROVISION REQUEST(3501)         │
└─────────────────────────────────────────────────────┘
                          ↓
┌─────────────────────────────────────────────────────┐
│   RETRIEVE DAILY INFORMATION CORRESPONDING            │
│       TO ACCOUNT INFORMATION(3503)                    │
└─────────────────────────────────────────────────────┘
                          ↓
┌─────────────────────────────────────────────────────┐
│     SELECT EVERYDAY INFORMATION LINKED TO             │
│  PRACTICE TO BE INCLUDED IN THE PORTFOLIO(3505)       │
└─────────────────────────────────────────────────────┘
                          ↓
┌─────────────────────────────────────────────────────┐
│       CREATE A PORTFOLIO BASED ON                     │
│     SELECTED DAILY INFORMATION(3507)                  │
└─────────────────────────────────────────────────────┘
```

SERVER FOR GUIDING ACCOMPLISHMENT OF PERSONAL DREAMS, AND OPERATING METHOD THEREFOR

TECHNICAL FIELD

The present disclosure relates to servers and methods for guiding individuals to fulfill their dreams, and more particularly, to various methods and servers for guiding individuals to reach their goals by allowing them to enter their dreams, and to act upon them, via an application associated with the server.

BACKGROUND ART

In general, people have dreams or aspirations, and they have a desire to strive or achieve to fulfill them. This is the characteristic that people are fundamentally goal-oriented and strive to achieve them. In the past, people could record their successes orally, in books, electromechanically, etc. to achieve their goals, or they could check the records of others and strive with their dreams or aspirations.

However, in the past, it was difficult to achieve the individual's dreams without the help of a specific technology for the effort or fulfillment of the individual's dreams or aspirations. In addition, in the past, there was no record of the achievement of the above efforts or desires in a clear time period such as a date, a period of time, and a method for clearly checking the achievement while listing them chronologically.

DISCLOSURE OF INVENTION

Technical Problem

Accordingly, to solve the above problems, the present disclosure provides a method and system for guiding an individual's dream goals and the execution thereof by providing a server for setting various goals and guiding the execution thereof, storing and chronologically publishing the execution of the goals, and further guiding the user's dreams by viewing the goals and execution of others.

Solution to Problem

In accordance with various embodiments, a server for processing a request received from a user device and transmitting the requested information to said user device comprises a memory, and a processor operatively coupled to said memory, said processor being operatively coupled to said user device: displaying on a first region of a display of said user device a first text indicating a role name of a user account corresponding to said user device and a second text indicating a modifier for said role name; displaying on a second region located at a bottom of said first region of said display at least one of a number of cheers earned for said user account, a number of goals set by said user account, or a number of posts for said goals, and being set to execute instructions to cause a plurality of object regions representing at least one image of said post to be displayed on a third region located at the bottom of said second region of said display in a predetermined arrangement, wherein each of said plurality of object regions may correspond to a respective date within a particular time period.

Advantageous Effects of Invention

The present disclosure has the advantage of enabling a display on a profile screen of a user's account provided by the server to show posts related to action goal recognition, so that the user can review how well he or she has been living his or her dreams over a recent period of time, and receive evaluations from other users, thereby encouraging the user to continue taking action toward his or her goals.

Furthermore, the present disclosure has the advantage of facilitating the user's method of creating a profile by displaying at least one recommended profile provided by the server and allowing the user to view or use it.

Furthermore, the present disclosure has the advantage that by displaying at least one post provided by the server to the user and confirming the user's performance thereon, the user can link actions to goals and further group them, thereby intuitively displaying related posts to other users.

Furthermore, the present disclosure has the advantage of guiding the user to make clear progress towards the goal by allowing the user to see the baseline of the goal through the display provided by the server or by viewing interviews of others who have succeeded or are working in the same field as the user's goal, to see the popular goals of various people, and to see what is specific to the user's goal and what is needed to achieve it by displaying personalized ads to the user.

Furthermore, the present disclosure provides the advantage that the server provides a formula for the user to create and set a goal, and that the user can modify the formula according to the user's desired direction, thereby guiding the user in setting the goal, but also modifying it as the goal changes.

Furthermore, the present disclosure has the advantage that a plurality of action goals can be set and changed on the server, and that the server can provide the user with a method of practicing the user's goal based on input, a method of practicing the user's goal that allows the user to grow physically and/or mentally independently of the goal, and the same method of practicing to a plurality of users so as to induce good faith competition among other users, thereby inducing physical and mental development of the plurality of users through goal refinement and health and good faith competition among other users.

Further, the present disclosure has the advantage that by setting action goals in a time series, action goals that need to be accomplished in the short term to fulfill a dream can be set separately from action goals that need to be accomplished in the medium to long term.

Furthermore, the present disclosure has the advantage that in order for the user to set appropriate action goals, the server or the user device can recommend action goals to the user in stages to fulfill the set dream, the server or the user device can recommend action goals to the user based on the dream power, and one or more action goals can be recommended to the user in the same way as above.

Furthermore, the present disclosure provides the advantage that the user device provided by the server can cause the user device to display a time series of changes in the configuration information (e.g., any one of the job title, role title, modifier, action goal, or ability) on the display, so that the user can easily view the changes and understand the history of the action goal.

Furthermore, the present disclosure has the advantage that the display can include a screen where the server recommends a job to the user, so that the user can easily identify a desired job and understand how to fulfill the goal.

Furthermore, the present disclosure has the advantage that the user device provided by the server can access an interface for materializing a goal, and in response to user input via at least one button, the user device displays a screen corresponding to the interface for materializing a dream, thereby providing goal guidance to a user who does not have a specific goal.

The present disclosure also has the advantage of utilizing information from other users and stored information to provide a roadmap for refining a user's goal setting by allowing the user to experience goals, abilities, and the like for a particular dream name and to experience an abbreviated version of the goals, abilities, and the like that need to be practiced to achieve the dream name.

BRIEF DESCRIPTION OF DRAWINGS

FIG. 2B illustrates a funding status screen for a particular user account provided by the server through the user device, according to various embodiments. FIGS. 3A, 3B, 3C, 3D, and 3E illustrate an action goal authentication area included in a profile screen of a user account provided by a server to a user device, according to various embodiments.

FIG. 4 is a diagram illustrating an embodiment of recommending a profile of a user account provided by a server to a user device, according to various embodiments.

FIG. 5B illustrates a method for linking between posts and an embodiment for displaying linked posts, according to various embodiments.

FIG. 8A, FIG. 8B, and FIG. 8C illustrate a second type of post display screen provided by a server to a user device, according to various embodiments.

FIGS. 9A and 9B are flow diagrams to illustrate methods of operation of a server and a user device, according to various embodiments.

FIGS. 10A and 10C are diagrams to illustrate methods of operation of a server and a user device, according to various embodiments.

FIGS. 11A and 11B illustrate an action goal setting screen for a user account provided by a server to a user device, according to various embodiments.

FIG. 13 is a flowchart to illustrate operations of a server and a user device, according to various embodiments.

FIG. 17 is a flowchart to illustrate how a server and a user device may operate, according to various embodiments.

FIG. 18 illustrates a job recommendation screen of a user account provided by a server to a user device, according to various embodiments.

FIGS. 25 and 26 illustrate a dream materialization screen provided by a server to a user device, according to various embodiments.

FIG. 35 is a flow diagram to illustrate how the server and user devices operate, according to various embodiments.

BEST MODE FOR CARRYING OUT THE INVENTION

Figure 1:
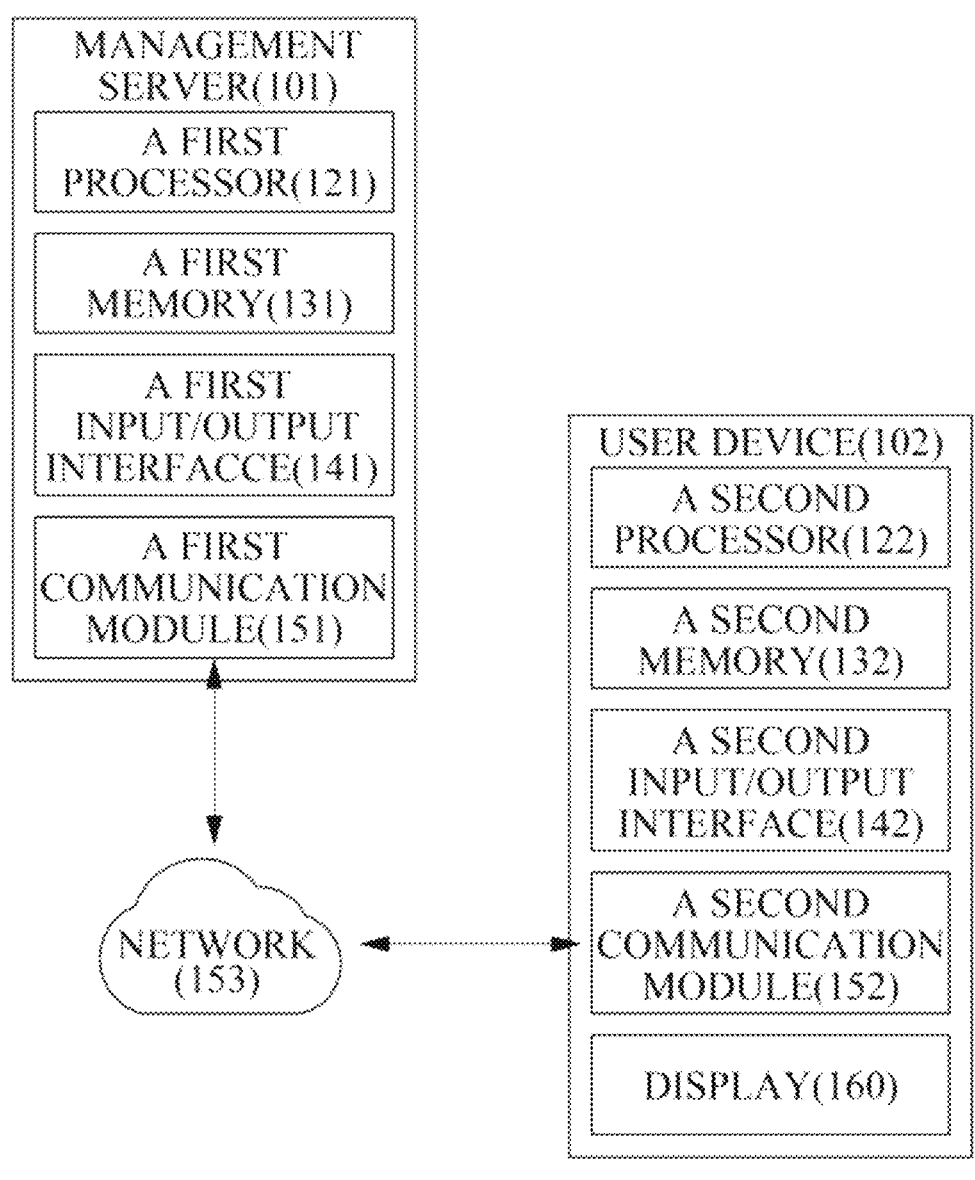
FIG. 1 illustrates a block diagram of a management server and a user device, according to various embodiments.

FIG. 1 is a block diagram of a management server and a user device, according to various embodiments.

Hereinafter, various embodiments of the present disclosure are described with reference to the accompanying drawings. Embodiments and the terms used therein are not intended to limit the technology described herein to any particular embodiment, and should be understood to include various modifications, equivalents, and/or substitutions of such embodiments. With respect to the description in the drawings, similar reference numerals may be used for similar components. Singular expressions may include the plural, unless the context clearly indicates otherwise. In this document, expressions such as "A or B" or "at least one of A and/or B" may include all possible combinations of the items listed together. Expressions such as "first," "second," "first," or "second," may refer to any of the components, in any order or order of importance, and are used to distinguish one component from another and do not limit the components. When a component (e.g., a first component) is referred to as being "functionally or communicatively connected" or "coupled" to another component (e.g., a second component), said component may be directly connected to said other component or may be connected through another component (e.g., a third component).

In this document, "configured (or set up) to" may be used interchangeably with "suitable for," "having the ability to," "altered to," "made for," "capable of," or "designed to," depending on the context, e.g., hardware or software. In some situations, the phrase "device configured to" can mean that the device is "capable of" working with other devices or components. For example, the phrase "processor configured (or set) to perform A, B, and C" may refer to a processor dedicated to performing those actions (e.g., an embedded processor), or a general purpose processor (e.g., a CPU or application processor) capable of performing those actions by executing one or more software programs stored on a memory device.

Referring to FIG. 1, the management server 101 may include a first processor 121, a first memory 131, a first input/output interface 141, and a first communication module 151. In some embodiments, the management server 101 may omit at least one of the components or may additionally include other components. According to one embodiment, the management server 101 may be a server for running an application operating in accordance with the present disclosure.

The first processor 121 may include one or more of a central processing unit, an application processor, or a communication processor (CP). The first processor 121 may execute operations or data processing, for example, related to control and/or communication of at least one other component of the management server 101. The first processor 121 can, for example, run an operating system or application to control a number of hardware or software components connected to the first processor 121, and can perform various data processing and computations. The first processor 121 may be implemented as, for example, a system on chip (SoC). According to one embodiment, the first processor 121 may further include a graphic processing unit (GPU) and/or an image signal processor. The first processor 121 may also include at least some of the components illustrated in FIG. 2, such as the cellular module 221. The first processor 121 may process instructions or data received from at least one of the other components (e.g., non-volatile memory) by loading them into the volatile memory, and storing the resulting data in the non-volatile memory. According to one embodiment, the first processor 121 may be configured to execute instructions that cause the user device 102 to perform (or process) various operations described in this disclosure.

The first memory 131 may include volatile and/or non-volatile memory. The first memory 131 may store, for example, instructions or data associated with at least one other component of the management server 101. According to one embodiment, the first memory 131 may store software and/or programs. The program may include, for example, a kernel, middleware, an application programming interface (API), and/or an application program (or "application"). At least a portion of the kernel, middleware, or API may be referred to as the operating system. The kernel may, for example, control or manage system resources (e.g., first processor 121 or first memory 131, etc.) used to execute actions or functions implemented in other programs (e.g., middleware, APIs, or application programs). The kernel may also provide interfaces for middleware, APIs, or application programs to access individual components of the management server 101 to control or manage system resources.

The first input/output interface 141 may, for example, pass commands or data input from a user or other external device to other component(s) of the management server 101, or output commands or data received from other component(s) of the management server 101 to a user or other external device.

The first communication module 151 may, for example, establish communication between the management server 101 and an external device, such as the user device 102. For example, the first communication module 151 may be connected to the network 153 via wireless communication or wired communication to communicate with the user device 102. The wireless communication may include, for example, cellular communication using at least one of LTE, LTE Advance (LTE-A), code division multiple access (CDMA), wideband CDMA (WCDMA), universal mobile telecommunications system (UMTS), wireless broadband (WiBro), or Global System for Mobile Communications (GSM). According to one embodiment, the wireless communication may include, for example, at least one of wireless fidelity (WiFi), Bluetooth, Bluetooth Low Energy (BLE), Zigbee, near field communication (NFC), Magnetic Secure Transmission, radio frequency (RF), or body area network (BAN). According to one embodiment, the wireless communication may include a GNSS. The GNSS may be, for example, the Global Positioning System (GPS), the Global Navigation Satellite System (Glonass), the Beidou Navigation Satellite System ("Beidou"), or Galileo, the European global satellite-based navigation system. Hereinafter, in this document, "GPS" may be used interchangeably with "GNSS". The wired communication may include at least one of, for example, USB (universal serial bus), HDMI (high definition multimedia interface), RS-232 (recommended standard232), power line communication, or POTS (plain old telephone service). The network 153 may include at least one of a telecommunications network, e.g., a computer network (e.g., LAN or WAN), the Internet, or a telephony network. According to various embodiments, all or a portion of the operations executed on the management server 101 may be executed on one or more other user devices (e.g., user device 102). According to one embodiment, when the management server 101 needs to perform a function or service automatically or upon request, the management server 101 may request that at least some of the functions associated therewith be performed by another device (e.g., a user device 102) instead of or in addition to performing the function or service itself. The user device 102 may execute the requested functionality or additional functionality and communicate the results to the management server 101. The management server 101 may process the received results as is or further to provide the requested functionality or service. For example, cloud computing, distributed computing, or client-server computing techniques may be utilized.

The user device 102 may include a second processor 122, a second memory 132, a second input/output interface 142, a second communication module 152, and a display 160. The second processor 122, second memory 132, second input/output interface 142, and second communication module 152 may perform the same functions as the first processor 121, first memory 131, first input/output interface 141, and first communication module 151 described above, without further description.

The display 160 can include, for example, a liquid crystal display (LCD), a light emitting diode (LED) display, an organic light emitting diode (OLED) display, or a microelectromechanical system (MEMS) display, or an electronic paper display. The display 160 can, for example, display various content (e.g., text, images, video, icons, and/or symbols) to a user. The display 160 may include a touch screen and may receive touch, gesture, proximity, or hovering input, for example, using an electronic pen or a part of the user's body.

The user device 102, according to various embodiments herein, may include at least one of, for example, a smartphone, tablet PC, cell phone, video phone, e-book reader, desktop PC, laptop PC, netbook computer, workstation, PDA, portable multimedia player (PMP), MP3 player, medical device, camera, or wearable device. The wearable device may include at least one of an accessory (e.g., watch, ring, bracelet, anklet, necklace, eyeglasses, contact lens, or head-mounted-device (HMD)), fabric or clothing-integrated (e.g., electronic clothing), body-attached (e.g., skin pad or tattoo), or bio-implantable circuitry. In various embodiments, the user device 102 may be flexible, or a combination of two or more of the various devices described above. The user device 102 according to embodiments of this document is not limited to the devices described above. As used herein, the term user may refer to a person using the user device 102 or a device (e.g., an artificial intelligence electronic device) using the user device 102.

[Profile Screen].

Figure 2A:
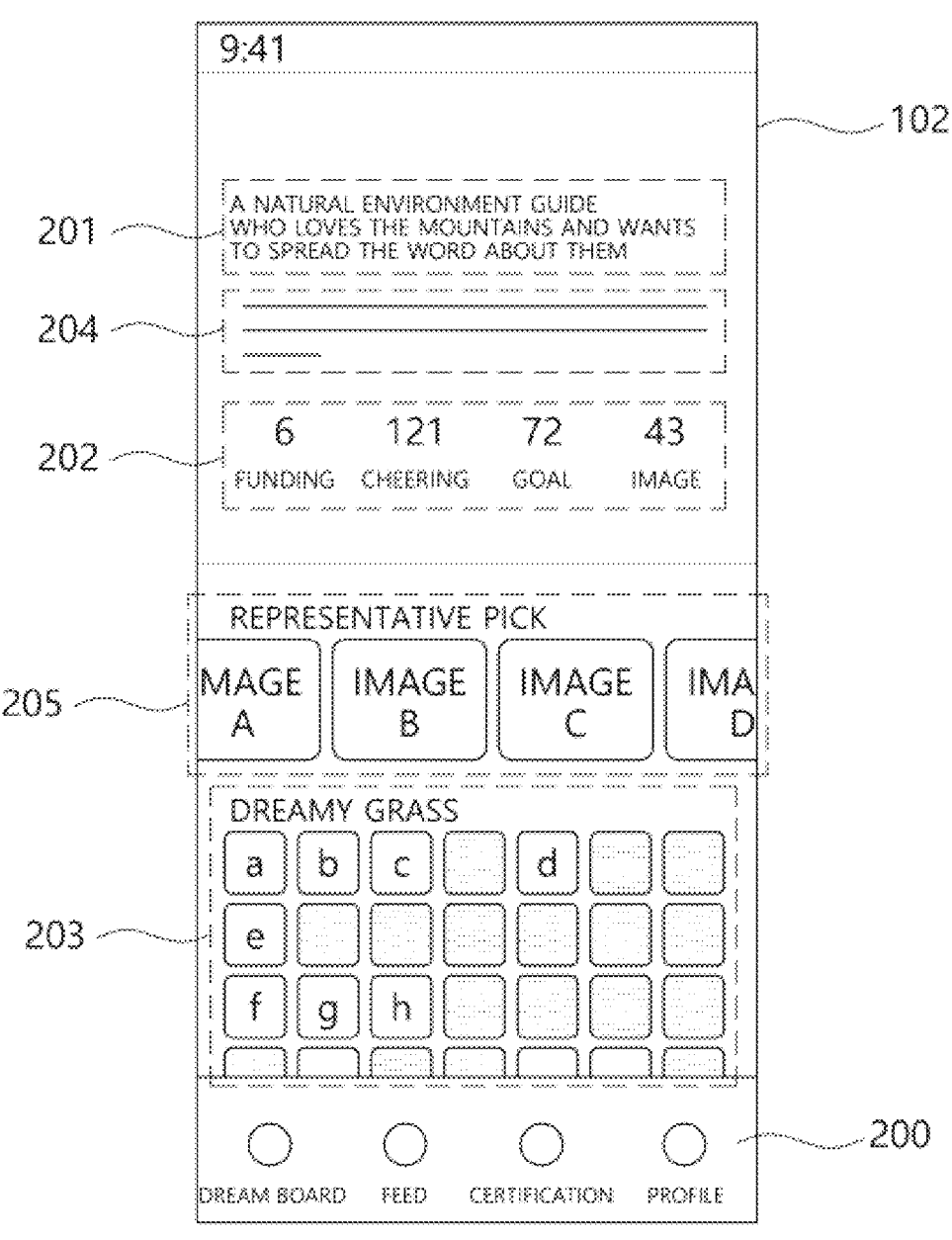
FIG. 2A illustrates a profile screen of a particular user account provided by the server via the user device, according to various embodiments.

FIG. 2A illustrates a profile screen for a particular user account provided by server 101 through an application, according to various embodiments.

According to various embodiments, the server 101 (e.g., first processor 121) may cause the user device 102 (e.g., second processor 122) to display a profile screen 200 of the application on the display 160. The profile screen 200 may be a screen that displays profile information associated with a user account of the user. The server 101 may cause the user device 102 to display the user's profile information via the profile screen 200. For example, the profile screen 200 may display dream names and modifiers set by the user. For example, the server 101 may cause the user device 102 to display the dream name and modifier on a first region 201 of the display 160 (e.g., a dream name region). As described herein, a dream name may be an occupation name or a role name. In another example, a dream name may be a concept that includes a modifier as well as a job or role name. In this case, an occupation name may refer to a future occupation (e.g., teacher) or a current occupation. A role name may refer to a future role (e.g., a good father) or a current role (e.g., a good father). A modifier can be a word or sentence that modifies the above occupation or role name, and more specifically, it can be a value or style that the user espouses.

The profile screen 200 may include an area (e.g., the dream introduction area) (e.g., the fourth area 204) in which the user's dreams are introduced. For example, the server 101 may cause the user device 102 to display a description of a user-set dream on the fourth region 204 (e.g., the dream introduction region) of the display 160. As a more specific example, the dream introduction area may display a description of the user-set dream, such as "what the user-set dream does," "what the user-set dream appeals to," and the like. The fourth region 204 may be located downstream of the first region 201, but the location of the fourth region 204 is not limited.

The profile screen 200 may include an action goal authentication area (e.g., third area 203). For example, the server 101 may cause the user device 102 to display, on the third area 203 of the display 160 (e.g., the action goal certification area), whether the user has performed certification of an action goal over a period of time. The action goal certification area allows the user to review how well they have been living their dreams over a recent period of time, and to receive ratings from other users. As used herein, the expressions "action goal" and "goal" may be used interchangeably.

For example, an action goal certification area (e.g., third area 203) may display information related to certification of an action goal set by a user. For example, the action goal certification area (e.g., third area 203) may display posts made by the user that are related to the certification of the action goal. The server 101 may cause the user device 102 to display the posts related to the action goal authorization in the third area 203 of the display 160. The "posts" may include posts related to the action goal certification, and posts not related to the action goal certification.

For example, said action goal authorization area (e.g., third area 203) may comprise a plurality of spaces (e.g., a plurality of object areas). In this case, the plurality of spaces may be configured to correspond to a preset time period. For example, if the preset period is 28 days, the plurality of spaces may comprise 28 spaces. As another example, if the preset period is 30 days, the plurality of spaces may comprise 30 spaces.

In this case, each of the plurality of spaces may correspond to a day in a preset past period relative to the current time. For example, if the plurality of spaces comprises 28 spaces, one space of the plurality of spaces may correspond to a day, and a total of 28 spaces may correspond to 28 days in the past relative to the current time. In this case, a row may correspond to a week, and a column may correspond to a day of the week.

The server 101 may cause the user device 102 to display the user's practice certification posts (e.g., posts related to practice goal certification) in at least one of the plurality of spaces of the third region 203 (e.g., the practice goal certification region) of the display 160. The at least one space of the plurality of spaces may display an action certification post based on when the action certification post was uploaded. For example, a space corresponding to a day in which an action certification was performed may display a representative photo of the action certification in the form of a thumbnail, and a space corresponding to a day in which an action certification was not performed may not display a thumbnail. The at least one space of the plurality of spaces that does not display a thumbnail may be represented as disabled.

For example, if said plurality of spaces comprises 28 spaces, and a user has uploaded an action certification post every day for the past 28 days from the present, server 101 may cause user device 102 to display a thumbnail in all of said plurality of spaces in third area 203 (e.g., action goal certification area) of display 160, and the thumbnail displayed may correspond to an upload date of the uploaded post.

According to one embodiment of the present disclosure, there may be a plurality of action certification posts uploaded on a date corresponding to one of the plurality of spaces in the action goal certification area (e.g., third area 203). In this case, the displayed thumbnails may be selected by number of supporters, upload time, and/or posts corresponding to the selected practice. If there is a plurality of practice recognition posts uploaded to the one space on a day corresponding to the one space, the server 101 may cause the user device 102 to expose as a thumbnail an image selected as a representative photo for the one space from among the plurality of spaces in the third area 203 of the display 160 (e.g., the practice goal recognition area), but display the number of posts uploaded on the day.

Further, when a user input corresponding to the thumbnail (i.e., the one space) is obtained, the server 101 may cause the user device 102 to display a date and the number of practices performed on that date.

The profile screen 200 may include a status display area (e.g., the second area 202). For example, the server 101 may cause the user device 102 to display, on the second area 202 (e.g., the status display area) of the display 160, at least one of a number of cheers earned for a user account, a number of goals set by said user account, or a number of posts to said goals. The number of cheers displayed in the second area 202 may be determined by indications of other user accounts for said user account, and the user account may obtain one cheer from one other user account. The number of goals displayed in the second area 202 may be set by the user via the user account and may represent the total number of goals set (e.g., the first practice goal 511 of FIG. 5A). The number of posts displayed in the second area 202 may be determined by the number of posts designated as a practice authorization category and may represent the total number of posts for the set goal. According to one embodiment, the server 101 may cause the user device 102 to further display, on the second region 202 of the display 160, the number of funds opened by the corresponding user account. The number of funds displayed in the second area 202 may be indicative of the total number of funds opened by the user account that meet certain conditions. The second area 202 may be located at the bottom of the first area 201, and the third area 203 may be located at the bottom of the second area 202, but there is no limitation on the location of the first area 201, the second area 202, or the third area 203.

The profile screen 200 may include a representative performance area (e.g., the fifth area 205). For example, the server 101 may cause the user device 102 to display at least one representative achievement post (e.g., at least one representative image) among posts posted by the user on the fifth region 205 (e.g., the representative achievement region) of the display 160. The representative performance post may be a post selected by the user account from among the posts posted by the user for display in the representative performance area. For example, a representative achievement post is described later.

FIG. 2B illustrates a funding status screen for a particular user account provided by server 101 via an application, according to various embodiments.

According to various embodiments, the server 101 (e.g., first processor 121) may cause the user device 102 (e.g., second processor 122) to display the funding status screens 211, 212 on the display 160 upon receiving a request from the user account (e.g., a request to display the funding status screen). The funding status screens may indicate two types of funding status. For example, referring to FIGS. 2A and 2B, the server 101 may cause the user device 102 to display a first funding status screen 211 on the display 160 in response to a user account selection (e.g., tap) for a number of funds in the second area 202, indicating a list of funds of a first type (e.g., cloud funds). In another example, referring to FIG. 2*b*, the server 101 may cause the user device 102 to display a second funding status screen 212 on the display 160 indicating a list of funding of the second type (e.g., NFT issuance) if the user device 102 confirms the user account's selection for funding of the second type (e.g., NFT issuance) while displaying the first funding status screen 211. The list of the first type of funding and the list of the second type of funding may include a title and a current status (e.g., number of days remaining, whether the funding is complete, whether the pledge has been met) for each funding. The server 101 may authorize a user account to open a first type of funding if the number of actions (e.g., number of post uploads) in the previous month is 15 or more. The server 101 may authorize a second type of funding to be opened for user accounts that have 100 or more posts verifying their actions.

According to one embodiment, the server 101 may cause the user device 102 to display the funding status screens 211, 212, which include an area 221 indicating a confidence level regarding funding for the corresponding user account. Area 221 may indicate information regarding at least one of pledge fulfillment rate, pledge confidence, or communication for the user account. The pledge fulfillment rate (e.g., 90%) may be determined based on the number of pledges that received a pledge fulfillment determination divided by the number of completed pledges. The pledge reliability may be categorized into predetermined tiers (e.g., tier 1 to tier 10) and determined based on the number of pledge certifications (a), the average number of images per pledge certification (b), the average number of characters written in the content per pledge certification (c), the similarity of the written text between pledge certifications (d), and the pledge distribution (e). For example, factors (a) through (e) may be weighted in proportions of 20%, 10%, 25%, 25%, and 20%, respectively, to produce a total score of commitment credibility, and a grade of commitment credibility may be determined based on the score per bin (e.g., 0-10 is grade 1, 11-20 is grade 2, 91-100 is grade 10). The communication status within the area 221 may be categorized into predetermined grades (e.g., best, high, medium, low), wherein the grades may be determined based on the response time (f) of answering questions from dream funders or NFT winners and the frequency (g) of replying to comments made on the verification post. For example, the above factors (f) and (g) may be calculated in a ratio of 60% and 40%, respectively, to produce a total score of the communication status, and a rating of the communication status may be determined based on the score of each section (e.g., 0-25 is a 'poor' rating, 76-100 is a 'best' rating).

FIG. 3A, FIG. 3B, FIG. 3C, FIG. 3D, and FIG. 3E illustrate an action goal authentication area included in a profile screen of a user account provided by the application, according to various embodiments of the server 101.

According to various embodiments, the server 101 (e.g., first processor 121) may cause the user device 102 (e.g., second processor 122) to display a profile screen 200 on the display 160. In this case, the profile screen 200 may include an action goal certification area (e.g., third area 203), as described above in FIG. 2A. For example, the server 101 may cause the user device 102 to display, in the third region 203 of the display 160 (e.g., the action goal verification region), a plurality of object regions representing at least one image of a post, in a predetermined arrangement. Each of the plurality of object areas may correspond to a respective day within a particular time period.

Figure 3A:
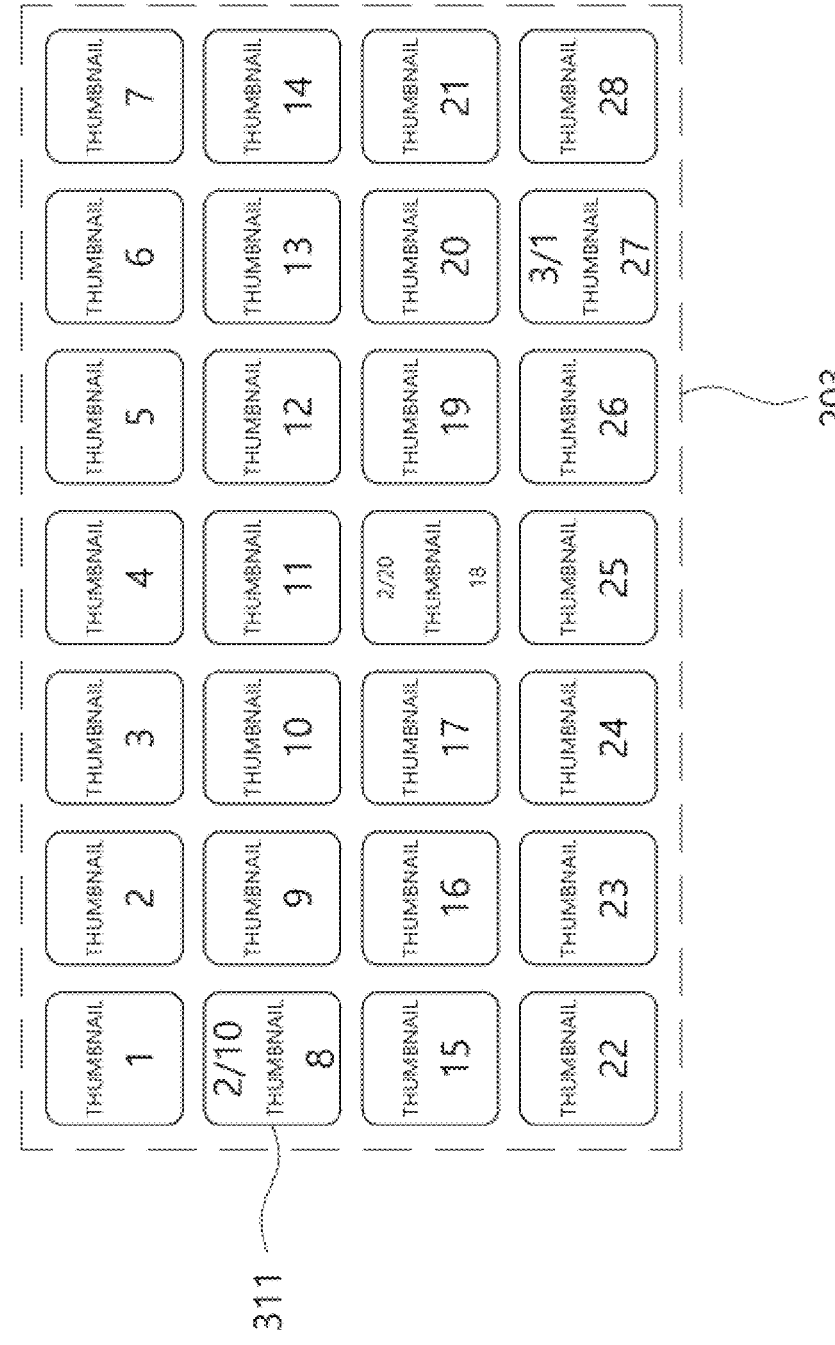
Figure 3B:
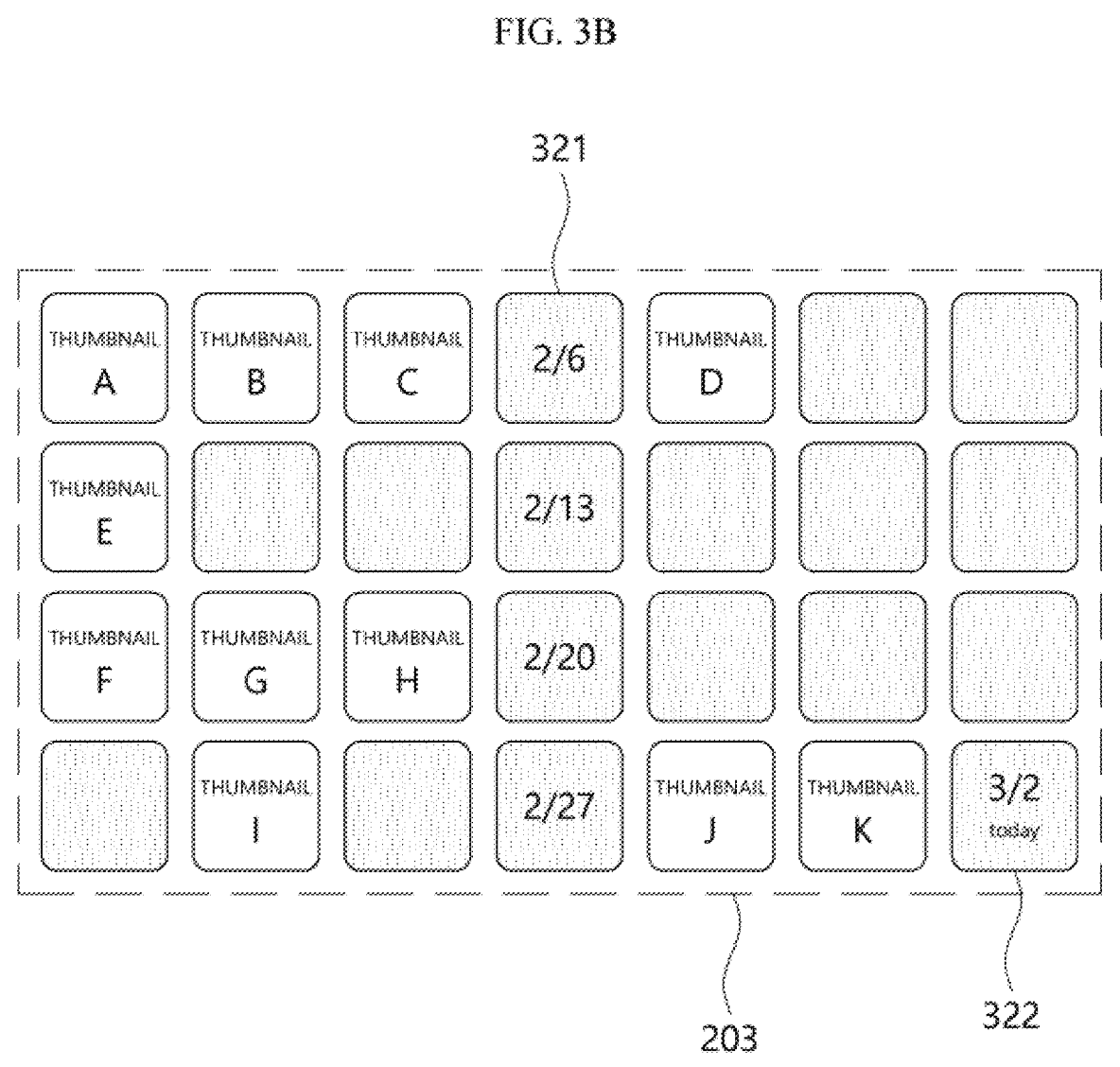

FIG. 3A may be a drawing in which a plurality of spaces (e.g., a plurality of object areas) in the third region 203 are arranged to correspond to a preset period of time (e.g., D-day to D-27 days) totaling 28 days, with the plurality of spaces arranged by day according to the arrangement of row 4 and column 7. In FIG. 3A, the area in which the thumbnails (e.g., thumbnail 1, thumbnail 2, and thumbnail 28) are displayed may be referred to as the "object area". For example, among a plurality of object regions, an object region whose thumbnail is displayed may be said to be enabled, and an object region whose thumbnail is not displayed may be said to be disabled. Thus, FIG. 3A may be a drawing in which thumbnails are displayed for all of the plurality of object regions within the third region 203. In this case, all of the object areas may be represented as enabled. For example, the server 101 may cause the user device 102 to display thumbnails throughout the object areas within the third region 203 of the display 160. Referring to FIG. 3A, the server 101 may, based on the user device 102 displaying the thumbnails throughout the object regions within the third region 203 of the display 160, cause the user device 102 to display a particular date (e.g., "2/10") by overlaying said particular date on a thumbnail (e.g., 311) corresponding to said particular date. For example, said specific date may be the first day of the month, the tenth day of the month, the twentieth day of the month, or the thirtieth day of the month, and the specific date is not limited. When displaying said specific date (e.g., "2/10") as an overlay on said thumbnail (e.g., 311), the server 101 may cause the user device 102 to change the transparency of said thumbnail (e.g., 311). FIG. 3B may be a drawing in which a plurality of spaces (e.g., a plurality of object areas) in the third region 203 are arranged to correspond to a preset time period of 28 days, wherein the plurality of spaces are arranged by day according to the arrangement of rows 4 and 7. In FIG. 3B, the shaded object areas may be deactivated object areas with no thumbnails displayed. FIG. 3B may include at least one enabled object region and at least one disabled object region. Referring to FIG. 3B, based on some of the plurality of object areas within the third region 203 of the display 160 of the user device 102 being disabled, the server 101 may cause the user device 102 to display a specific date (e.g., "2/6") corresponding to said specific object area (e.g., 321) based on a specific criterion among some of the disabled object areas. For example, said specific criteria may be set by the server 101 or may be set by a user via the user device 102. For example, the specific criteria may be to determine that, among the disabled object areas, a particular object area is (1) an object area disposed in the first column, (2) an object area disposed in the middle column (e.g., column 4 of 7), and/or (3) an object area corresponding to today. The server 101 may cause the user device 102 to display a specific object area (e.g., 322) corresponding to today among some of the disabled object areas, a specific date (e.g., "3/2") corresponding to said specific object area (e.g., 322), and an object (e.g., "today") indicating that it is today.

FIG. 3C may be a drawing in which a plurality of spaces (e.g., a plurality of object areas) of the third region 203 are configured to correspond to a preset time period of 28 days, wherein the plurality of spaces are arranged by date according to the arrangement of rows 4 and 7. Referring now to FIG. 3C, an illustration of a display when there is a plurality of practice certification posts uploaded on a particular day, according to one embodiment. In accordance with various embodiments, the server 101 may cause the user device 102 to change at least one of the display effect or size of the object area corresponding to the particular day, based on the number of images for posts uploaded on the particular day. For example, the higher the number of images for a post uploaded on a particular day, the borders of the object area may be displayed in bold. Or, for example, the larger the number of images for an uploaded post, the larger the size of the object area.

For example, in FIG. 3C, based on there being one practice verification post uploaded on a particular day corresponding to the first object area 331 of the third area 203, the server 101 may cause the user device 102 to display a thickness of the border of the first object area 331 as a first thickness, and a size of the first object area 331 as a first size. The first thickness may be a default thickness, and the first size may be a default size.

For example, in FIG. 3C, based on there being three practice verification posts uploaded on a particular day corresponding to the second object area 332 of the third area 203, the server 101 may cause the user device 102 to display a thickness of the border of the second object area 332 as a third thickness and a size of the second object area 332 as a first size. The third thickness may be larger than the first thickness. Said third boldness may be determined based on a number of practice certification posts (e.g., three).

For example, in FIG. 3C, based on two practice verification posts uploaded on a particular day corresponding to a third object area 333 of the third region 203, the server 101 may cause the user device 102 to display a thickness of the border of the third object area 333 as a second thickness and a size of the second object area 332 as a first size. Said second thickness may be thicker than said first thickness and thinner than said third thickness. The second thickness may be determined based on a number of practice certification posts (e.g., two).

For example, in FIG. 3C, based on there being four practice authentication posts uploaded on a particular day corresponding to a fourth object area 334 of the third area 203, the server 101 may cause the user device 102 to display a thickness of the border of the fourth object area 334 as a first thickness, and a size of the fourth object area 334 as a fourth size. The fourth size may be larger than the first size. The fourth size may be determined based on a number of practice certification posts (e.g., four). Based on the fourth object area 334 being displayed at the fourth size, the server 101 may cause the user device 102 to change the size of at least one object area located around the fourth object area 334. For example, the at least one object area that is disabled among the at least one object area located around the fourth object area 334 may be displayed at a changed size based on the fourth object area 334 being displayed at the fourth size.

For example, in FIG. 3C, based on three practice verification posts uploaded on a particular day corresponding to the fifth object area 335 of the third region 203, the server 101 may cause the user device 102 to display a thickness of the border of the fifth object area 335 as a first thickness and a size of the fifth object area 335 as a third size. Said third size may be larger than said first size and smaller than said fourth size. The third size may be determined based on a number of practice certification posts (e.g., three).

In accordance with various embodiments, the server 101 may cause the user device 102 to change the configuration and/or placement of the plurality of object areas within the third region 203 based on settings of the user device 102, and display the changed configuration and/or placement of the plurality of object areas on the third region 203. The configuration and/or placement of the object areas may include a size of the object areas, a number of object areas corresponding to a specified time period (e.g., 28 days, 30 days, or 17 days, etc.), a number of rows and columns in which the object areas are placed, and/or a placement location of the object areas corresponding to today (D-day), yesterday (D-1), and then (D-2), respectively. For example, referring to FIG. 3D, the third region 203 may include a plurality of object regions disposed in a total of seven columns in a first row at the top, a plurality of object regions disposed in a total of seven columns in a third row at the bottom, and a plurality of object regions disposed in a total of three columns in a second row at a break. In this case, the three object areas located at the break may be object area 341 corresponding to today, object area 342 corresponding to yesterday, and object area 343 corresponding to today, respectively. The object regions 341, 342, and 343 may be located at a break in the second region 203 and may be large in size relative to other object regions located at the top and bottom of the second region 203. The object areas 341, 342, and 343 may include objects indicative of a particular date (e.g., "2/28", "3/1", "3/2") corresponding to each area, and the object area 343 corresponding to today may further include an object indicative of today (e.g., "today"). This is exemplary, and there are no limitations on the configuration and/or placement of the object areas.

Figure 3D:
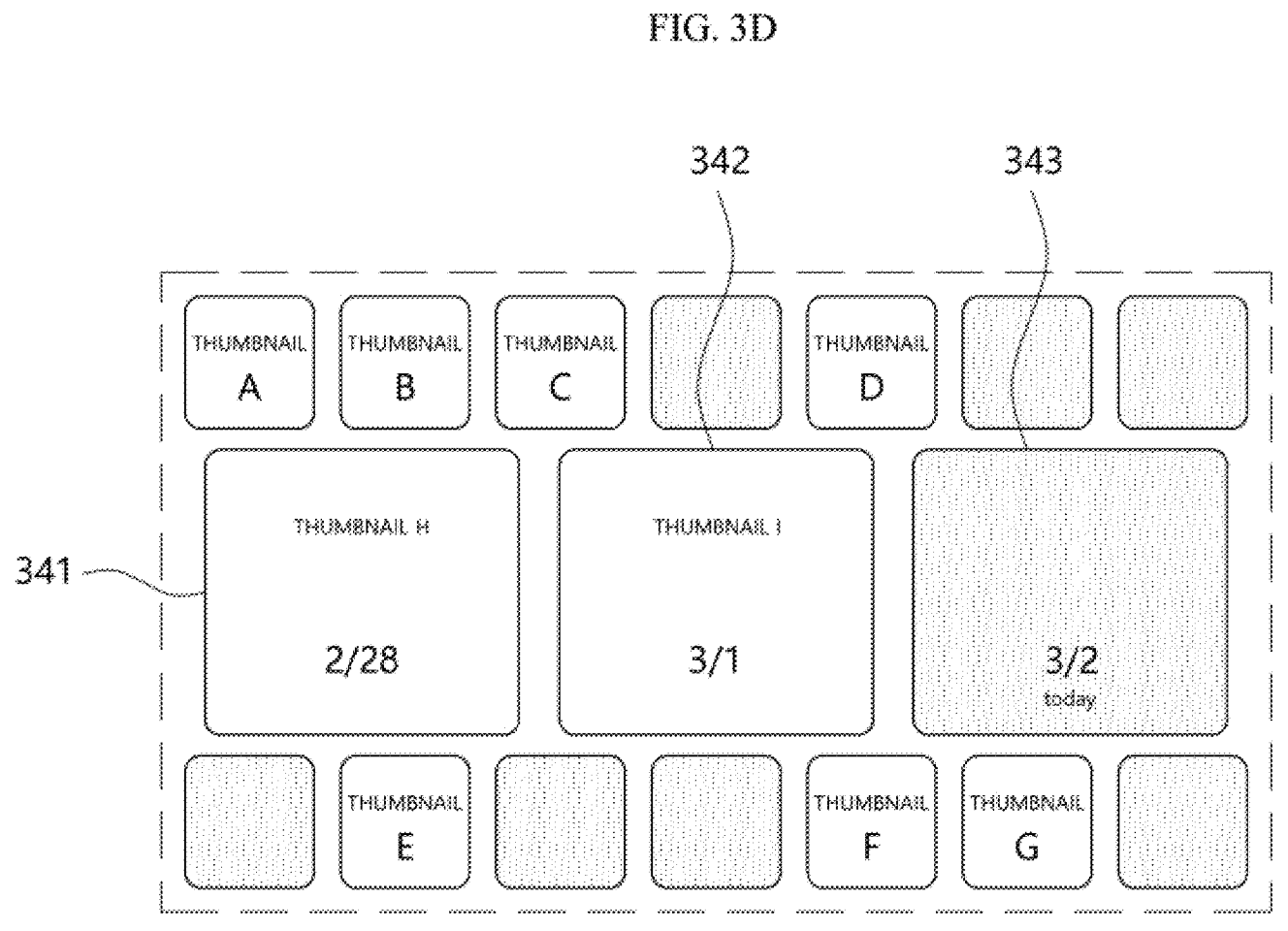
Figure 3E:
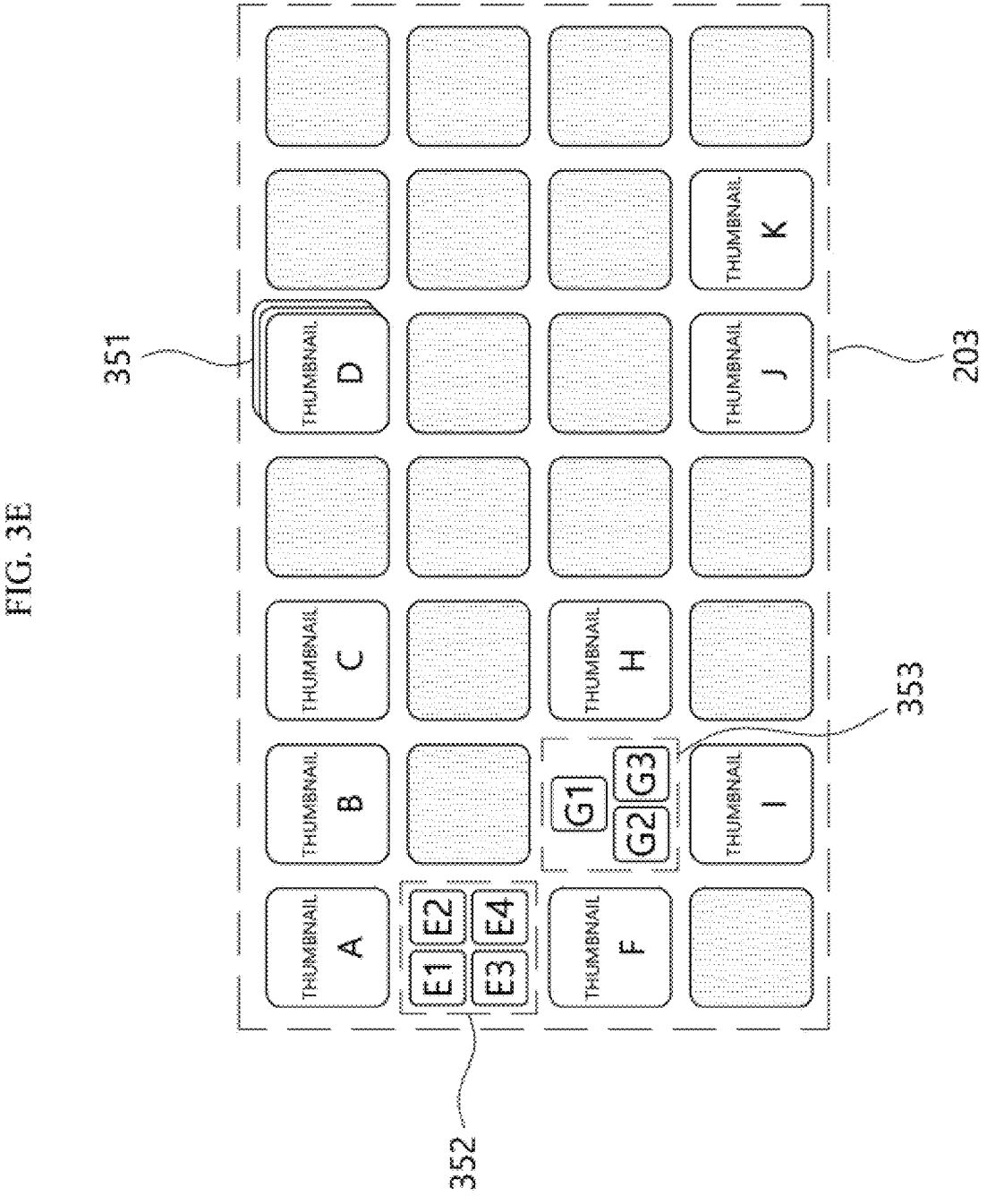

FIG. 3E may be a drawing wherein a plurality of spaces (e.g., a plurality of object areas) of the third region 203 are configured to correspond to a preset period of 28 days, and wherein the plurality of spaces are arranged by date according to the arrangement of rows 4 and 7. Referring now to FIG. 3D, it is illustrated how a plurality of practice certification posts uploaded on a particular day may be displayed, according to one embodiment. In accordance with various embodiments, the server 101 may cause the user device 102 to change the display of the thumbnails displayed in the object area corresponding to a particular day based on the number of images for posts uploaded on the particular day. For example, if there are multiple posts uploaded on a particular day, the plurality of thumbnails may be displayed overlappingly, or the plurality of thumbnails may be displayed in a single object area according to a specified arrangement. For example, in FIG. 3E, based on there being three practice authorization posts uploaded on a particular date corresponding to the first object area 351 of the third area 203, the server 101 may cause the user device 102 to display, in the first object area 351, a thumbnail of each of the three posts corresponding to the particular date, at least partially overlapping. For example, of the three overlapping thumbnails displayed in the first object area 351, the earliest displayed thumbnail (e.g., thumbnail D) may be the earliest uploaded post or the latest uploaded post among the posts uploaded on the particular day. Alternatively, for example, a thumbnail corresponding to a post selected by a user from among three posts corresponding to said particular day may be displayed first among the three nested thumbnails displayed in said first object area 351.

For example, in FIG. 3E, based on there being four practice verification posts uploaded on a particular date corresponding to the second object area 352 of the third area 203, the server 101 may cause the user device 102 to display a thumbnail of each of the four posts corresponding to said particular date in the second object area 352 according to a specified arrangement (e.g., if there are four thumbnails, a two-row, two-column arrangement). When multiple thumbnails are displayed in a single object area (e.g., the second object area 352) according to the specified arrangement, each thumbnail may be displayed at a smaller size than when a single thumbnail is displayed in a single object area.

For example, in FIG. 3E, based on there being three practice certification posts uploaded on a particular date corresponding to the third object area 353 of the third region 203, the server 101 may cause the user device 102 to display a thumbnail of each of the three posts corresponding to said particular date in the third object area 353 according to a specified arrangement scheme (e.g., if there are three thumbnails, one thumbnail is placed in the middle at the top and two thumbnails are placed at the bottom). There is no limit to the configuration of the specified arrangement based on the number of thumbnails.

FIG. 4 is a diagram illustrating an embodiment in which the server 101 recommends a profile for a user account provided by an application, according to various embodiments.

According to various embodiments, the server 101 (e.g., first processor 121) may cause the user device 102 (e.g., second processor 122) to display a recommended profile on the display 160. The recommended profile may be at least one profile that is made available as a profile for a user account based on a user's selection. The recommended profile may include information about the content displayed on the profile screen (e.g., profile screen 200) (e.g., dream name, dream introduction, action goal, and/or detailed goals). The suggested profiles may include profiles provided in a predetermined format, and profiles generated by other users. A profile provided in a predetermined format may be a profile provided by an operator of the server 101. For example, a profile pre-generated by an operator of the server 101 relating to a teacher, police officer, or doctor may be provided as a recommended profile. Profiles generated by other users may be pre-generated profiles by other users utilizing applications provided by the server 101.

For example, referring to FIG. 4, the server 101 may cause the user device 102 to display a first screen 401 on the display 160. The first screen 401 may include a first profile 410 (e.g., a profile provided in a predetermined format) and/or a second profile 420 (e.g., a profile pre-generated by another user) as recommended profiles. If one of the profiles (e.g., the second profile 420) is selected among the recommendation profiles displayed on the user device 102, the server 101 may cause the user device 102 to display a second screen 402 on the display 160. The second screen 402 may include specific information about the profile selected by the user. For example, the second screen 402 may include objects (e.g., 421, 422, 423) representing pre-stored information associated with the second profile 420. The objects (e.g., 421, 422, 423) representing the pre-stored information associated with the second profile 420 may include objects representing information associated with an "appearance to be applied to the profile's main screen," an "appearance to be applied to the profile's goal setting screen," or an appearance to be applied to the profile's goal subgoals. The second screen 402 may include a selection button 424, and based on the selection button 424 being selected on the user device 102, the second profile 420 may be applied as a profile for the user account.

[Post Authoring Interface].

Figure 5A:
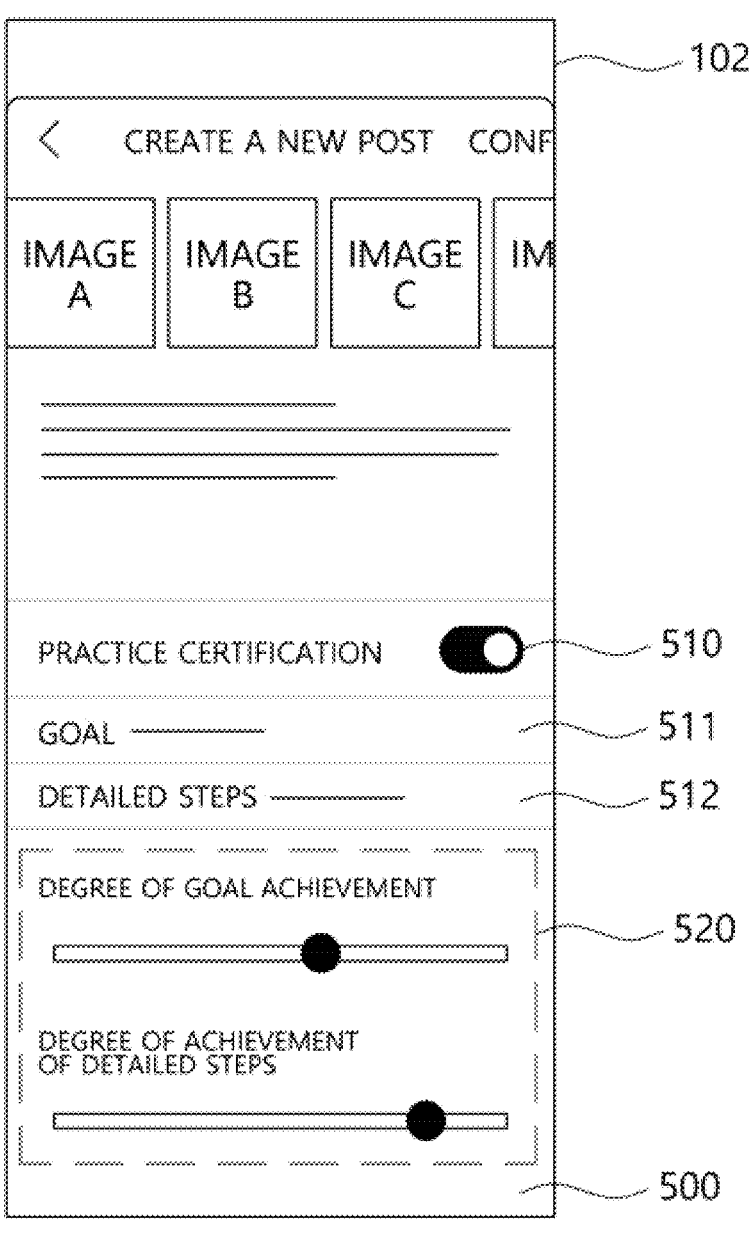
FIG. 5A illustrates a post creation screen of a user account provided by a server to a user device, according to various embodiments.

FIG. 5A illustrates a post creation screen for a user account in an application provided by server 101, according to various embodiments.

According to various embodiments, the server 101 (e.g., first processor 121) may cause the user device 102 (e.g., second processor 122) to display a post creation screen 500 on the display 160. Via the post creation screen 500, the user may upload a post related to the routine or practice authentication.

According to one embodiment, as a user uploads a post, the user may select whether the post is related to certifying an action goal. That is, the post creation screen 500 may include an interface 510 that allows the user to select whether the post being uploaded is related to certifying an action goal.

In this case, when the server 101 receives input from the user device 102 that the user device 102 has posted a post related to the action goal certification, the server 101 may categorize and manage the post as an action certification post. The classification and management of the action certification posts may be performed by the server 101, or may be performed by the user device 102 using information provided by the server 101. The user's input of posts related to action goal certification may be in the form of selecting "Action Certification" in FIG. 5A. Specifically, if the user's input that the post is related to an action goal certification is obtained, the post can be managed as an "action certification post", and if the user's input that the post is related to an action goal certification is not obtained, the post can be managed as a "routine post".

More specifically, if the user selects that the post he or she is publishing is related to an action certification, the server 101 may display on the post creation screen 500 a list of action goals (e.g., end goals, intermediate goals, detailed goals, etc.) that the user device 102 has set for the user. At this time, the user may select whether the post corresponds to any of the above action goals and upload it. In this case, the server 101 or the user device 102 may determine that the action goal selected by the user is authenticated by the post uploaded by the user.

On the post creation screen 500, the user may also enter a hashtag to indicate what kind of post the user is uploading, what it contains, and the like. In other words, the user uploads a post, and the user may enter a hashtag with the post, and the entered hashtag may be visible to other users along with the user's post.

According to one embodiment, the server 101 may cause the user device 102 to display a post creation screen 500 comprising an object 520 indicating the degree of achievement of the first action goal 511 (e.g., goal) or the degree of achievement of the second action goal 512 (e.g., detail step) for creating a particular post from the user account in response to a selection of the first action goal 511 or the second action goal 512 with a target number of completions of the first action goal 511 (e.g., goal) set. Here, the second action goal 512 may be one of a plurality of items of the first action goal 511.

FIG. 5B illustrates a method for linking between posts and an embodiment for displaying linked posts, according to various embodiments.

According to various embodiments, the server 101 (e.g., the first processor 121) may cause the user device 102 to display a pop-up screen 530 for associating the particular post with other posts specified by the second action goal if the server 101 (e.g., the first processor 121) has identified a selection of the first action goal 511 and the second action goal 512 for creating the particular post from the user account. For example, if the first action goal 511 and the second action goal 512 are selected while a particular post is being created by the user account, the user device 102 may display a pop-up screen 530 for associating one of the posts created for the second action goal 512 with said particular post. According to one embodiment, the server 101 may cause the user device 102 to display an image 532 uploaded with the other post at a predetermined size within the image 531 corresponding to said specific post if the other post is associated with the specific post. In this case, when the image 532 is selected by the user account, the server 101 may cause the user device 102 to display the post corresponding to said image 532.

[Representative Performance].

Figure 6:
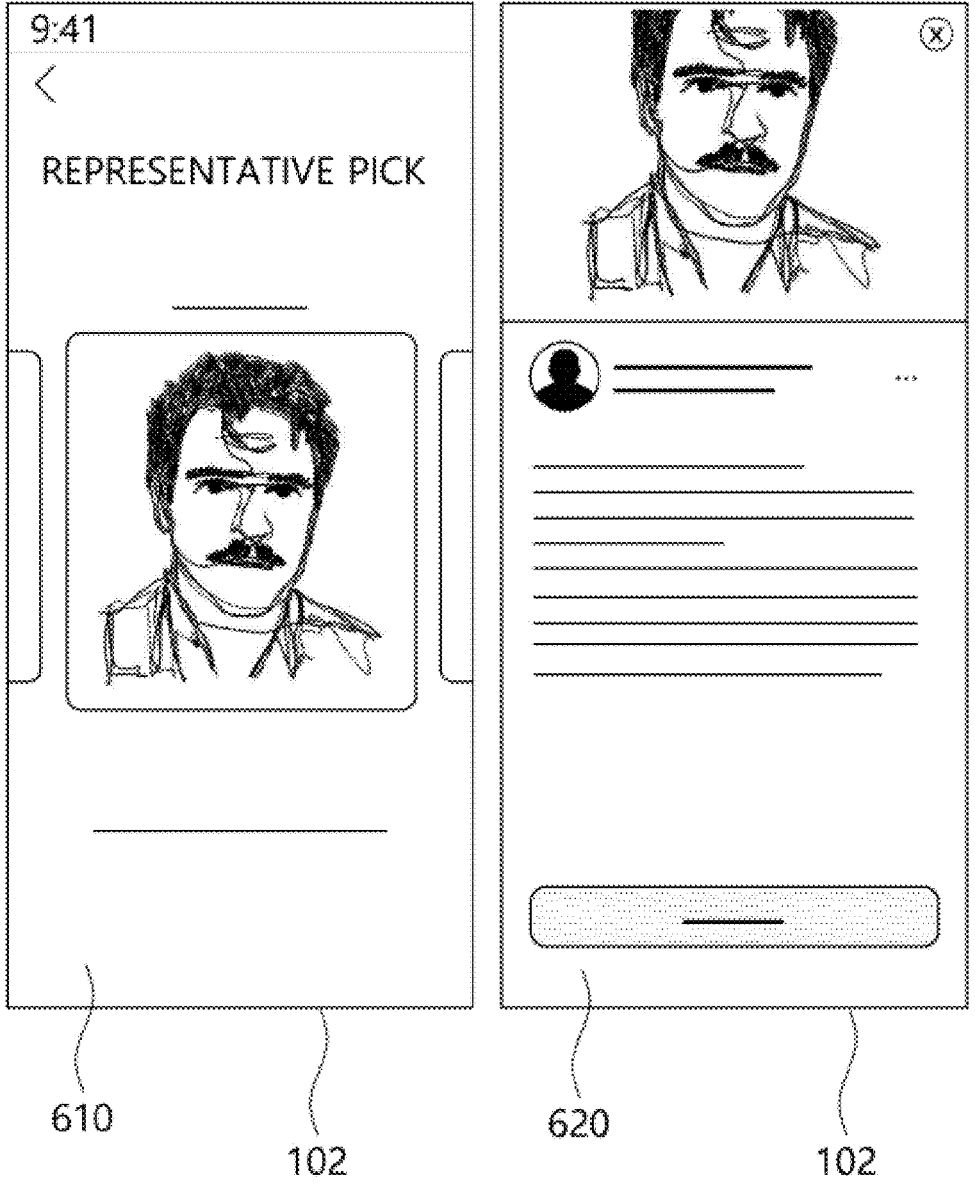
FIG. 6 illustrates a screen displaying representative performance of a user account provided by a server to a user device, according to various embodiments.

FIG. 6 illustrates a screen where server 101 displays representative performance of a user account provided by the application, according to various embodiments.

According to various embodiments, server 101 (e.g., first processor 121) may cause user device 102 (e.g., second processor 122) to display screens (e.g., 610, 620) representing representative achievements on display 160. In this case, the representative achievements may be set by the user, which may function to encourage the user to continually consider and edit what the user may view as "representative achievements" of his or her dreams, thereby encouraging the user to materialize his or her dreams. Through the screen displaying the representative achievements (e.g., 610, 620), a post may be exposed that includes a detailed description of one of the steps the user has taken to fulfill the dream set by the user.

The user may enter an image or text to represent the representative performance. In this case, the created representative performance may be exposed on the user's profile screen 200 along with the user's dream information (e.g., dream name). For example, in FIG. 2A, a representative achievement area (e.g., fifth area 205) may display representative achievement posts associated with the representative achievement created by the user.

On the other hand, a predetermined number of representative achievements can be set by a user. Furthermore, the set representative achievements can be shared with other users in the community and evaluated. For example, other users may view the user's representative performance and leave sympathy or support. The number of cheers left by other users may be displayed as a cheer count in the second area 202 in FIG. 2A.

[Display Interface for the First Type of Post (User-Uploaded Posts)].

Figure 7:
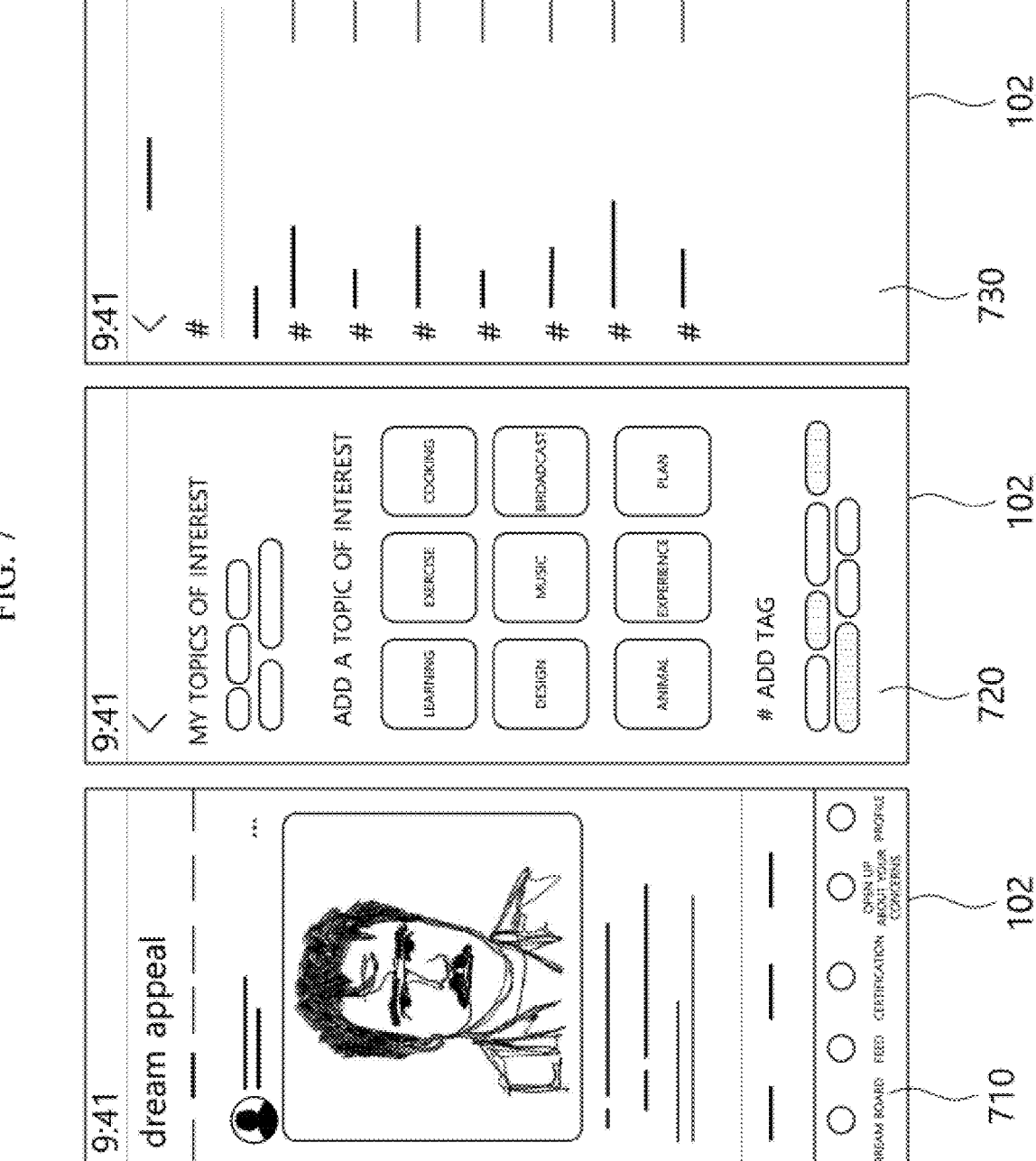
FIG. 7 illustrates a first type of post display screen provided by a server to a user device, according to various embodiments.

FIG. 7 illustrates a first type of post display screen that server 101 provides in an application, according to various embodiments.

According to various embodiments, the server 101 (e.g., first processor 121) can cause the user device 102 (e.g., second processor 122) to display posts uploaded by various users on the display 160 via a first type of post display screen (e.g., 710, 720, 730) (e.g., a feed interface). The first type of post display screen (e.g., 710, 720, 730) may display posts uploaded by users utilizing the community. The first type of post display screen (e.g., 710, 720, 730) may display posts uploaded by users categorized based on predetermined criteria.

According to one embodiment, a first user device (e.g., a device of the same kind as user device 102) may upload a post. A second user device (e.g., a device of the same kind as user device 102) may upload a post. The server 101 may store the at least two posts. When the first user device (e.g., a device of the same kind as the user device 102) contacts the server 101, the server 101 may select a post from the plurality of posts that corresponds to a topic of interest set by the user to be displayed on a first type of post display screen (e.g., 710, 720, 730) of the user. The server 101 may transmit the selected posts to the user device 102, so that the posts corresponding to the user's set topic of interest may be exposed via the user device 102. The topic of interest may be, for example, learning, exercise, cooking, design, music, broadcasting, animals, experiences, and/or planning. If the user selects any of the above topics of interest, the server 101 may cause the user device 102 to display posts related to the selected topic of interest on the first type of post display screen (e.g., 710, 720, 730).

The first type of post display screen (e.g., 710, 720, 730) displayed on the user device 102 may expose posts stored on the server 101 that correspond to topics of interest set by the user, or posts stored on the server 101 that correspond to tag information selected by the user. The tag information may be directly entered or selected by the user, and the user's feed may display various posts that include the selected or entered tags.

Further, the server 101 may cause the user device 102 to display, on the first type of post display screen (e.g., 710, 720, 730), posts from users who belong to one of a plurality of groups determined based on certain criteria. For example, the plurality of groups may be determined based on belonging to the same affiliation (e.g., career camp). In another example, the plurality of groups may be determined based on whether they share the same action goal. In a more specific example, a first group may be a group of users of the community who are in the same career camp course among a plurality of users of the community. Further, the second group may be a group of users of the community who have mutually committed to a common action.

In other words, the server 101 may cause the user device 102 to display posts related to the group to which the user belongs on the first type of post display screen (e.g., 710, 720, 730), thereby allowing the user to interact within the community by sharing opinions with other users of the same affiliation or other users with whom the user has committed to a common practice.

[Second Type of Post (Admin Uploaded Posts) Display Interface].

Figure 8A:
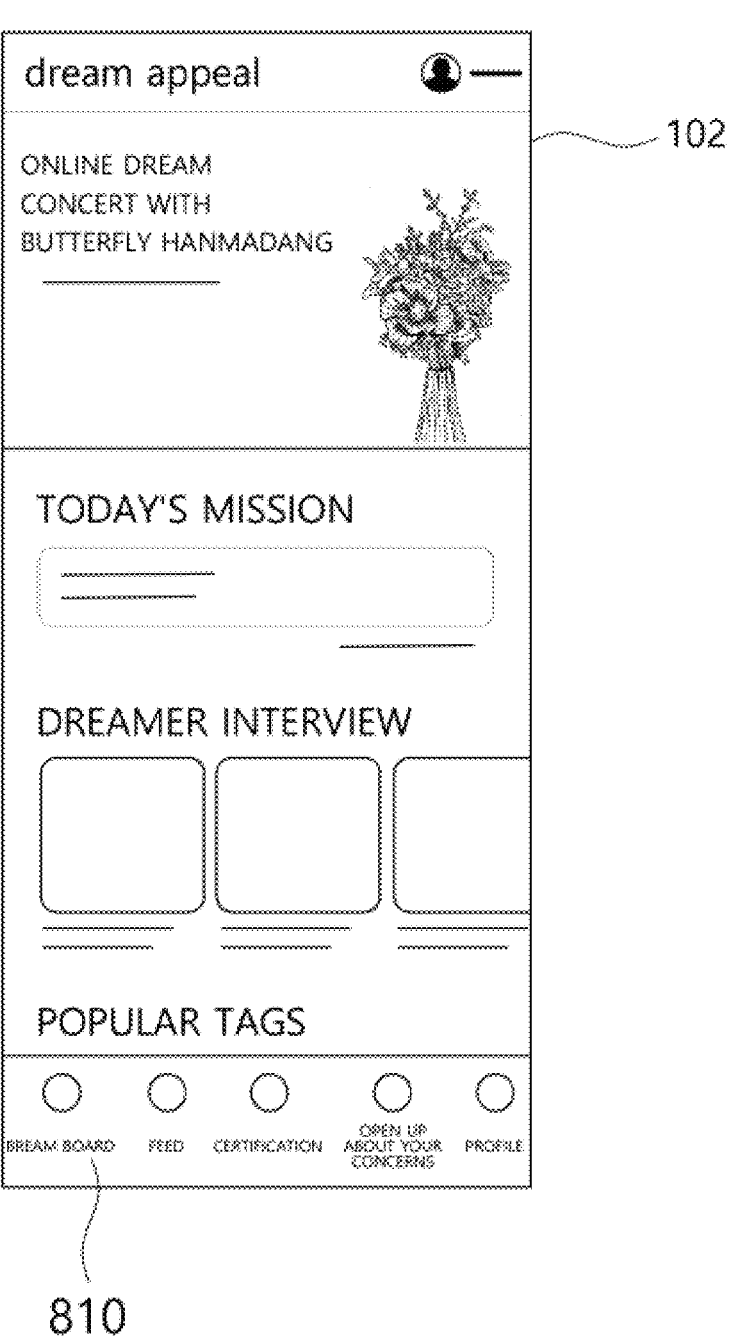
Figure 8B:
Figure 8D:
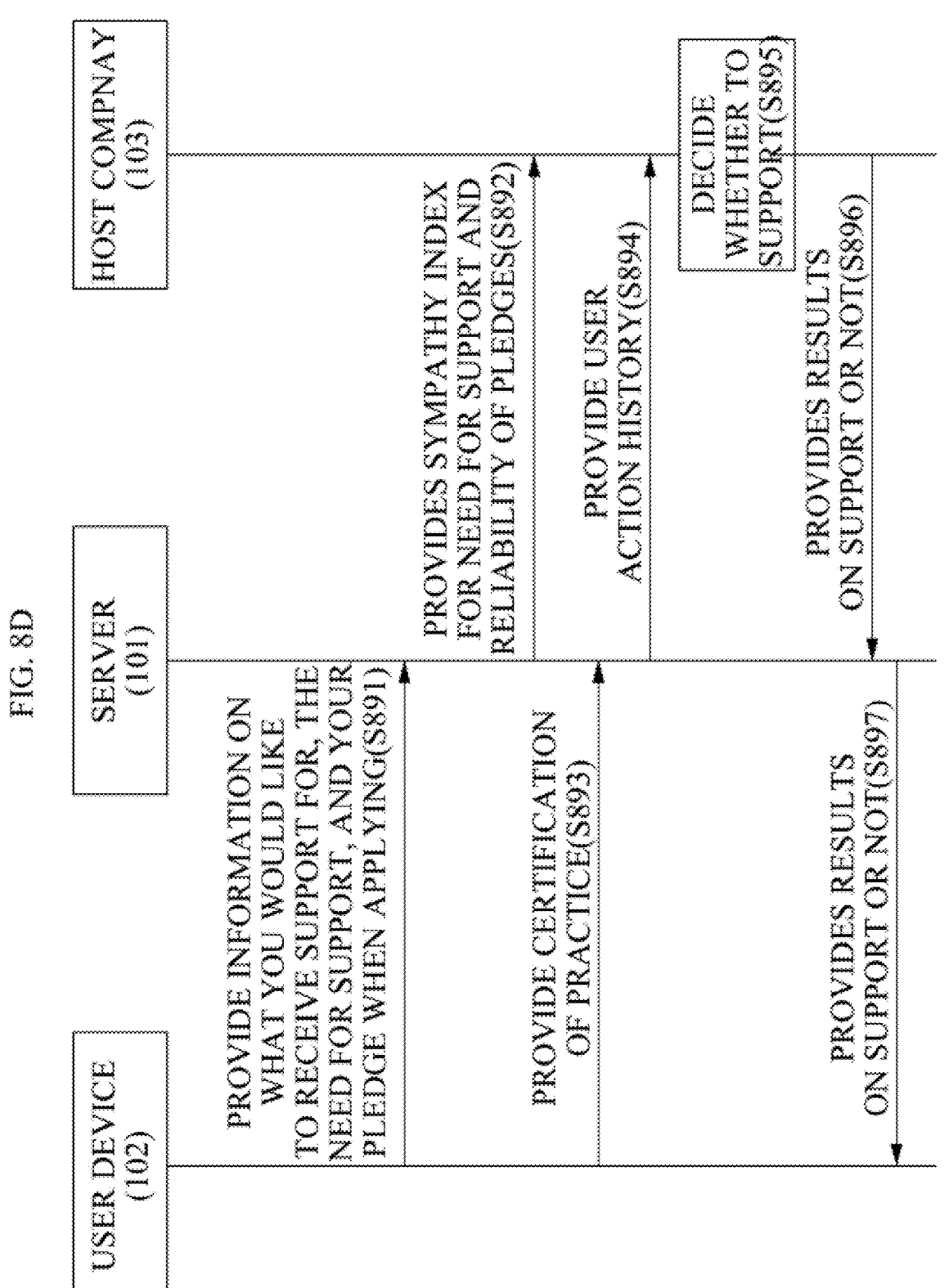
FIG. 8D is a flow diagram to illustrate how a system including a server and a user device may operate, according to various embodiments.

FIGS. 8A, 8B, and 8C illustrate a second type of post display screen provided by the server 101 in an application, according to various embodiments. FIG. 8D is a flow diagram to illustrate a method of operation of a system including server 101 and user device 102, according to various embodiments.

According to various embodiments, server 101 (e.g., first processor 121) can cause user device 102 (e.g., second processor 122) to display posts uploaded by an administrator of the server on display 160 via a second type of post display screen (e.g., 810, 820, 830, 840, 850, 860) (e.g., a dream board interface).

For example, in FIG. 8A, the first screen 810 may display various information related to the dream. For example, the first screen 810 may display mission information for collecting star fragments. In addition, the first screen 810 may display interviews with other users, trending tags, customized advertising information, and the like.

For example, in FIG. 8A, when the mission information area displayed on the first screen 810 is selected by the user, a second screen 820 displaying information related to the star fragments may be output via the user device 102 in FIG. 8B. The second screen 820 may display information regarding the number of star fragments collected to date, for example. Additionally, the second screen 820 may display information about various ways to collect star fragments, such as star fragment missions. Further, the second screen 820 may display date information, and the date information may display the number of star fragments acquired on the date included in the date information.

For example, in FIG. 8B, the third screen 830 allows the user to view ranking information based on the star fragments. Specifically, the ranking may be based on the number of stars the user has earned, or may be based on the current number of stars the user has, excluding the number of stars the user has used.

Meanwhile, in FIG. 8A, the first screen 810 may display event information, wish information, news that may be helpful to the user, and/or customized advertisements. In this case, the event information may include a description of an event provided by an administrator or a third party. The wish information may include the content of the wish that the user wishes for. The advertisements may be customized, as described in more detail below.

For example, referring to FIG. 8C, the server 101 may cause the user device 102 to display a fourth screen 840, a fifth screen 850, or a sixth screen 860 on the display 160. The fourth screen 840, fifth screen 850, and sixth screen 860 may be referred to as a wish wall interface. With the fourth screen 840 displayed, the fifth screen 850 may be displayed at the user's option, and with the fifth screen 850 displayed, the sixth screen 860 may be displayed at the user's option. The wish wall interface allows the user to enter a desired assistance (or wish), and based on that input, the organizer may provide the desired assistance (or wish) to the user. As a result, users may be more motivated to engage with the community in order to receive that support (or wish). In addition, the support (or wish) desired by the user may be subject to a prescribed verification process, so that the organizer can provide the appropriate support to users who really need it.

The server 101 may cause the user device 102 to display the wish information entered by the plurality of users via the wish wall interface (e.g., fourth screen 840, or fifth screen 850). For example, the server 101 may cause the user device 102 to display on the wish wall interface (e.g., the fifth screen 850) the wish that receives the most views over a period of time among the wishes entered by the plurality of users. In another example, the server 101 may cause the user device 102 to display wishes entered by a plurality of users on the wish wall interface (e.g., fifth screen 850) based on when the wishes were uploaded. For example, the server 101 may cause the user device 102 to display a predetermined number of the most recently uploaded wishes on the wish wall interface (e.g., the fifth screen 850).

On the other hand, when the user enters a wish via the user device 102, the user may also enter a description of what he or she would like to be supported, the need for the support, a commitment to the support, and/or an action certification. In this case, the action authentication may be an action goal authentication that the user has been practicing to receive the support, i.e., the server 101 may obtain the support information (e.g., what the user wants to be supported, the need for the support, and the commitment and/or action authentication) from the user via the user device 102 (S891, S893).

Based on the support information received from the user device 102, the server 101 may determine a support need empathy index and/or a commitment confidence index, etc. Further, the server 101 may determine a user's commitment history associated with the commitment certification based on the commitment certification obtained from the user device 102. The server 101 may provide the support need empathy index, the commitment credibility, and/or the user's practice history to the organizer 103 (e.g., the organizer server, or the organizer device) (S892, S894).

The subject matter expert 103 (e.g., subject matter expert server, or subject matter expert device) may determine whether to provide support to the user based on the support need empathy index, commitment credibility, and/or the user's practice history provided by the server 101 (S895). The subject matter expert 103 (e.g., subject matter expert server, or subject matter expert device) may provide the supportability result for the user to the server 101 (S896). Further, the server 101 may provide the supportability result for the user determined by the subject matter expert 103 (e.g., subject matter expert server, or subject matter expert device) to the user device 102 (S897).

Dream Name (Modifier+Role Name) Suggestions

In a dream community, modifiers can be an important feature. This is because modifiers can be used to guide users to specify what kind of person they want to be, with what kind of values, doing what kind of work, rather than just thinking about what kind of job they want to have. Embodiments are described herein that provide a modifier input interface and/or modifier recommendation information to help a user consider modifiers for their dreams.

[Enter Modifier].

Figure 9B:
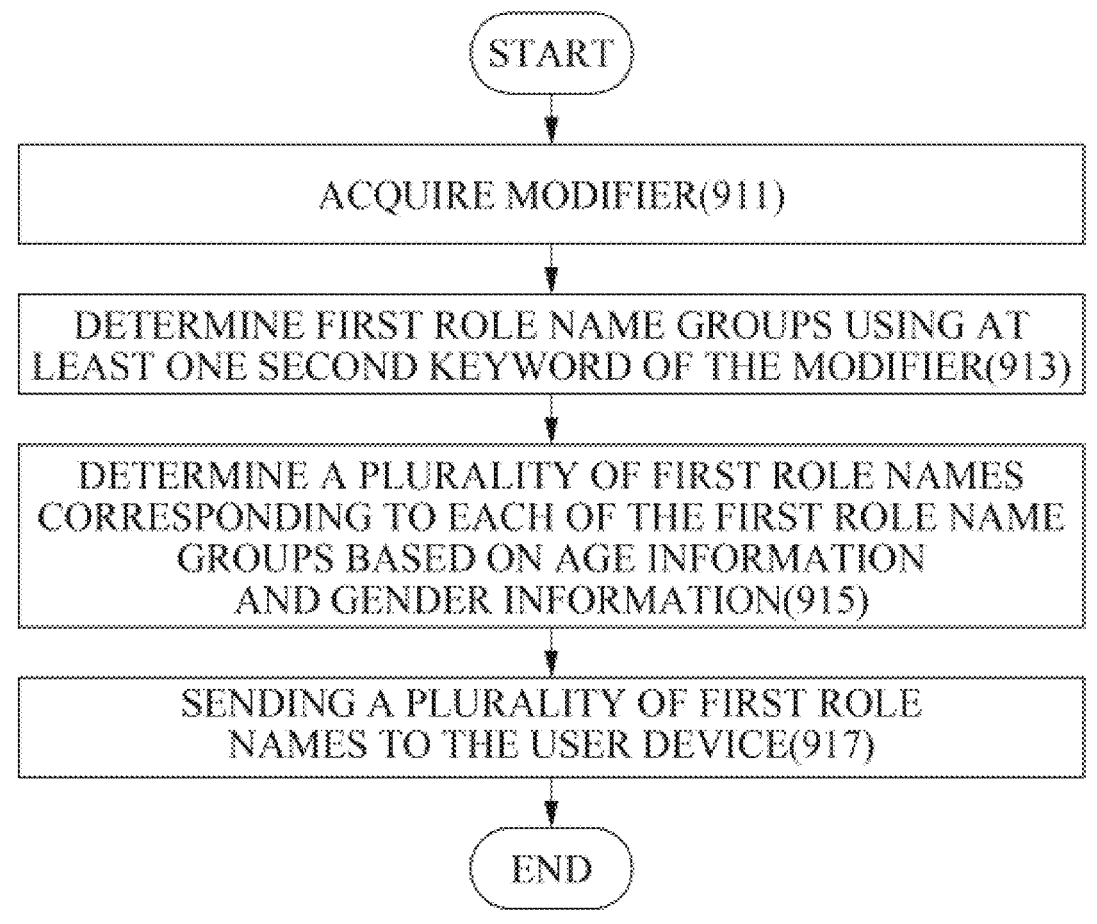

FIGS. 9A and 9B are flow diagrams to illustrate methods of operation of server 101 and user device 102, according to various embodiments. FIGS. 10A through 10C are diagrams to illustrate methods of operation of a server 101 and a user device 102, according to various embodiments.

FIG. 9A is a diagram illustrating a method for recommending modifiers based on role names. FIG. 9B is a diagram illustrating a method for recommending modifiers based on modifiers. After describing FIGS. 10A, 10B, and 10C, FIGS. 9A and 9B will be described.

Referring to FIG. 10A, the server 101 (e.g., first processor 121) may cause the user device 102 (e.g., second processor 122) to display a screen 1010 for receiving input of a modifier and a role name.

As used herein, a modifier may be a word or sentence that modifies a job title or role name. While a user's dream may be defined by a job title or role name, a user's dream may be further defined by a modifier that modifies the job title or role name. Users can gradually refine their dreams by creating different modifiers or modifying pre-built modifiers to refine their desired job or role.

According to one embodiment, the modifier may be determined by user input. Specifically, the modifier may be determined by user input via an input of the user device 102 (e.g., the second input/output interface 142 of FIG. 1 or a display 160 (e.g., a display included on a touch screen)).

In this case, the server 101 may cause the user device 102 to display guidelines on the display 160 to assist the user in entering the formula. For example, the guidelines may relate to "how to write a formula" that may assist the user in entering the formula. As another example, the guidelines may be examples of various formulas that are pre-stored on the user device 102 or the server 101.

On the other hand, the modifier may be determined based on dream information. In this case, the dream information may include a dream name or a dream field, wherein the dream name may be a job name or a role name set by the user. Further, the dream field may be a field to which the occupation or role belongs. For example, the dream name may be baseball player, and the dream field may be an occupational field encompassing baseball player, such as athlete.

[Modifier Suggestions].

Referring to FIG. 10B, the server 101 (e.g., first processor 121) may cause the user device 102 (e.g., second processor 122) to display a screen 1020 that recommends a modifier.

According to one embodiment, the modifiers may be determined by user choice.

For example, the modifier may be a user-selected modifier from any of the existing modifiers stored on the user device 102 or the server 101. In this case, the pre-existing modifier may be, for example, a modifier set by another user.

For example, the modifier may be determined by a user's selection from candidate words or candidate sentences selected by the user device 102 or the server 101 based on certain criteria. The server 101 may cause the user device 102 to display a screen including the selected modifier based on the criteria. In this case, the selected modifier may be a modifier that the user device 102 recommends to the user. Alternatively, the selected modifiers may be modifiers that the user device 102 has selected as exemplary modifiers for the user to reference when creating modifiers.

The server 101 may perform appropriate actions in response to the user input being obtained via the user device 102. In one example, the user device 102 may obtain user input for viewing modifier recommendation information. In this case, the user input may be a touch input corresponding to an area where certain text is output (e.g., the text "recommend modifier information" or the text "suggestions").

The user device 102 may obtain a plurality of parameters when the user input for determining the modifier recommendation information is obtained. Here, obtaining the plurality of parameters may be to check some information stored in the user device 102.

In this case, the plurality of parameters may be a dream name (e.g., a job or role name), a dream field, an action goal, an ability, a number of cheers, a number of star pieces, user information (e.g., registered friend information, age, gender, location, etc.), and the like.

The plurality of parameters may be categorized into a plurality of types. For example, the plurality of parameters may be categorized into a first type of parameter, a second type of parameter, and a third type of parameter. The server 101 may appropriately utilize the plurality of classified parameters provided via the user device 102 to recommend modifiers.

In a more specific example, the first type of parameter may be determined based on dream information (e.g., dream name or dream field). The parameter of the first type may be determined based on dream information (e.g., dream name or dream field) set by the user. Further, the first type of parameter may be determined based on an action goal or ability set by the user.

For example, when the user device 102 or the server 101 recommends a modifier based on the first type of parameter, the recommended modifier may be a modifier that is directly related to a dream based on a job name, a role name, or the like. In addition, the recommended modifiers may be modifiers that are indirectly related to the dream based on the field of the occupation or role.

The second type of parameter can be determined based on personal information.

The second type of parameter may be determined based on information related to the user's age, gender, geographic region, etc. Alternatively, the second type of parameter may be determined based on the user's registered friends. In addition, the second type of parameter may be determined based on information about the user's interests, such as information about posts that the user has supported.

In an example, when the user device 102 or the server 101 recommends modifiers based on the second type of parameter, the recommended modifiers may be any one of modifiers set by users of a similar age to the user, modifiers set by users of the same gender as the user, modifiers set by people active in a similar geographic area to the user, and modifiers set by people active in the user's neighborhood. In another example, when the user device 102 or the server 101 recommends a modifier based on the second type of parameter, the recommended modifier may be one of the following: a modifier set by a friend of the user, a modifier set by an author of a post that the user has supported.

The third type of parameter may be determined based on posts uploaded to the server 101. For example, the third type of parameter may be determined based on posts uploaded to the server 101 that satisfy a predetermined criterion, such as posts with a high number of views over a period of time.

For example, when the user device 102 or the server 101 recommends modifiers based on the third type of parameter, the recommended modifiers may be modifiers contained in posts uploaded to the server 101 that satisfy predetermined criteria.

The server 101 or the user device 102 may determine the plurality of parameters and determine the recommended modifier based on the determined parameters. The server 101 or the user device 102 may use at least one of the plurality of parameters described above to determine the suggested modifier.

According to one embodiment, the server 101 or the user device 102 may determine the recommended modifiers based on the user's dream information (e.g., dream name or dream field). For example, the server 101 or the user device 102 may determine the recommended modifiers to be modifiers associated with a dream name set by the user or a dream field to which the dream name belongs. As a more specific example, if the dream name set by the user is "baseball player," the server 101 or the user device 102 may determine as recommended modifiers modifiers related to "baseball player," such as "exercises every day," etc.

In other embodiments, the server 101 or the user device 102 may determine the suggested modifiers based on personal information. For example, the server 101 or the user device 102 may determine the suggested modifiers to be modifiers associated with the user's personal information, such as the user's age, gender, and geographic region. As a more specific example, the server 101 or the user device 102 may determine the suggested modifiers to be modifiers set by other users in a similar age range to the user's age. Further, the server 101 or the user device 102 may determine that the suggested modifiers are modifiers set by other users who have the same gender as the user. Furthermore, the server 101 or the user device 102 may determine the suggested modifiers to be modifiers set by other users who are active in the region where the user is active.

According to other embodiments, the server 101 or the user device 102 may determine the suggested modifier based on post information stored in the server 101. For example, the server 101 or the user device 102 may determine the suggested modifier based on daily information stored in the server 101 by the user input. As a more specific example, the server 101 or the user device 102 may determine the suggested modifiers to be modifiers related to words or images that are commonly used in posts uploaded by the user.

The server 101 may cause the user device 102 to display a screen (e.g., 1020 in FIG. 10B) on the display 160 that includes the recommended modifier determined in the above-described manner. More specifically, the server 101 may cause the user device 102 to display a screen (e.g., 1020 in FIG. 10B) on the display 160 that includes the recommended modifier when user input is obtained via the user device 102. In this case, said user input may be a touch input corresponding to an area (e.g., a specific area included in 1010 of FIG. 10A) in which certain text (e.g., the text "recommend modifier information" or the text "suggestions") is output.

[Modifier Conjugation—General].

The modifiers determined in the above-described manner may be utilized in various ways on the server 101 or the user device 102. For example, the modifiers may be the basis for recommendations of various elements (e.g., ad recommendations, action goal recommendations, friend recommendations, etc.). In other words, the server 101 or the user device 102 may recommend advertisements, action goals, and/or friends to the user based on the above modifiers. As a more specific example, the server 101 or the user device 102 may extract information related to the words or sentences comprising the formula from the formula, and may recommend advertisements, action goals, and/or friends to the user based on the extracted information.

[Suggested Role Name].

Referring to FIG. 10C, the server 101 (e.g., first processor 121) may cause the user device 102 (e.g., second processor 122) to display a screen 1030 that suggests a role name.

According to one embodiment, the role name may be determined by user selection.

The method for recommending role names and/or selecting role names can be similarly understood by referring to the description of the method for recommending modifiers and/or selecting modifiers above.

For example, the role name may be a role name selected by the user from an existing role name stored on the user device 102 or the server 101. In this case, the existing role name may be, for example, a role name established by another user.

For example, the role name may be determined by a user's selection from candidate words selected by the user device 102 or the server 101 based on certain criteria. The server 101 may cause the user device 102 to display a screen including the selected role name based on the criteria. In this case, the selected role name may be a role name that the user device 102 recommends to the user. Alternatively, the selected role name may be a role name that the user device 102 has selected as an exemplary role name for the user to reference when creating a role name.

The server 101 may perform appropriate actions in response to obtaining the user input via the user device 102. In one example, the user device 102 may obtain user input for viewing role name recommendation information. In this case, the user input may be a touch input corresponding to an area where certain text (e.g., the text "Role name information recommendation" or the text "Recommendation suggestion") is output.

The user device 102 may obtain a plurality of parameters when the user input for determining the role name recommendation information is obtained. The description of the plurality of parameters for determining the role name recommendation information may be similar to the description of the plurality of parameters for determining the modifier recommendation information, and is omitted to avoid redundant description.

[Order of Action for Modifier and Role Name Suggestions].

FIGS. 9A and 9B can be further understood with reference to the following description of FIGS. 10A, 10B, and 10C.

Referring to FIG. 9a, you can understand how modifiers are recommended based on role names.

Referring now to FIG. 9A, in operation 901, the server 101 (e.g., first processor 121) may receive, via the first communication module 151, a role name from the user device 102 (e.g., second processor 122), according to various embodiments. For example, the server 101 may obtain a role name for a user account based on user input verified via the user device 102.

In operation 903, the server 101 may determine the first group of modifiers using the at least one first keyword of the role name. For example, the server 101 may determine a prioritization of said first group of modifiers based on said at least one first keyword of said role name.

According to one embodiment, the server 101 may identify a predetermined first group of modifiers for the role name, and the priority of the first group of modifiers may be predetermined for the role name. For example, referring to FIG. 10B, the server 101 may predetermine a first modifier group (e.g., social universal), a second modifier group (e.g., achievement), a third modifier group (e.g., growth), a fourth modifier group (e.g., modifiers that focus on a style of communicating with others), and a fifth modifier group (e.g., modifiers that are popular with males ages 17-19) for a role name (e.g., environmental attendant). According to one embodiment, the server 101 may categorize the first group of modifiers in order of increasing relevance to the role name. According to one embodiment, if the role name is not obtained, the server 101 may prioritize the first group of modifiers based on the age information and gender information of the user account. For example, a younger age range may have a higher priority for a group of modifiers in the growth series, and a higher age range may have a higher priority for a group of modifiers in the self-actualization series.

According to one embodiment, the server 101 may cause a higher priority group of modifiers to be displayed at the top of the display 160 of the user device 102 over a lower priority group of modifiers.

According to one embodiment, the server 101 may identify a predetermined first set of modifiers for the role name, and may cause the user device 102 to display said predetermined first set of modifiers at the top of a group of modifiers. For example, referring to FIG. 10B, the server 101 may identify a predetermined first set of modifiers (e.g., loving, publicizing, conservationist, kind) for a role name (e.g., environmentalist), and may cause the user device 102 to display the predetermined first set of modifiers at the top of the group of modifiers. According to one embodiment, the server 101 may determine a second set of modifiers (e.g., trending modifiers) based on the number of times the user accounts have selected the modifiers within a specified time period (e.g., the last two weeks), regardless of whether the role name has been acquired, and may cause the user device 102 to display the second set of modifiers.

At operation 905, the server 101 may determine a plurality of first modifiers corresponding to each of said first modifier groups based on the age information and gender information of the user account corresponding to the user device 102.

According to one embodiment, the server 101 may determine a prioritization between a plurality of first modifiers corresponding to each of the first modifier groups based on age information and gender information of the user account. According to one embodiment, the server 101 may store the prioritized modifiers based on the age information and gender information per modifier group in the form of a table. For example, the server 101 may pre-store, in the form of a table, a prioritized list of modifiers corresponding to age information (e.g., first decade (8-10 years old), second decade (11-13 years old), third decade (14-16 years old), fourth decade (17-19 years old), etc.) and gender information (e.g., male or female) for a particular group of modifiers (e.g., social universal family). In the above example, if the age information and gender information of the user account correspond to the third decile and male, respectively, the server 101 may store the priority of the modifiers corresponding to the age information and gender information in the social universal series in the order of world peace, equality, environmental protection, and justice. According to one embodiment, referring to FIG. 10B, the server 101 may cause the user device 102 to display a plurality of first modifiers (e.g., in order of world peace, equality, environmental protection, and justice) within the same group of modifiers (e.g., social universal series) on the front side of the display 160, with the higher priority modifiers being displayed first.

In operation 907, the server 101 may transmit the plurality of first modifiers to the user device 102 via the first communication module 151.

Referring to FIG. 9b, you can understand how role names are recommended based on modifiers.

Referring now to FIG. 9B, in operation 911, the server 101 (e.g., first processor 121) may receive, via the first communication module 151, a modifier from the user device 102 (e.g., second processor 122), according to various embodiments. For example, the server 101 may obtain a modifier for a user account based on user input verified via the user device 102.

In operation 913, the server 101 may determine the first group of role names using the at least one second keyword of said modifier. For example, the server 101 may determine a prioritization of said first group of role names based on said at least one second keyword of said modifier.

According to one embodiment, the server 101 may identify a predetermined first group of role names for the modifier, and the priority of the first group of role names may be predetermined for the modifier. For example, referring to FIG. 10C, the server 101 may predetermine a first role name group (e.g., forestry business), a second role name group (e.g., mountain welfare professional), a third role name group (e.g., wood recycling industry), a fourth role name group (e.g., professional forester), and a fifth role name group (e.g., popular role names for males aged 17-19) for the modifier (e.g., mountain-loving). According to one embodiment, the server 101 may categorize the first group of role names in order of increasing relevance to the modifier. According to one embodiment, the server 101 may prioritize the first group of role names based on the age information and gender information of the user account if the modifier is not obtained. For example, a younger age range may have a higher priority for role name groups in the growth series, and a higher age range may have a higher priority for role name groups in the self-actualization series. According to one embodiment, the server 101 may analyze the at least one second keyword of the modifier and determine a priority based on a category corresponding to the modifier (e.g., direct concept, indirect concept, secondary concept).

According to one embodiment, the server 101 may cause higher priority role name groups to be displayed at the top of the display 160 of the user device 102 over lower priority role name groups.

According to one embodiment, the server 101 may identify a predetermined first set of role names for the modifier, and may cause the user device 102 to display the predetermined first set of role names at the top of a group of role names. For example, referring to FIG. 10C, the server 101 may identify a predetermined first set of role names (e.g., environmental guide, forest welfare specialist, tree doctor, forest interpreter) for the modifier (e.g., mountain lover), and may cause the user device 102 to display the predetermined first set of role names at the top of the group of role names. According to one embodiment, the server 101 may determine a second set of role names (e.g., trending role names) based on the number of times user accounts have selected the role names within a specified time period (e.g., the last two weeks), regardless of whether a modifier has been acquired, and may cause the user device 102 to display the second set of role names.

At operation 915, the server 101 may determine a plurality of first role names corresponding to each of said groups of first role names based on the age information and gender information of the user account corresponding to the user device 102.

According to one embodiment, the server 101 may determine a priority among a plurality of first role names corresponding to each of the first role name groups based on age information and gender information of the user account. According to one embodiment, the server 101 may store the prioritized role names based on the age information and gender information for each of the role name groups in the form of a table. For example, the server 101 may pre-store in a table a prioritized list of role names corresponding to age information (e.g., first band (8-10 years old), second band (11-13 years old), third band (14-16 years old), fourth band (17-19 years old), etc.) and gender information (e.g., male or female) for a particular group of role names (e.g., forestry business family). In the above example, if the age information and gender information of the user account correspond to the third category and male, respectively, the server 101 may store the priority order of the role names corresponding to the above age information and gender information in the forest business family in the order of A, B, C, and D. According to one embodiment, the server 101 may cause the user device 102 to display the plurality of first role names within the same group of role names on the front side of the display 160 with the higher priority role name.

In operation 917, the server 101 may transmit the plurality of first role names to the user device 102 via the first communication module 151.

[Actionable Goal].

Setting action goals can be important in dream communities. By setting action goals, users can be more specific about the intermediate steps they need to take to reach their "dream" end goal. By being specific and organized in their writing, users can begin to flesh out what they need to do today to achieve their vague future dreams.

Users can also feel a sense of accomplishment as they reach their goals, one by one, and move closer to their ultimate dreams. Users will also be able to certify their achievements to other users and receive rewards for doing so, which will encourage them to be more proactive in achieving their goals.

As such, setting, achieving, and recognizing action goals can serve an important function in a community that communicates in dreams. Embodiments are described herein that provide an action goal input interface and/or action goal recommendation information that can assist a user in creating an action goal.

[Action Item Content].

For purposes of this specification, an action goal may be a word or sentence about a means of achieving a dream set by a user. That is, a user may set a dream and then set an action goal to achieve that dream. By setting at least one action goal, a user can create a more specific plan to fulfill the dream they set.

Figure 11B:
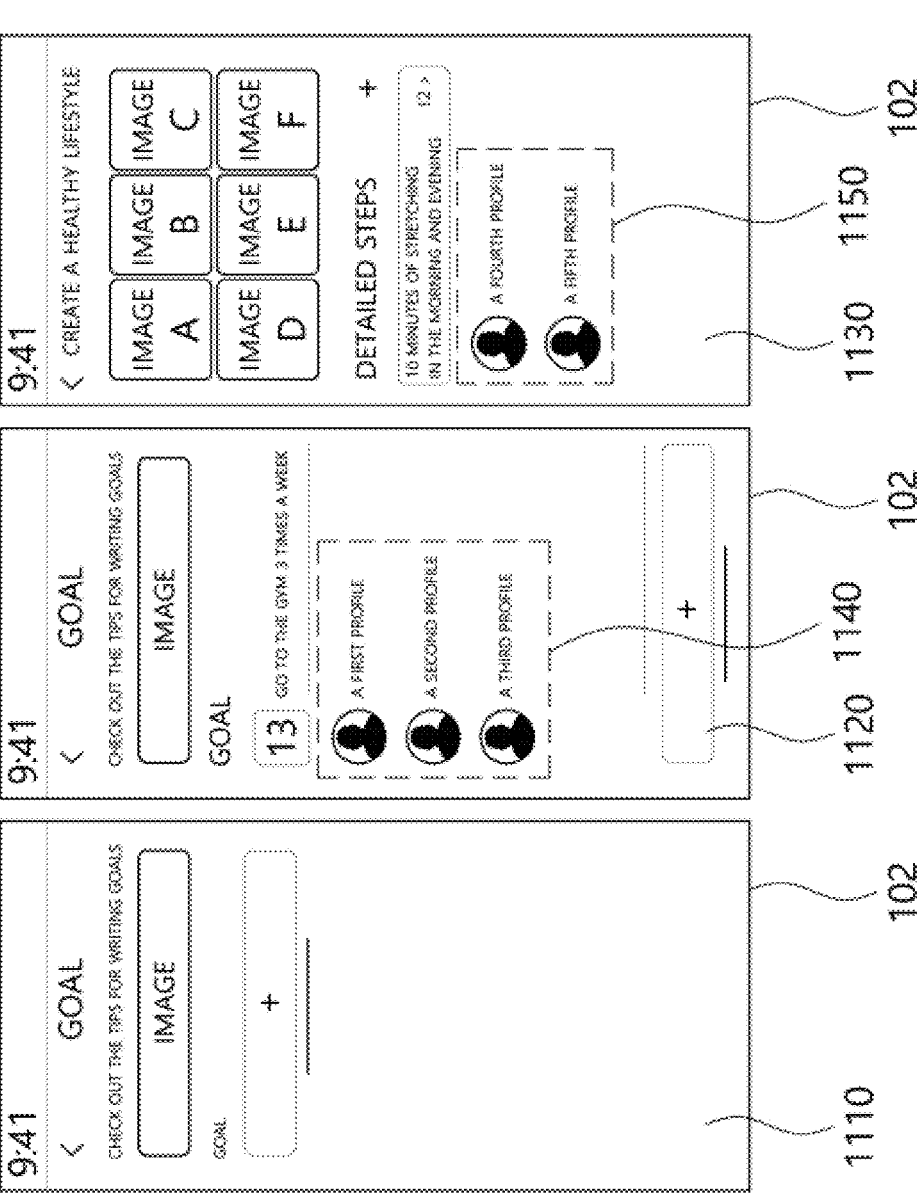

FIGS. 11A and 11B illustrate a user account's action goal setting screen for an application provided by server 101, according to various embodiments.

For example, referring to FIG. 11A, the server 101 (e.g., first processor 121) may cause the user device 102 (e.g., second processor 122) to display an action goal setting screen (e.g., 1110, 1120, 1130).

According to one embodiment, the action goal may be determined by user input. Specifically, the behavioral goal may be determined by user input via an input of the user device 102 (e.g., the second input/output interface 142 of FIG. 1 or a display 160 (e.g., a display included on a touch screen)).

In this case, the server 101 may cause the user device 102 to display guidelines on the display 160 to assist the user in entering the action goal. For example, the guidelines may relate to "how to write an action goal" to assist the user in entering the action goal. As another example, the guidelines may be various examples of action goals that are pre-stored on the user device 102 or server 101.

On the other hand, when a user sets an action goal, they may also set a goal completion count. In this case, the number of goal completions may relate to how many times the user wishes to be considered to have achieved the action goal, if the user wishes to achieve the action goal repeatedly. For example, if the action goal set by the user is "journaling for self-reflection," the user may set the number of times the user aims to achieve the action goal, such as "100 times," as the number of goal completions while setting the action goal.

At this time, the server 101 or the user device 102 may determine that the set action goal is completed if it is determined that the action goal has been performed by the number of goal completions. For example, if the set action goal is "journaling for self-reflection" and the set number of goal completions is "100", the server 101 or the user device 102 may determine that the action goal is completed when the number of authorizations for journaling for self-reflection reaches 100.

On the other hand, after setting an action goal, a user can certify the action goal they set. Specifically, the user may upload a post to certify that the user has achieved the set action goal. When uploading the post, the user may select which action goal the post is for.

[Step-by-Step Setup].

Action goals can have multiple steps. By setting action goals with multiple steps, users can better organize their plans to achieve their dreams.

For example, an action goal can be set in two separate phases. More specifically, the action goal may include a first action goal and a second action goal. In this case, the second action goal may be a sub-goal of the first action goal, i.e., the first action goal is a high-level action goal, and the second action goal is a low-level action goal for achieving the first action goal. In other words, the second action goal may be a more specific action goal required to achieve the first action goal. On the other hand, the second action goal that is a sub-goal of the first action goal may be set in plurality.

As a more specific example, if your dream is to be a baseball player, your first action goal might be "Build lower body strength". In this case, the second action goal could be a specific action goal required to achieve the first action goal, such as "jump rope 50 times".

In another example, referring to FIG. 11A, if the first action goal set by the user is "create a healthy lifestyle", the second action goal may be "stretch 10 minutes in the morning and evening", "perform 40 minutes of aerobic exercise", "stretch 10 minutes", "drink at least 2 liters of water per day", etc. that are required to achieve the first action goal.

On the other hand, an action goal may be set in n steps, in which case the action goal may include n action objectives, separated in the manner described above.

According to one embodiment, the server 101 may cause the user device 102 to display a plurality of first profiles associated with said first action goal or a plurality of second profiles associated with said second action goal when the server 101 verifies an input from the user account to the user device 102 for a first action goal or a second action goal. For example, referring to FIG. 11B, when a first action goal (e.g., take a gym stamp three times a week) is entered by the user account, the server 101 analyzes the text of the first action goal and determines that a profile having a text match rate with said first action goal is greater than a predetermined value (e.g.: 80%) or greater, the user device 102 may search for profiles that have set the action goal, and may cause the user device 102 to display a pop-up screen 1140 that includes a plurality of first profiles that satisfy certain criteria (e.g., profiles selected in order of increasing number of cheers, profiles selected in order of increasing number of goals, profiles selected in order of increasing number of posts, etc.) among said searched profiles. In another example, referring to FIG. 11B, when a second action goal (e.g., 10 minutes of stretching in the morning and evening) is entered by the user account, the server 101 may analyze the text of the second action goal to determine whether the text match rate with the second action goal is greater than a predetermined value (e.g.: 80%) or more, and may search for profiles that have set the action goal, and may cause the user device 102 to display a pop-up screen 1150 that includes a plurality of second profiles that satisfy certain criteria among said searched profiles (e.g., profiles selected in order of increasing number of cheers, profiles selected in order of increasing number of goals, profiles selected in order of increasing number of posts, etc.).

[Set by Time of Day].

Action goals can be set chronologically. By setting action goals chronologically, users can distinguish between action goals that need to be accomplished in the short term to fulfill their dreams and those that need to be accomplished in the medium to long term. This allows users to create a more organized plan to achieve their dreams on a timeline.

Figure 12:
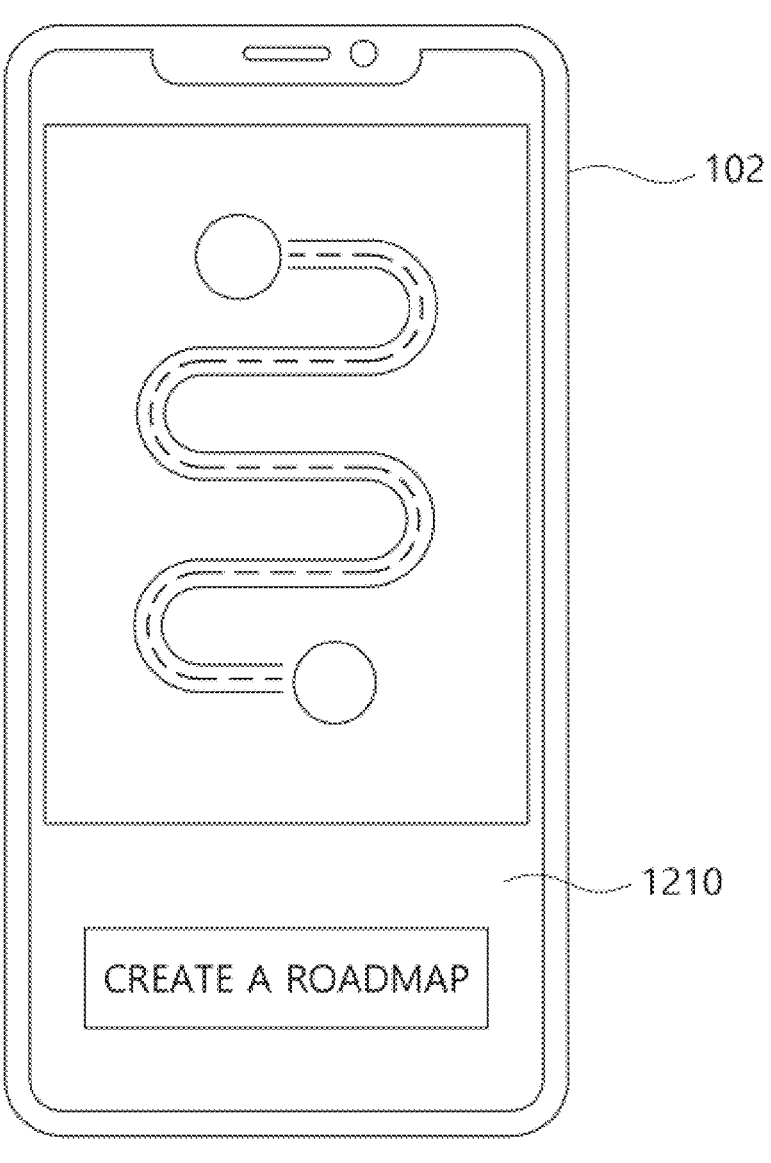
FIG. 12 is a diagram to illustrate the operation of a server and a user device, according to various embodiments.

FIG. 12 is a diagram to illustrate the operation of server 101 and user device 102, according to various embodiments.

According to various embodiments, the server 101 (e.g., the first processor 121) may cause the user device 102 (e.g., the second processor 122) to display a screen 1210, on the display 160, for setting a time series of action goals.

According to one embodiment, the action goals may include short-term action goals and long-term action goals. A short-term action goal may be an action goal to be achieved within a predetermined time period. Further, the long-term action goal may be an action goal to be achieved after a predetermined period of time. In other words, the short-term action goal may be an action goal to be achieved before the long-term action goal. For example, the short-term action goal may be an action goal to be achieved within one year, and the long-term action goal may be an action goal to be achieved after one year.

For a more specific example, if a user's dream is to play baseball, a short-term action goal might be "Join a middle school baseball club," and a long-term goal might be "Get drafted into professional baseball.

According to another embodiment, when a user sets an action goal, the user can also set an achievement time point, i.e., the user can predetermine the action goal they want to achieve and when they want to achieve it.

As described above, when a user sets a behavioral goal in a time series, the server 101 may cause the user device 102 to display the set behavioral goal in a time series on the display 160. In addition, the user device may manage the set behavioral goal in a time series. For example, the server 101 may cause the user device 102 to determine whether the user has achieved the action goal based on a predetermined achievement time point and provide feedback thereon.

[Recommend an Action Goal].

Figure 14:
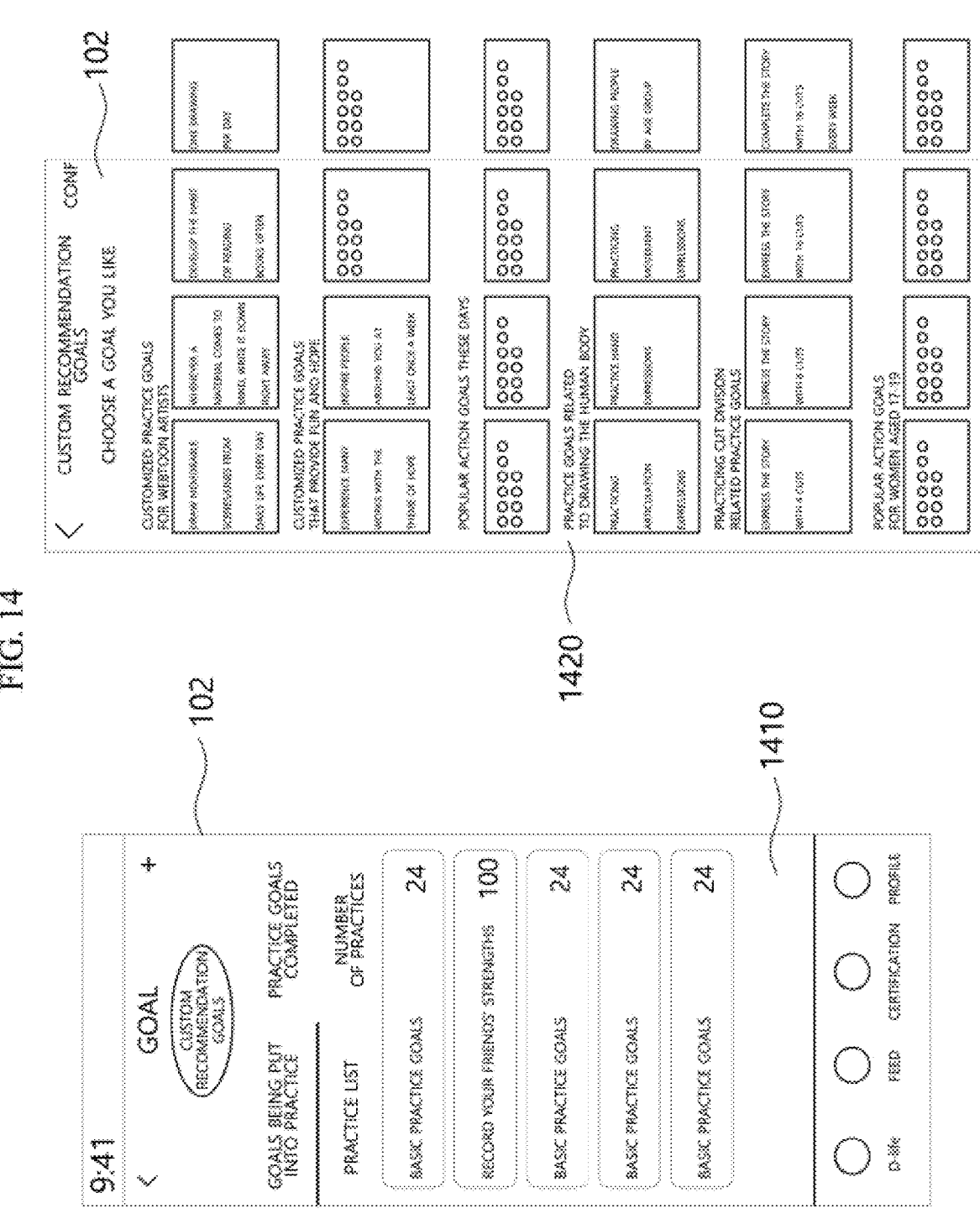
FIG. 14 is a diagram to illustrate how a server and a user device may operate, according to various embodiments.

FIG. 13 is a flowchart to illustrate how the server 101 and user device 102 may operate, according to various embodiments. FIG. 14 is a diagram to illustrate how the server 101 and user device 102 may operate, according to various embodiments.

Referring to FIGS. 13 and 14, it is possible to understand how an action goal can be recommended. Below, FIG. 14 is described, followed by a description of FIG. 13.

The action goals may be entered by the user, but in some cases, it may be vague and difficult for the user to set any action goals to fulfill the dream. Accordingly, according to one embodiment of the present disclosure, to help a user set appropriate action goals, the server 101 or the user device 102 may recommend one or more action goals to the user that are necessary to fulfill the set dream. In the following, a method of recommending action goals will be described.

The user may select an action goal from one or more action goals recommended by the server 101 or the user device 102.

For example, the user may select an action goal from any of the existing action goals stored on the user device 102 or the server 101. The existing action goal may be, for example, an action goal that has been set by another user.

In another example, the action goal may be determined by a user's selection from candidate words or candidate sentences selected by the user device 102 or the server 101 based on certain criteria. That is, the server 101 may cause the user device 102 to provide the user with a selected action goal based on certain criteria. In this case, the selected action goal may be an action goal recommended to the user by the server 101 or the user device 102. Alternatively, the selected action goal may be an action goal that has been selected as an exemplary action goal for the user to reference in creating the action goal.

The server 101 may perform appropriate actions in response to obtaining the user input via the user device 102. In one example, the user device 102 may obtain user input for viewing action goal recommendation information. In this case, the user input may be a touch input corresponding to an area where certain text (e.g., the text "action goal recommendation" or the text "recommendation suggestion") is output.

The user device 102 may obtain a plurality of parameters when the user input for determining the action goal recommendation information is obtained. Here, obtaining the plurality of parameters may be to verify some information stored in the user device 102.

In one aspect, the plurality of parameters may be a dream name (e.g., a job name or role name), a dream field, an action goal, an ability, a number of cheers, a number of star pieces, user information (e.g., registered friend information, age, gender, region of residence, etc.), and the like. In other words, the server 101 or the user device 102 may determine a recommended action goal based on at least one of the plurality of parameters described above.

The plurality of parameters may be categorized into a plurality of types. For example, the parameters may be categorized as a first type of parameter, a second type of parameter, and a third type of parameter. The user device may appropriately utilize the plurality of classified parameters to recommend an action goal.

The first type of parameter may be determined based on dream information, the second type of parameter may be determined based on personal information, and the third type of parameter may be determined based on information stored on a user device or a server. More specific details in this regard have been described above in the method for recommending modifiers, so redundant details will be omitted. The server 101 may cause the user device 102 to display a screen (e.g., 1020 in FIG. 14) on the display 160 that includes the recommended action goal determined by the method described above. More specifically, the server 101 may cause the user device 102 to display a screen (e.g., 1420 in FIG. 14) on the display 160 that includes the recommended action goal when user input is obtained via the user device 102. In this case, said user input may be a touch input corresponding to an area (e.g., a specific area included in 1410 of FIG. 14) in which certain text (e.g., the text "recommend action goal" or the text "suggestion") is output.

[Step-by-Step Recommendation].

The server 101 or the user device 102 may recommend action goals to the user in stages. The action goal may be divided into a plurality of steps (e.g., end goals, intermediate goals, and detailed goals) as described above. In this case, the server 101 or the user device 102 may recommend each action goal corresponding to the plurality of steps separately, thereby providing the user with action goals that are more appropriate for each step.

The action goal may include a first action goal and a second action goal, wherein the server 101 or the user device 102 may, in a first step, recommend the first action goal and, in a second step, recommend the second action goal based on the first action goal.

The second action goal can be a sub-action goal of the first action goal. For example, the second action goal may be a detailed action goal to achieve the first action goal. For example, the first action goal may correspond to a final action goal, and the second action goal may correspond to an intermediate action goal to achieve said final action goal.

The server 101 or the user device 102 may recommend an action goal, such as a first action goal and/or a second action goal, based on the at least one or more parameters as described above.

The second action goal may be determined based on the first action goal and the recommended action goal determined based on the at least one parameter described above. Specifically, the second action goal may be selected as an action goal that has a certain threshold of association with the first action goal among the recommended action goals.

For example, the second action goal may be selected as one of the suggested action goals that has a certain level of relevance to the word or sentence comprising the first action goal. As a more specific example, if the first action goal is "get fit," the second action goal may be selected from among the suggested action goals above that have a predetermined level of relevance to the word "fitness.

On the other hand, an action goal may include a third action goal. The third action goal may be a sub-action goal of the second action goal described above. For example, the third action goal may be a detailed action goal that is determined to achieve the first action goal or the second action goal. For example, the third action goal may correspond to a detailed action goal that is determined to achieve an intermediate action goal that corresponds to the second action goal.

The third action goal may be determined based on the first action goal and the second action goal and the recommended action goal determined based on the at least one parameter described above. Specifically, the third action goal may be selected as an action goal whose association with the first action goal and the second action goal among the recommended action goals is above a certain threshold. For example, the third action goal may be selected as a goal that has a certain level of relevance to the words or sentences comprising the first action goal and the second action goal among the recommended action goals.

[Recommendations by Type].

The server 101 or the user device 102 may recommend a type of action goal to the user. An action goal may be categorized into a plurality of types. For example, an action goal may include a first type action goal that satisfies a first criterion and a second type action goal that satisfies a second criterion. At this time, the server 101 or the user device 102 may recommend the first type of action goal and the second type of action goal to the user.

According to one embodiment, the criteria for categorizing an action goal into the plurality of types described above may be based on its association with a first parameter of an existing action goal stored on the user device 102 or the server 101. In this case, the first parameter may be associated with a dream set by the user, such as a job title, role title, or modifier.

In this case, among the existing action goals stored in the user device 102 or the server 101, an action goal whose association with the first parameter is above a predetermined value may be categorized as a first type action goal. Furthermore, if the association with the first parameter among the existing action goals stored in the user device 102 or the server 101 is less than a predetermined value, the action goal may be categorized as a second type action goal.

Specifically, the first type of action goal can be an action goal that is highly relevant to one of the user-set job titles, role titles, or modifiers. Additionally, the second type of action goal may be an action goal that is less relevant to the user's job title, role title, or modifier. For example, if the user's job title is baseball player, the first type of action goal may be an existing action goal that is highly relevant to the baseball player, such as "play catch".

On the other hand, the second type of action goal is not directly related to a user's dream, for example, it can be a common action goal that each user can aim for regardless of the type of dream they have set. For example, the second type of action goal might be "build good character" or "get fit".

[Recommended by Dreamforce].

The server 101 may cause the user device 102 to recommend action goals to the user based on the dream power. In this case, the dream power may be determined based on the degree to which the user's dream is materialized. Multiple users of the community may have different degrees of materialization (i.e., dream power) for their dreams, and the server 101 or the user device 102 may recommend action goals that are more appropriate for the user based on said dream power.

Specifically, the dream power may be a metric that distinguishes a plurality of levels (e.g., from a first level to a third level) based on the degree to which the user's dream is materialized. In this case, if the server 101 or the user device 102 determines that the user's dream power is at the first level, the server 101 or the user device 102 may recommend to the user a basic action goal (e.g., a low-difficulty action goal) that is required to fulfill the dream. Additionally, the server 101 or the user device 102 may recommend more specific action goals (e.g., more challenging action goals) to fulfill the dream to the user if the server

101 or the user device 102 determines that the user's dream power is at the third level. Specific methods for recommending action goals based on dream power will be described later in the description of FIGS. 13 and 14 below.

[How Action Goals are Recommended].

According to one embodiment, the server 101 may cause the user device 102 to present the recommended action goal to the user via the display 160 in the manner described above when the user device 102 receives a touch input corresponding to the action goal recommendation area. In other words, according to one embodiment, the server 101 may cause the user device 102 to present the recommended action goal to the user at a time when the user wants to be recommended an action goal.

In another embodiment, the server 101 may cause the user device 102 to present the recommended action goal to the user via the display 160 in the manner described above if the user device 102 satisfies a predetermined condition based on the user's activity log. The server 101 may cause the user device 102 to provide the recommended action goal to the user at a time determined based on the predetermined criteria, regardless of the user's intention.

The activity log may include information about the user's activity on the application. For example, the activity log may include the length of time the user has been active on the application, when the user first set up a job title (or role title, modifier), when the user most recently set up a job title (or role title, modifier), when the user first set up an action goal, when the user most recently set up an action goal, the number of times the action goal was verified, and/or when the action goal was verified.

For example, the server 101 may cause the user device 102 to display the recommended action goal on the display 160 at a time that is a certain period of time after the user first set the occupation name. Alternatively, the server 101 may cause the user device 102 to display the recommended action goal on the display 160 if the number of times the user authenticates the action goal is above a predetermined threshold. Alternatively, the server 101 may cause the user device 102 to display the recommended action goal on the display 160 after a certain amount of time has passed since the user set the most recent action goal.

The action goals determined in the above-described manner may be utilized in various ways on the server 101 or the user device 102. For example, the action goals may be the basis for recommendations of various elements (e.g., ad recommendations, formula recommendations, friend recommendations, etc.). In other words, the server 101 or the user device 102 may recommend advertisements, formulas, and friends to the user based on the above behavioral goals.

As a more specific example, the server 101 or the user device 102 may extract information related to the words or sentences comprising said action goal from said action goal, and recommend advertisements, modifiers, and friends to the user based on the extracted information.

[Action Goal Recommended Action Sequence].

FIG. 13 can be further understood with reference to the description of FIG. 14.

Referring to FIG. 13, in operation 1301, server 101 (e.g., first processor 121) may receive, via first communication module 151, a modifier and role name from user device 102 (e.g., second processor 122), according to various embodiments. For example, the server 101 may obtain the modifier and role name for a user account based on user input verified via the user device 102.

In operation 1303, the server 101 may determine a plurality of first action goals based on the at least one keyword of the modifier. The plurality of first action goals may be predetermined for said at least one keyword. For example, the server 101 may identify a first keyword "fun" and a second keyword "hope" in the modifier "fun and hopeful", and may identify a plurality of first action goals predetermined for said first keyword and said second keyword.

At operation 1305, the server 101 may determine at least one first action goal of the plurality of first action goals based on a count of goals set by the user account, a count of posts for said goals, and a count of full images for said posts.

According to one embodiment, the server 101 may determine the dream power based on the total number of posts (A) of the user account, the total number of authentication photos (B) for the posts, and the total number of goals (C) for the user account. For example, the server 101 may calculate a dream power score for a particular user account based on a formula (e.g., $0.7A+0.3B+2C$ (wherein the maximum value of $2C$ is 20)), and may set the dream power of the user account to beginner if the dream power is in the range of 0 to 199 points, set the dream power of the user account to intermediate if the dream power is in the range of 199 to 599 points, and set the dream power of the user account to advanced if the dream power is in the range of 600 points or more. According to one embodiment, the server 101 may determine a placement order of the at least one first action goal among the plurality of first action goals based on the level of the user account's dream power. For example, referring to FIG. 14, the server 101 may determine the order of placement of the at least one first action goal based on the obtained modifier (e.g: fun and uplifting), the server 101 may determine the order of placement of the at least one first action goal to be recommended in the following order: beginner, intermediate, advanced; if the user account's dream power level is beginner, the server 101 may determine the order of placement of the at least one first action goal to be recommended in the following order: intermediate, advanced, beginner; if the user account's dream power level is advanced, the server 101 may determine the order of placement of the at least one first action goal to be recommended in the following order: advanced, intermediate, beginner. Accordingly, the server 101 may cause the user device 102 to display the at least one first action goal for the modifier in a placement order determined based on the level of dream power. In this case, it is assumed that each action goal is pre-designated as one of beginner, intermediate, or advanced. The same behavior can be applied to determining which action goals to recommend based on keywords in the role name and the order of placement of the action goals.

In operation 1307, the server 101 may determine a plurality of secondary action goals based on the first specific action goal set by the user account. The plurality of second action goals may be predetermined with respect to the first specific action goal. For example, the server 101 may identify a keyword (e.g., human body, drawing, practice) from the first specific action goal (e.g., practice drawing a human body), and may identify a plurality of second action goals (e.g., practice expressing joints, practice expressing hands, etc.) predetermined for the keyword. According to one embodiment, the server 101 may determine that the predetermined action goals are in the same family as the action goals registered to the user account. According to one embodiment, the server 101 may determine action goals that correspond to the current point in time, regardless of the action goals registered to the user account. For example, if the current time corresponds to a vacation period, the server 101 may determine action goals to recommend for the vacation period, if the current time corresponds to a new year, the server 101 may determine action goals to recommend for the new year, and if the current time corresponds to a new semester, the server 101 may determine action goals to recommend for the new semester. According to one embodiment, the server 101 may determine the goal first set by the user account as the first specific action goal. According to one embodiment, the server 101 may cause the user device 102 to display a plurality of second action goals corresponding to the first specific action goal on top of a plurality of third action goals corresponding to the second specific action goal. In this case, the second specific action goal may be a second goal set by the user account, and the plurality of third action goals corresponding to the second specific action goal may be action goals determined for the second specific action goal in the same manner as described above under "Method for determining the plurality of second action goals based on the first specific action goal".

At operation 1309, the server 101 may determine at least one second action goal from the plurality of second action goals, based on the number of posts and images for said first specific action goal.

According to one embodiment, the server 101 may determine a goal progress for the first specific action goal based on the number of posts (D) for the first specific action goal and the number of images (E) for the first specific action goal registered in the user account. For example, the server 101 may calculate a score of the goal progress for the first specific action goal based on a formula (e.g., $0.7D+0.3E$), and may set the goal progress for the action goal as beginner if the goal progress falls in the range of 0 to 99 points, set the goal progress for the action goal as intermediate if the goal progress falls in the range of 100 to 299 points, and set the goal progress for the action goal as advanced if the goal progress falls in the range of 300 points or more. According to one embodiment, the server 101 may determine a placement order of the at least one second action goal among the plurality of action goals based on the level of goal progress of the user account. For example, referring to FIG. 14, the server 101 may determine the order of placement of the at least one second action goal to be recommended as beginner, intermediate, and advanced if the level of goal progress for the first action goal registered in the user account is beginner, and the level of goal progress for the first action goal registered in the user account is intermediate, the order of placement of the at least one second action goal to be recommended can be determined as intermediate, advanced, and beginner, and if the level of goal progress for the first action goal registered in the user account is advanced, the order of placement of the at least one second action goal to be recommended can be determined as advanced, intermediate, and beginner. Accordingly, the server 101 may cause the user device 102 to display the at least one second action goal for the first specific action goal in a placement order determined based on the level of goal progress for the first specific action goal.

In operation 1311, the server 101 may transmit the at least one first action goal and the at least one second action goal to the user device 102 via the first communication module 151. According to one embodiment, the server 101 may cause the user device 102 to display the action goals determined based on the role name on top of the action goals determined based on the modifier. According to one embodiment, the server 101 may cause the user device 101 to display the determined action goals based on the modifier.

[Timeline].

Users can organize their dreams, resolutions, and more on a timeline. Users can upload all kinds of data, and being able to organize that data chronologically on a timeline can be an important feature for users or admins.

Given the nature of dream communities, it's important to manage a variety of data in a time series.

For example, a dream can be continuously changed by the user. Further, a dream may be set by a user based on the present, or it may be set based on the future (e.g., near or far future). As such, the management of dreams, which may change continuously from a point in the past to a point in the future, may be more effective when done chronologically over a timeline.

As another example, an action goal may be set by a user in the present, or it may be set in the future. Furthermore, the action goals need to be managed in terms of what action goals the user has set to achieve the dream, and what action goals have been achieved to date. Due to the nature of these action goals, it is necessary to manage the time series on the timeline of what action goals have been set and how many action goals have been achieved and certified from the past to the future.

[Timeline Component]—Storage Information (Content Information/Setup Information)

This specification describes a method of providing data stored on a server 101 on a timeline so that various kinds of information entered by a user can be stored and managed in a time series.

The server 101 may cause the user device 102 to provide functionality to store or manage data entered by the user based on when the data was entered. Specifically, the server 101 may cause the user device 102 to store information stored by the user input in a time-series categorized manner and/or display the time-series categorized manner on the display 160.

As a result, users can keep track of how their job titles, roles, modifiers, etc. have changed in the past relative to the present. In addition, users can see on a timeline what action goals they have set in the past to achieve their dreams and what action goals they have achieved, allowing them to be more organized.

The stored information may include content information and settings information. The content information may be posts uploaded by the user, such as images, videos, texts, and the like. In addition, the configuration information may include job names, role names, modifiers, action goals, abilities, etc. set by the user.

The setting information may include past setting information and current setting information. For example, the current setting information may relate to job names, role names, modifiers, action goals, abilities, and the like that are stored by user input that are maintained as of the current time. In addition, the historical configuration information may relate to job titles, role titles, modifiers, action goals, abilities, and the like that were set in the past and stored as historical information by the new configuration information.

[How to Expose the Timeline].

The server 101 may cause the user device 102 to display on the display 160 how the configuration information (e.g., any one of an occupation name, a role name, a modifier, an action goal, or an ability) is changing. For example, the server 101 may cause the user device 102 to display on the display 160 a time series of occupation names that were set in the past and occupation names that are currently set in the present. Alternatively, the server 101 may cause the user device 102 to display on the display 160, chronologically, an occupation name that was set in a first interval in the past, an occupation name that was set in a second interval in the past, and an occupation name that is currently set. Alternatively, the server 101 may cause the user device 102 to display the changed occupation name on the display 160 each time the occupation name is changed.

Figure 15:
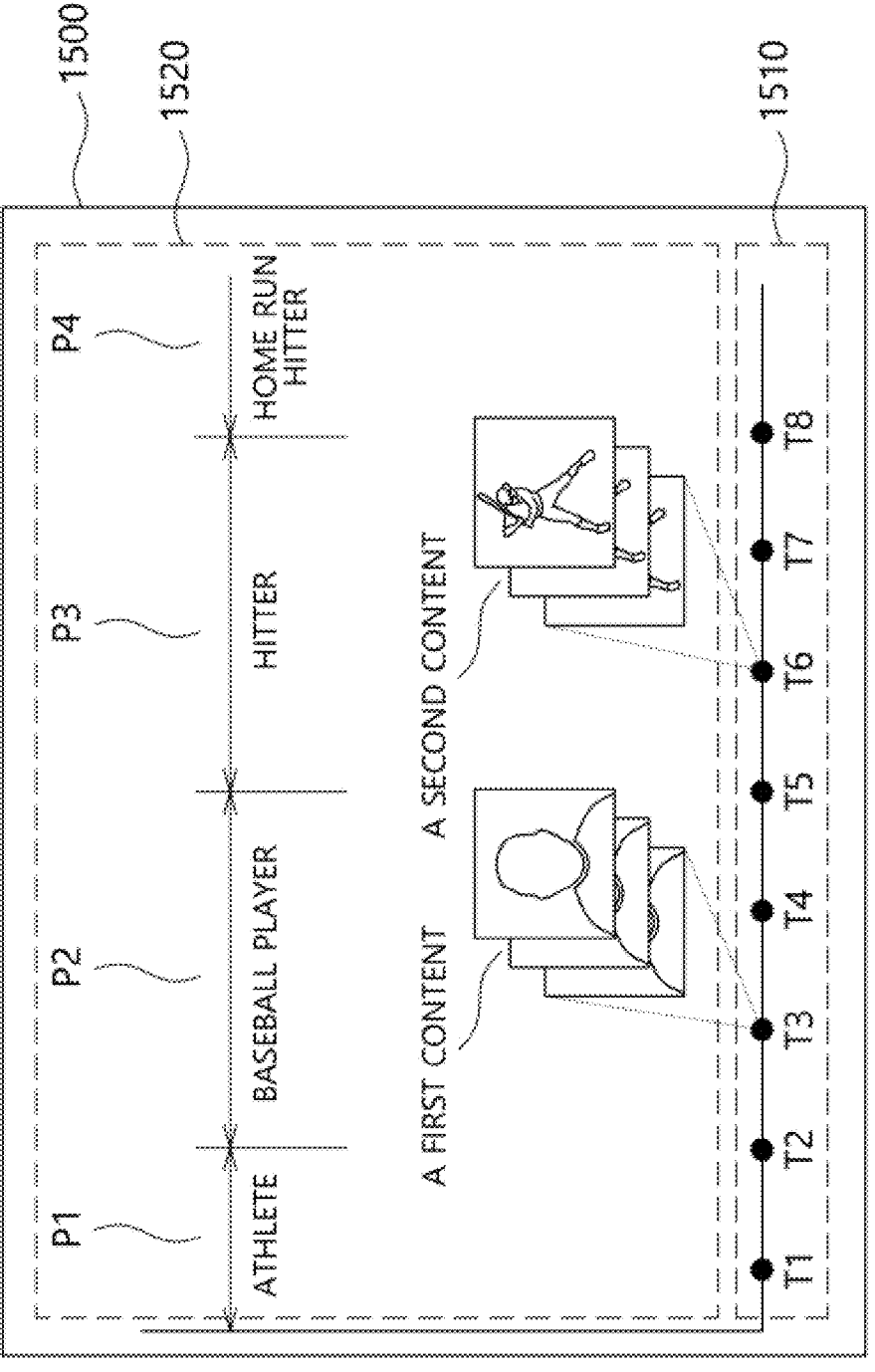
FIG. 15 illustrates a screen of a user account provided by a server to a user device, according to various embodiments.

FIG. 15 illustrates a screen of a user account that server 101 provides in an application, according to various embodiments.

Referring to FIG. 15, the server 101 may cause the user device 102 to display a screen 1500. The screen 1500 may include a timeline display area 1510 and a data display area 1520.

The server 101 may cause the user device 102 to output date information T1 through T8 that is displayed chronologically in the timeline display area 1510 of the screen 1500. For example, the date information may be displayed to be separated by days, months, years, and the like. In this case, T8 may refer to the current time, and the timeline display area 1510 may display a plurality of past time points T1 to T7 by a certain criterion relative to the current time point T1.

The server 101 may cause the user device 102 to display the content information or setting information described above in the data display area 1520 of the screen 1500. In this case, the content information and setting information may be displayed in the form of text or images.

Further, the server 101 may cause the user device 102 to display data processed from the content information and setting information described above in the data display area 1520 of the screen 1500. For example, the server 101 may cause the user device 102 to display the number of content uploaded by the user in the data display area 1520 of the screen 1500. As another example, the server 101 may cause the user device 102 to display the total number of action goals set by the user and the total number of action goals that have been authenticated among the action goals set. In addition, content information and setting information processed in various other ways may be displayed on the data display area 1520 of the screen 1500.

The server 101 may cause the user device 102 to display a plurality of segments separated by predetermined criteria in the data display area 1520 of the screen 1500. The plurality of bins may be distinguished by user-set dream names. For example, the plurality of intervals may be separated based on when the user-set dream name changes.

For example, the dream name set by the user was a first name at a first time point, changed to a second name at a second time point, and changed to a third name at a third time point, and the first time point to the third time point may be a time point past the current time point. In this case, on the timeline display area 1510, the period before the first time point may be defined as the first segment, the period between the first time point and the second time point as the second segment, the period between the second time point and the third time point as the third segment, and the period between the third time point and the current time point as the fourth segment.

As a more specific example, if the dream name is changed by the user to "baseball player" at Time 2 (T2), "batter" at Time 5 (T5), and "home run hitter" at Time 8 (T8), the period before Time 2 (T2) can be defined as Period 1 (P1), the period between Time 2 (T2) and Time 5 (T5) as Period 2 (P2), and the period between Time 5 (T5) and Time 8 (T8) as Period 3 (P3).

In addition, each of the above-described segments displayed in the data display area 1520 may be accompanied by the user's dream information, such as occupation, role, or modifier, that is set for each of the above-described segments. Accordingly, the user may be able to view a time series of how his or her dreams have evolved over time in each of the bins on the timeline.

The server 101 may cause the user device 102 to display the content information entered by the user in the data display area 1520 based on information about the time at which said content information was entered. For example, the server 101 may cause the user device 102 to display the content information in the data display area 1520 corresponding to a day point in the timeline display area 1510 at which the content information was entered.

More specifically, if the user uploaded the first content at time point 3 (T3), the server 101 may cause the user device 102 to display the first content in the data display area 1520 at a point on the timeline corresponding to time point 3 (T3). Similarly, if the user uploaded the second content at time point T6, the server 101 may cause the user device 102 to display the second content in the data display area 1520 at a point corresponding to time point T6 on the timeline. In this way, the first content and the second content may be displayed on the data display area 1520 in a time series, and accordingly, the various contents uploaded by the user may be managed in a time series.

Figure 16:
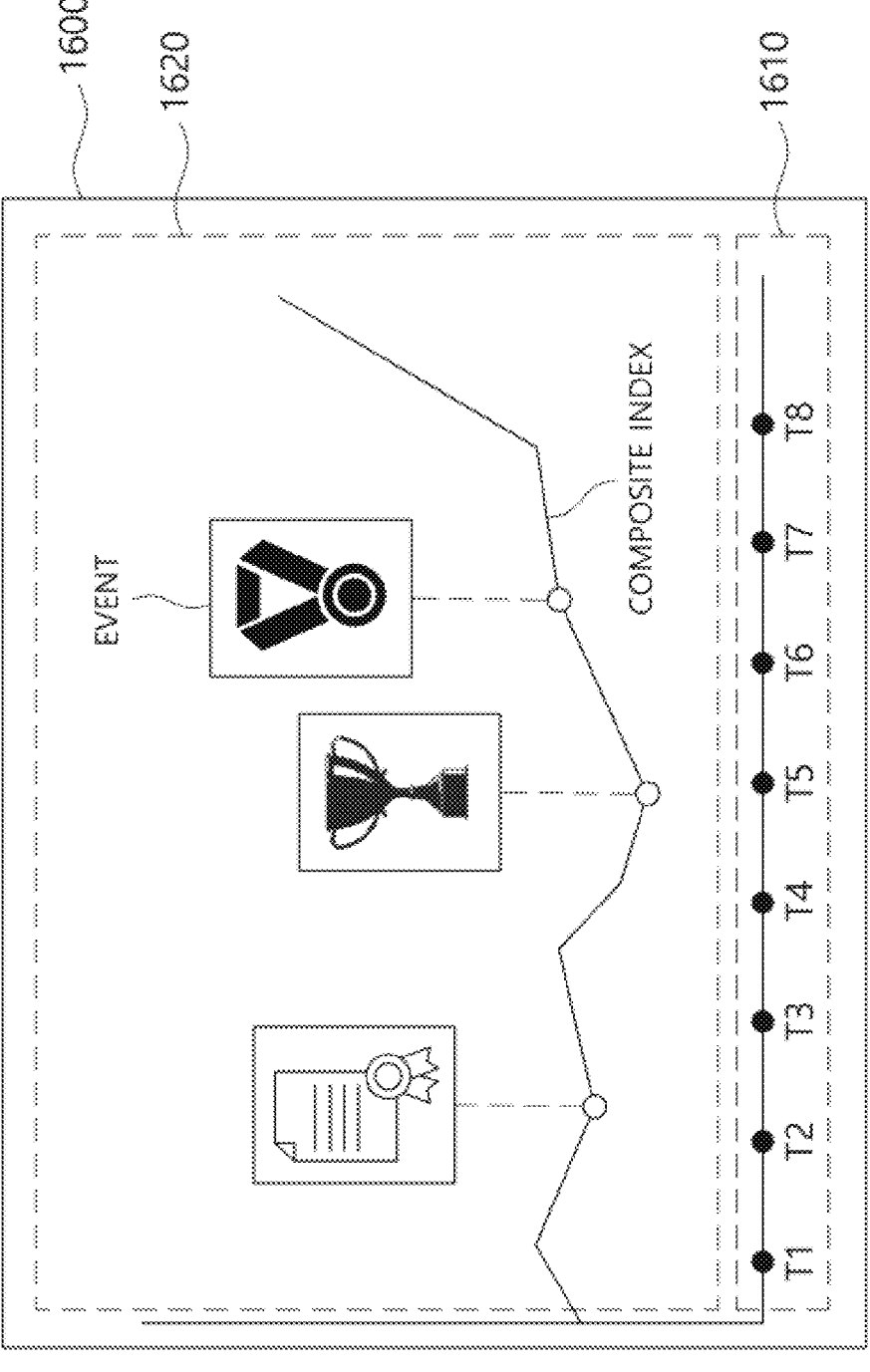
FIG. 16 illustrates a user account screen provided by a server to a user device, according to various embodiments.

FIG. 16 illustrates a screen of a user account that server 101 provides in an application, according to various embodiments.

Referring to FIG. 16, the server 101 may cause the user device 102 to display a screen 1600. The screen 1600 may include a timeline display area 1610 and a data display area 1620.

The server 101 may cause the user device 102 to display certain event information on the data display area 1620 of the screen 1600. The event information may be information related to some sort of accomplishment, such as, for example, winning a contest, winning a competition, winning a scholarship, etc.

The server 101 may cause the user device 102 to display the event information, like the content information, based on when said event occurred. For example, the server 101 may cause the user device 102 to display the content information in the data display area 1620 corresponding to a point in the timeline display area 1610 at which the event information occurred.

More specifically, if the user has earned a trophy and the time at which the trophy was earned is time point 5 (T5), the server 101 may cause the user device 102 to display information related to the earning of the trophy at a point on the timeline corresponding to time point 5 (T5) in the data display area 1620. Similarly, if the user has earned a gold medal, and it is time point 7 (T7) at the time of said gold medal earning, the server 101 may cause the user device 102 to display information related to said gold medal earning at a point corresponding to time point 7 (T7) on the timeline in the data display area 1620.

The server 101 may cause the user device 102 to display the composite index on the data display area 1620. In this case, the composite index may be displayed in numerical or graphical form on the data display area 1620.

On the other hand, the composite index can be calculated based on information entered by the user or based on the user's activity log.

For example, the information entered by the user may include the number of comments made by the user, the number of daily posts uploaded by the user, the number of practice posts uploaded by the user, and/or the number of the user's practice certifications that were selected as best practice certifications.

In addition, exemplarily, the user's activity log may include the number of times the user accesses the application, the number of times the user supports another user's profile, the number of times the user supports another user's post, and the like.

Meanwhile, the composite index may be calculated after weighting the various parameters included in the information entered by the user and the user's activity log, respectively. In this case, the weights applied to the various parameters may be the same or different.

[How to Determine which Content is Shown on the Timeline].

As described above, various data entered by the user, such as content information and setting information, may be displayed on the timeline. At this time, the data to be exposed on the timeline among the various data entered by the user may be determined manually based on the user's selection or automatically based on predetermined criteria. The following describes a method for determining content to be displayed on the timeline among various data entered by the user.

According to one embodiment, the information exposed on the timeline may be determined by user selection.

Specifically, the server 101 may cause the user device 102 to display the first button. In this case, the user may select the first button while uploading the post, and upon receiving the user's selection of the first button via the user device 102, the server 101 or the user device 102 may determine that the post is a post to be displayed on the timeline. Thereafter, the server 101 may cause the user device 102 to display said post on the data display area of the timeline on the screen.

According to another embodiment, the information displayed on the timeline may be automatically determined based on keywords.

Specifically, the server 101 may determine whether the post is a post to be displayed on the timeline based on textual information entered by the user via the user device 102 while uploading the post. For example, the server 101 may cause the user device 102 to display the post in a data display area on the timeline if the text entered by the user via the user device 102 while uploading the post includes a predetermined keyword.

According to another embodiment, the information displayed on the timeline may be determined based on other users' reactions to the post. The reactions of other users may include, for example, the number of views of the post by other users, the number of supporters of the post by other users, and the like.

Specifically, the server 101 may determine that a post is a post to be published on the timeline if the number of views or supports from other users for the post published by the user via the user device 102 satisfies a predetermined criterion. Then, the server 101 may cause the user device 102 to automatically display the post determined to be a post to be posted on the timeline among the posts posted by the user on the timeline on the data display area of the timeline.

[Recommend a Timeline or Roadmap].

The user device may recommend a timeline or roadmap created in the manner described above to another user. For ease of explanation, the following describes how a user device may recommend a timeline to a user, which may be the same as how a user device may recommend a roadmap to a user.

FIG. 17 is a flow diagram to illustrate how server 101 and user device 102 may operate, according to various embodiments.

In accordance with various embodiments, referring to FIG. 17, at operation 1701, the server 101 (e.g., first processor 121) may search for other users to serve as mentors based on dream information of a user of the user device 102 (e.g., second processor 122). Specifically, based on the set dream information, the server 101 may determine that another user who shares the same or similar dream information as the dream information is a mentor.

In operation 1703, the server 101 may obtain timeline information of the other selected user. The timeline information may be information about a timeline created by the method described above.

In operation 1705, the server 101 may determine an embodied timed action from the timeline information of the selected other user, and may cause the user device 102 to provide the embodied timed action to the user. In this case, the refined time-specific action history may be an action goal set by the other user.

In operation 1707, the user may select an action goal to reflect on the user's timeline from the timed action history provided by the user device 102. The server 101 may, upon receiving input from the user selecting the action goal, via the user device 102, cause the user device 102 to display the action goal on the user's timeline.

On the other hand, mentors are not limited to other users of the community, but can be experts or seniors in a field related to the dream you set. In this case, the user, expert, or senior determined to be the mentor may consult (e.g., how to set action goals, how to achieve action goals, etc.) via comments or video calls on the community. More specifically, the server 101 may obtain a consulting request from a user via the user device 102, and determine a suitable mentor based on said obtained consulting request. Thereafter, the server 101 may send a message to said mentor (e.g., to said mentor's user device) requesting to become the user's mentor. Accordingly, said mentor may provide mentoring to the user via comments and/or video calls or the like within the community.

According to one embodiment of the present disclosure, the server may provide an interface for recommending jobs (role names) in other ways as described below, in addition to recommending role names using the modifiers according to FIG. 10C and providing an interface for doing so.

FIG. 18 illustrates a job recommendation screen for a user account that server 101 provides in an application, according to various embodiments.

The server 101 may cause the user device 102 to provide a corresponding interface via the display 160 to provide information recommending a job to the user.

Referring to FIG. 18, the server 101 may cause the user device 102 to display a first screen 1810 that includes at least one button 1815 for driving a job recommendation algorithm 1830, and upon obtaining user input for said at least one button 1815, may cause the user device 102 to display a second screen 1820 that corresponds to a result of said job recommendation algorithm 1830. As used herein, "buttons" does not refer to physical buttons formed on the display 160, but rather to conceptual buttons implemented such that user input corresponding to each button may be obtained. In other words, a button may be any area of the screen displayed on the display 160, and when a touch to that area is detected, input to the button may be obtained and an appropriate action may be performed.

In this case, said second screen 1820 may output at least one profession name as text based on the results of said profession recommendation algorithm 1830. For example, the second screen 1820 may display a textual representation of an occupation such as, but not limited to, "plastic surgeon," "orthopedic surgeon," "attorney," "patent attorney," "pilot," etc. based on the results of the occupation recommendation algorithm 1830.

Further, said second screen 1820 may include an action area for outputting at least one occupation name as text based on the results of said occupation recommendation algorithm 1830, and for performing at least one action if user input to said text is obtained. For example, said second screen 1820 may output the occupation name "plastic surgeon" as text and include an action area corresponding to the text area for performing an action of saving at least a portion of the user's dream name as "plastic surgeon" if a user's touch input to the text area of "plastic surgeon" output on said second screen 1820 is obtained.

In this case, the action area may be the same as the text area, but is not limited to, and may be an additional area corresponding to the text area.

Further, the second screen 1820 may output as text at least a portion of the occupation names extracted based on the results of the occupation recommendation algorithm 1830. For example, but not limited to, the second screen 1820 may output as text only six of the ten occupation names extracted based on the results of the occupation recommendation algorithm 1830.

Further, said second screen 1820 may output at least one button 1825 for accessing a third screen that displays at least a portion of the occupation names extracted according to the results of said occupation recommendation algorithm 1830 as text. In one example, but not limited to, said second screen may output at least one button 1825 for accessing a third screen that displays four of the ten occupation names extracted based on the results of said occupation recommendation algorithm 1830.

Further, the occupation names extracted according to the results of the occupation recommendation algorithm 1830 may be grouped into at least two groups. For example, if there are 10 occupations extracted based on the results of the occupation recommendation algorithm 1830, the first group may be grouped to include 6 occupations, and the second group may be grouped to include 4 occupations, but is not limited to.

In this case, the first group and the second group may be grouped based on, but not limited to, priority, score, etc.

In addition, the first group and the second group may share at least one occupational name, including but not limited to.

Further, said first group and said second group may be output as text on different screens. For example, but not limited to, the first group may be output as text on a second screen 1820 and the second group may be output as text on a third screen.

In the following sections, we'll describe the job recommendation algorithm in more detail.

Figure 19:
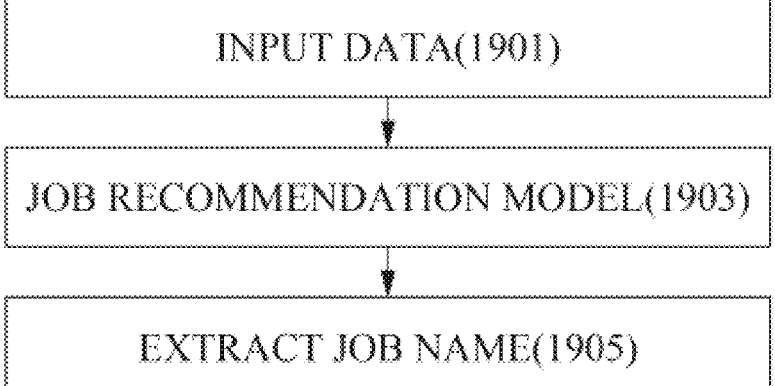
FIG. 19 is a flowchart to illustrate a job recommendation algorithm provided by a server to a user device, according to various embodiments.

FIG. 19 is a flow diagram to illustrate a job recommendation algorithm that server 101 provides in an application, according to various embodiments.

According to one embodiment of the present disclosure, an occupation recommendation algorithm may be implemented as a flow in which at least one input data is input to an occupation recommendation model (1901), an occupation name is extracted (1903) based on the occupation recommendation model (1905).

In this case, the input data may include data about the user and data about the occupation. For example, the input data may include, but is not limited to, taste information, personality information, interest information, etc. about the user, and occupational name information, occupational family information, occupational group information, etc. about the occupation.

Further, the job recommendation model may be, but is not limited to, a model for extracting a suitable job name for the user based on data about the user and data about the job.

In addition, the job recommendation model may be, but is not limited to, a model for extracting a suitable job name for the user from the data about the job based on the data about the user.

Further, the data for said occupation may be pre-stored in a database, including but not limited to.

Further, the job recommendation model may be implemented by weighting data about the user, including but not limited to.

In addition, the job recommendation model may be implemented by a machine learning method. In one example, the job recommendation model may be a model implemented through supervised learning, but it may also be a model implemented through unsupervised learning, semi-supervised learning, reinforcement learning, or the like.

Further, the job recommendation model may be implemented as an artificial neural network (ANN). For example, the job recommendation model may be implemented as a feedforward neural network, a radial basis function network, or a kohonen self-organizing network.

Further, the job recommendation model may be implemented as a deep neural network (DNN). For example, the job recommendation model may be implemented as a convolutional neural network (CNN), recurrent neural network (RNN), long short term memory network (LSTM), or gated recurrent units (GRUs).

Further, the extracted occupation name may include, but is not limited to, at least one occupation name.

In the following sections, we'll describe the input data that goes into the job recommendation model in more detail.

Figure 20:
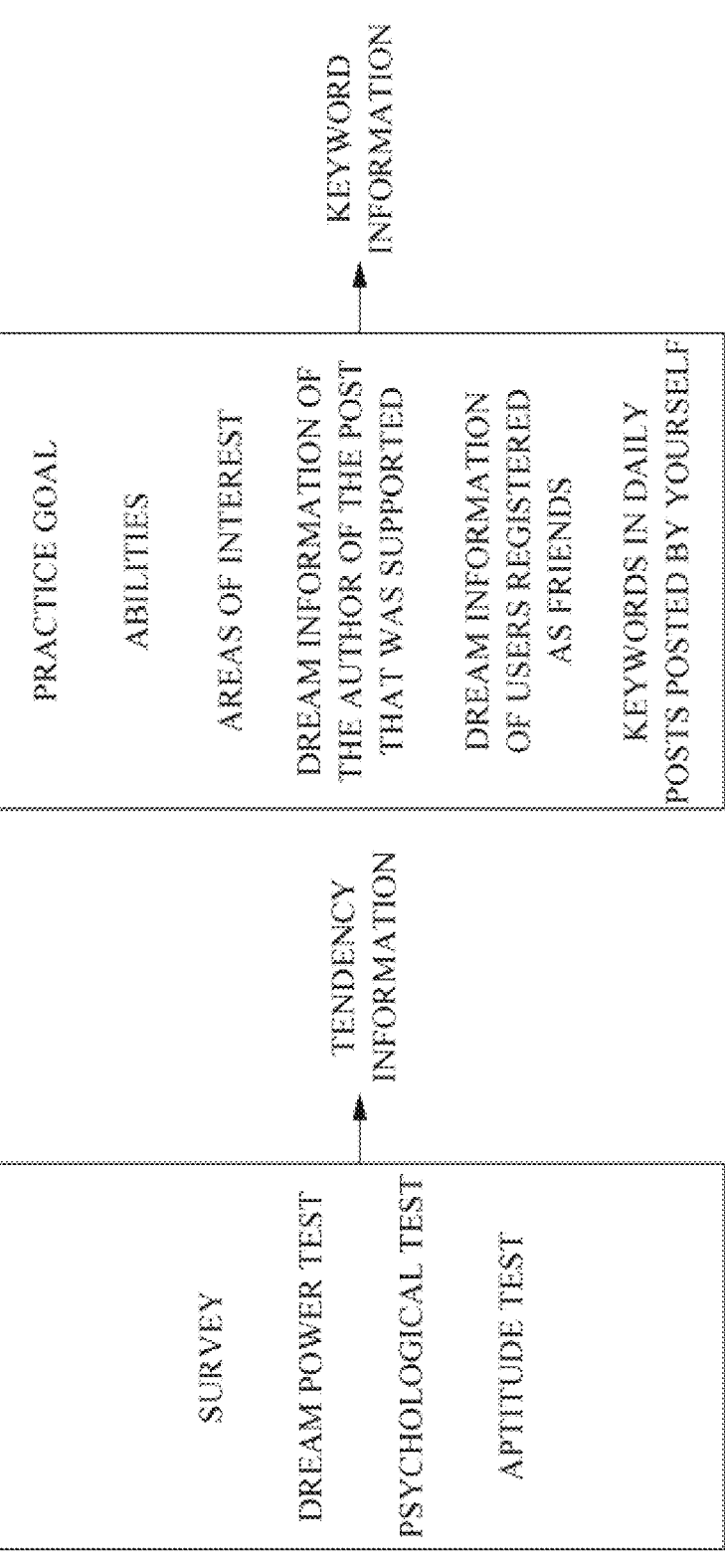
FIG. 20 is a diagram to illustrate input data to a job recommendation model, according to various embodiments.

FIG. 20 is a diagram to illustrate input data to a job recommendation model, according to various embodiments.

According to one embodiment of the present disclosure, the input data to the job recommendation model may include, but is not limited to, personality data (e.g., personality information), dream history data (e.g., dream history information), keyword data (e.g., keyword information), and the like.

The propensity data may be obtained based on a selection of the user. In one example, the server 101 may cause the user device 102 to display at least one screen for obtaining the user's propensity data, and may obtain the propensity data based on the user's selection corresponding to the displayed screen.

In this case, the at least one screen for obtaining propensity data may comprise a screen for implementing a survey, psychometric test, aptitude test, or the like.

Further, the dream history data may be obtained based on a selection of the user. For example, the server 101 may cause the user device 102 to display at least one screen for acquiring the user's dream history data, and may acquire the dream history data based on the user's selection corresponding to the displayed screen.

In this case, the dream history data may be, but is not limited to, a numerical representation of a user's knowledge of a dream, and may refer to a variety of data that can be quantified based on the user's choices.

In addition, the keyword data may be obtained based on the user's activity. For example, the server 101 or the user device 102 may utilize at least one information stored in response to the user's account to obtain the user's keyword data.

More specifically, the server 101 or the user device 102 may obtain at least one keyword data based on, but not limited to, action goal information, ability information, interest area information, dream information of a post author who has been cheered, dream information of a user registered as a friend, and/or keyword information of a daily post posted by the user.

Figure 21:
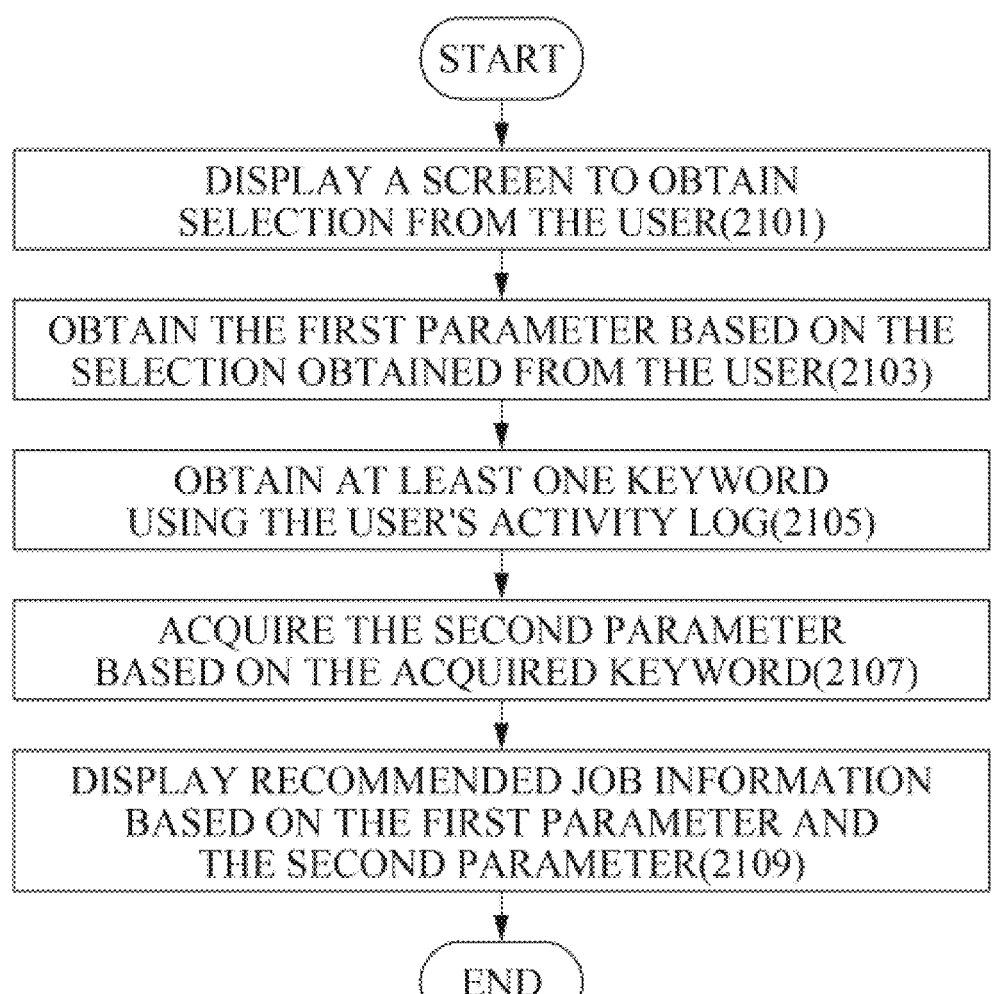
FIG. 21 is a flow diagram to illustrate the sequence of a job recommendation algorithm, according to various embodiments.

FIG. 21 is a flow diagram to illustrate the sequence of a job recommendation algorithm, according to various embodiments.

Referring to FIG. 21, in accordance with one embodiment of the present disclosure, at operation 2101, the server 101 (e.g., first processor 121) may cause the user device 102 to display a first screen for obtaining a user selection.

In operation 2103, the server 101 may obtain the first parameter based on the selection obtained from the user via the user device 102.

In operation 2105, the server 101 may obtain the at least one keyword using information stored on the server 101, such as the user's activity log.

In operation 2107, the server 101 may obtain a second parameter based on the obtained keyword.

In operation 2109, the server 101 may extract an occupation name based on the first parameter and the second parameter. The server 101 may cause the user device 102 to display the extracted occupation name via the display 160, but is not limited to.

More specifically, the first screen for obtaining a selection from the user may include at least one sub-screen. The sub-screen may be output as an independent screen, and may be displayed as an interface to at least a portion of the area of the first screen, but is not limited to.

In one example, the first screen for obtaining a selection from the user may include, but is not limited to, a first subscreen for displaying a first selection to a tenth selection and a second subscreen for displaying an eleventh selection to a twentieth selection.

The first screen may also include, but is not limited to, a survey, a dream test, a personality survey, a psychological test screen, and the like.

Further, the first parameter may include, but is not limited to, personality information, numerical information about personality, dream history information, numerical information about dream history, aptitude information, numerical information about aptitude, taste information, numerical information about taste, and the like.

In addition, information stored on the server, such as the above activity logs, may include, but is not limited to, action goal information, ability information, interest area information, dream information of post authors who pressed support, dream information of users registered as friends, keyword information of daily posts posted by users, etc.

Further, the second parameter may be the keyword information itself, and may be a numerical representation of the keyword information, but is not limited thereto. For example, the second parameter may include, but is not limited to, a legal interest score, a medical interest score, a social service interest score, and the like.

Furthermore, various algorithms may be utilized in the step of extracting the occupation name based on the first parameter and the second parameter.

For example, in the step of extracting the occupation name based on the first parameter and the second parameter, an algorithm for extracting the occupation family based on the second parameter and then extracting the occupation name based on the first parameter may be used, but various algorithms that apply weights, priorities, etc. to the first parameter and the second parameter may be applied.

Figure 22:
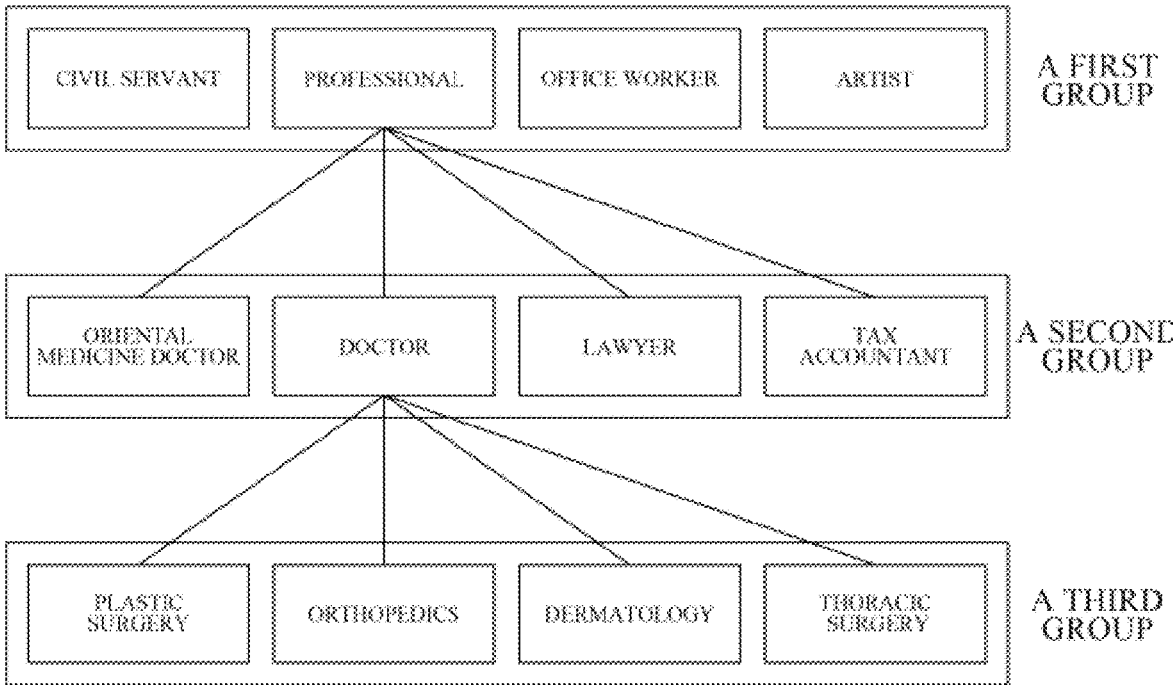
FIG. 22 is a diagram to illustrate a method of recommending job names based on Dreamforce using a job recommendation algorithm provided by a server to a user device, according to various embodiments.

FIG. 22 is a diagram to illustrate how server 101 may recommend job names based on Dreamforce using a job recommendation algorithm provided by the application, according to various embodiments.

According to one embodiment of the present disclosure, the server 101 or the user device 102 may obtain the user's dream force data based on an occupation recommendation algorithm, and extract an occupation name based on the obtained dream force data. In one example, the occupation recommendation algorithm operating on the server 101 or the user device 102 may extract occupation names included in a first group if the obtained user's dream force data is in a first numerical range, may extract occupation names included in a second group if the user's dream force data is in a second numerical range, may extract occupation names included in a third group if the user's dream force data is in a third numerical range, but is not limited to.

In this case, said third group may be a subgroup of said second group, and said second group may be a subgroup of said first group. For example, the first group may include an occupational designation of professional, the second group may include an occupational designation of physician, which is included in professional, and the third group may include an occupational designation of plastic surgeon, which is included in physician, but is not limited to.

At this point, we will omit redundant descriptions of the above Dreamforce data as they may be applicable.

[Manifesting Dreams].

This specification describes a method for providing an interface that allows people who have not thought deeply about their dreams to materialize their dreams and create a platform for realizing them, using data stored on a server.

Figure 23:
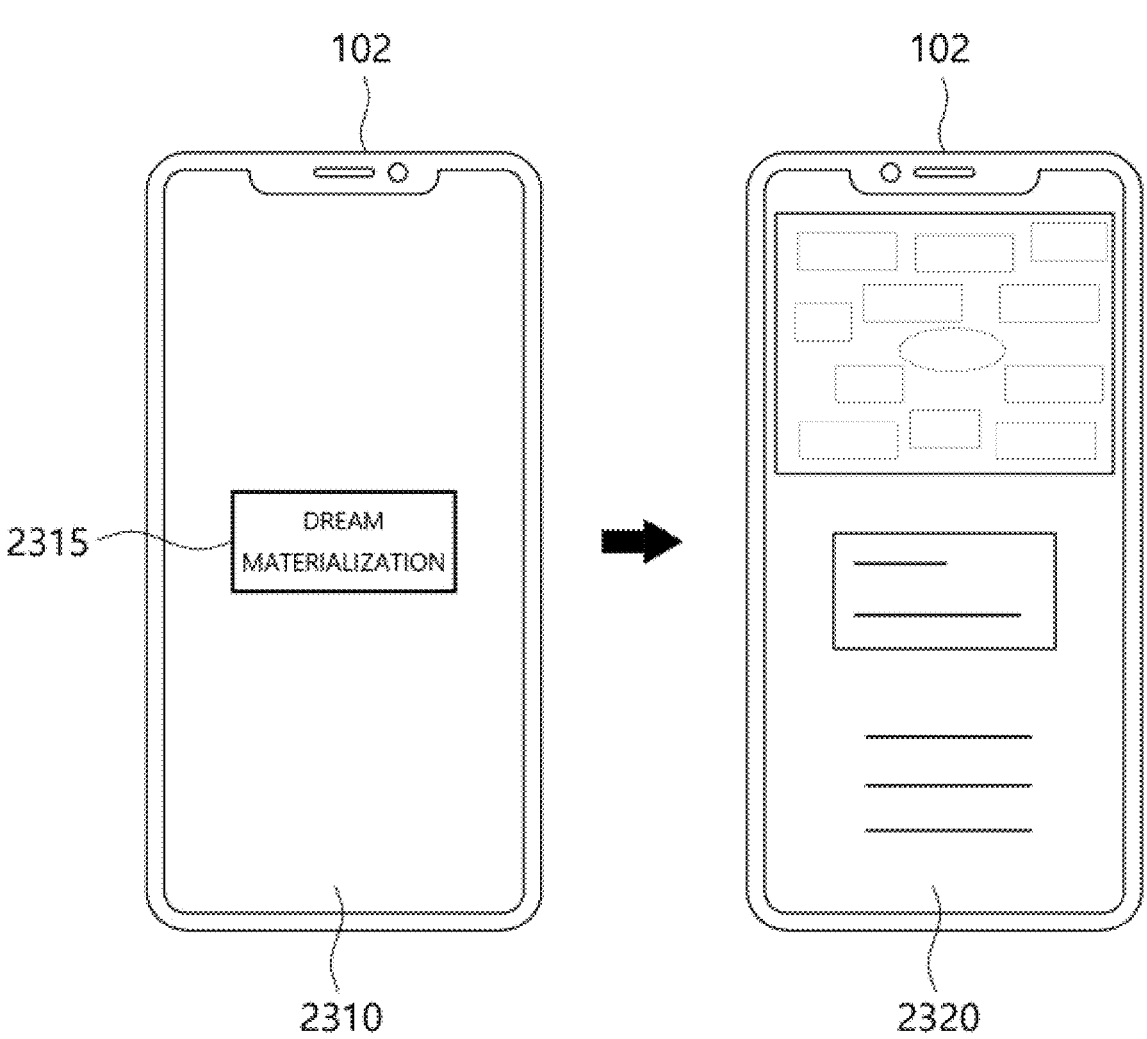
FIG. 23 illustrates a dream materialization screen for a user account provided by a server to a user device, according to various embodiments.

FIG. 23 illustrates a dream materialization screen for a user account that server 101 provides in an application, according to various embodiments.

According to one embodiment of the present disclosure, the server 101 may provide an interface for materializing a dream via a user device 102.

The server 101 may cause the user device 102 to display a corresponding interface via the display 160 for the user to materialize and record the dream.

Referring to FIG. 23, the server 101 may cause the user device 102 to display a first screen 2310 that includes at least one button 2315 for accessing an interface for materializing a dream, and upon obtaining user input for the at least one button 2315, may cause the user device 102 to display a second screen 2320 corresponding to the interface for materializing a dream.

In this case, said second screen 2320 may display at least one area for listing an occupation name. In one example, the second screen may display at least one area for obtaining textual input from a user and outputting it via the display 160.

Further, the at least one area may include, but is not limited to, an area for listing one occupational name, as shown in the second screen 2320 of FIG. 23, and may include an area for listing a plurality of occupational names.

Further, the second screen 2320 may include a guide information display area that displays information to guide the user in filling out the occupation name. In one example, the second screen 2320 may include a guide information display area that includes, but is not limited to, writing tips and writing examples.

Figure 24:
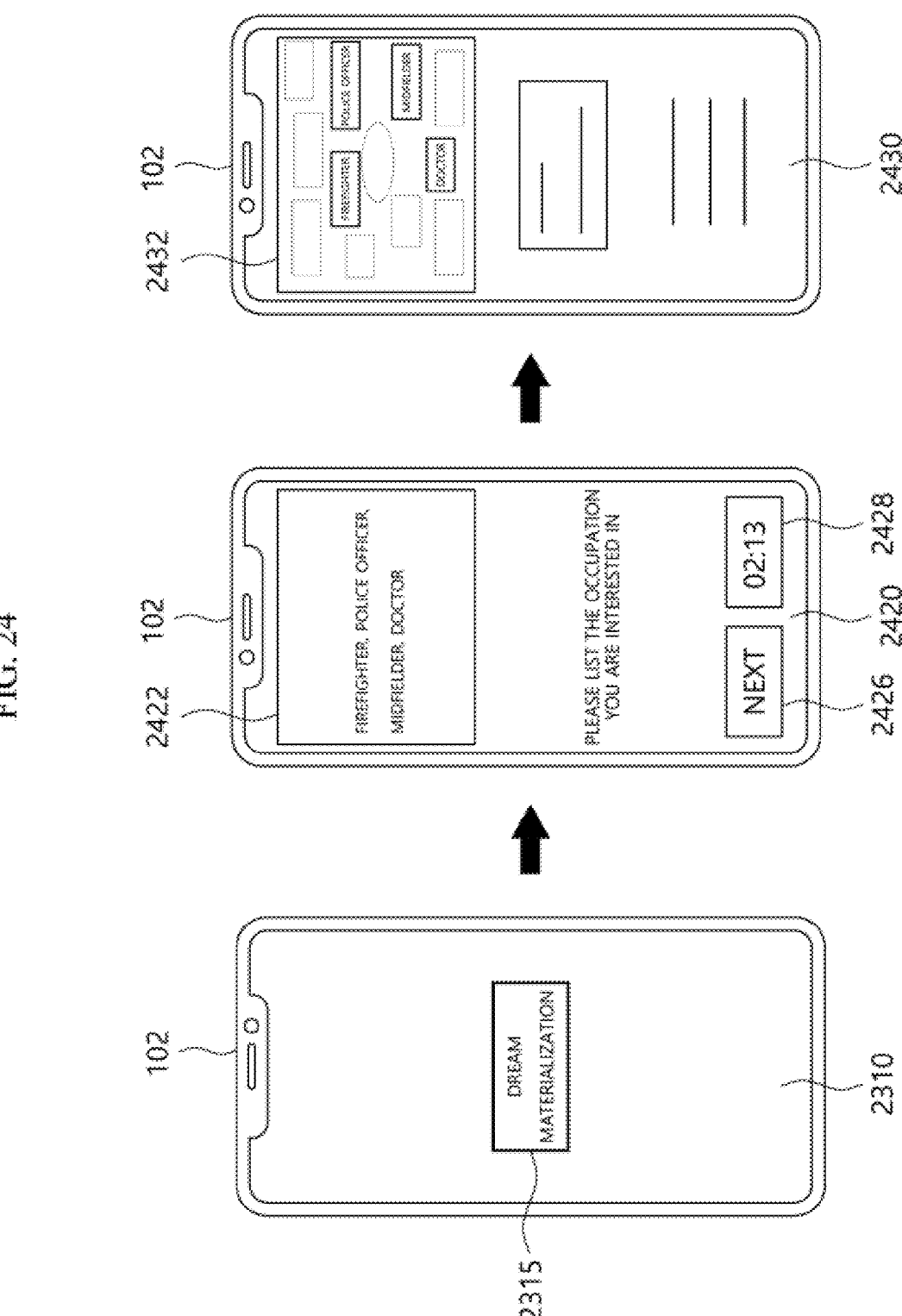
FIG. 24 illustrates a user account dream materialization screen provided by a server to a user device, according to various embodiments.

FIG. 24 illustrates a dream materialization screen for a user account that server 101 provides in an application, according to various embodiments.

Referring to FIG. 24, the server 101 may cause the user device 102 to display a first screen 2410 for accessing an interface for materializing the user's dream. The server 101 may cause the user device 102 to display a second screen 2420 for obtaining textual input from the user for an occupation name. The server 101 may cause the user device 102 to display a third screen 2430 for outputting the textual input for the occupation name obtained from the user, but not limited to.

In this case, the contents described above for the first screen and the third screen are applicable, so the redundant description will be omitted.

The second screen 2420 for obtaining textual input for the occupation name from the user may include, but is not limited to, a text input area 2422 for obtaining textual input from the user, a guided information display area 2424 for describing the screen, a first button 2426 for switching screens, and a time-related area 2428 for guiding text input time.

Further, said text input area 2422 may be an area for outputting the obtained text input via a display when text input for at least one occupation name is obtained from the user. For example, if text input for a firefighter, police officer, soccer player, midfielder, or doctor is obtained from a user via the text input area 2422, the server 101 may cause the server 101 to display it via the display 160 of the user device 102. However, it will be appreciated that the text input obtained from the user can be output via the display 160 of the user device 102 regardless of the occupation.

Additionally, the second screen 2420 may include a time-related area 2428 for obtaining textual input for the occupation name from the user within a preset time period, and guiding the textual input time to determine the user's internal interest.

In this case, the time-related area 2428 may indicate, but is not limited to, the time remaining to enter the text input, and may indicate the time that has elapsed since the text input began.

Further, said second screen 2420 may include a second button for activating a timer displayed in said time-related area 2428. In one example, said second screen 2420 may include a second button labeled with the text "Start," and upon receipt of user input corresponding to said second button, the timer displayed in said time-related area 2428 may be activated, but is not limited to.

Further, said second button and said time-related region 2428 may be temporally spaced apart but spatially overlap at least partially. For example, but not limited to, when user input corresponding to said second button displayed on said second screen 2420 is obtained, said second button may disappear, and said time-related region 2428 may be generated with a timer displayed in the region corresponding to said second button.

Further, upon obtaining an input from the user corresponding to said first button 2426 displayed on said second screen 2420, the server 101 may cause the user device 102 to display said third screen 2430.

In this case, said third screen 2430 may include an occupation name display area 2432 for displaying at least one occupation name outputted in said text input area 2422 included in said second screen 2420.

Additionally, the occupation name display area 2432 may be provided in a mind map format as shown in FIG. 24, but is not limited to, and may be provided in a variety of formats, such as a list format.

Further, the server 101 may categorize the occupation names obtained in said second screen 2420 in order to output the at least one occupation name output in said text input area 2422 included in said second screen 2420 of the user device 102 to said occupation name display area 2432. For example, if the occupation names obtained in said second screen 2420 are firefighter, police officer, soccer player, midfielder, and doctor, the firefighter, police officer, soccer player, and doctor may be categorized into a first group, and the midfielder may be categorized into a second group.

In this case, said second group may be a subgroup of said first group, but is not limited to.

Further, said third screen 2430 may include an interface for refining the at least one occupational name obtained in said second screen 2420. In one example, said occupation name display area 2432 included in said third screen 2430 may include a detailed occupation name area in which a detailed occupation name of the at least one occupation name obtained in said second screen 2420 may be entered or selected.

In one example, if the obtained occupation name in the second screen 2420 is a physician, the second screen 2420 may include a detailed occupation name area for listing the detailed occupation name of the physician, said detailed occupation name area may be output by obtaining text input from the user, or may be output by obtaining selection input from the user.

As a more specific example, if the occupation obtained in the second screen 2420 is a physician, the second screen 2420 may include a detailed occupation name area for listing the detailed occupation name of the physician, and upon obtaining user input corresponding to said detailed occupation name area, the server 101 may cause the user device 102 to output a virtual keyboard for obtaining text input from the user, or an example occupation name for obtaining selection input from the user, but is not limited to.

Figure 25:
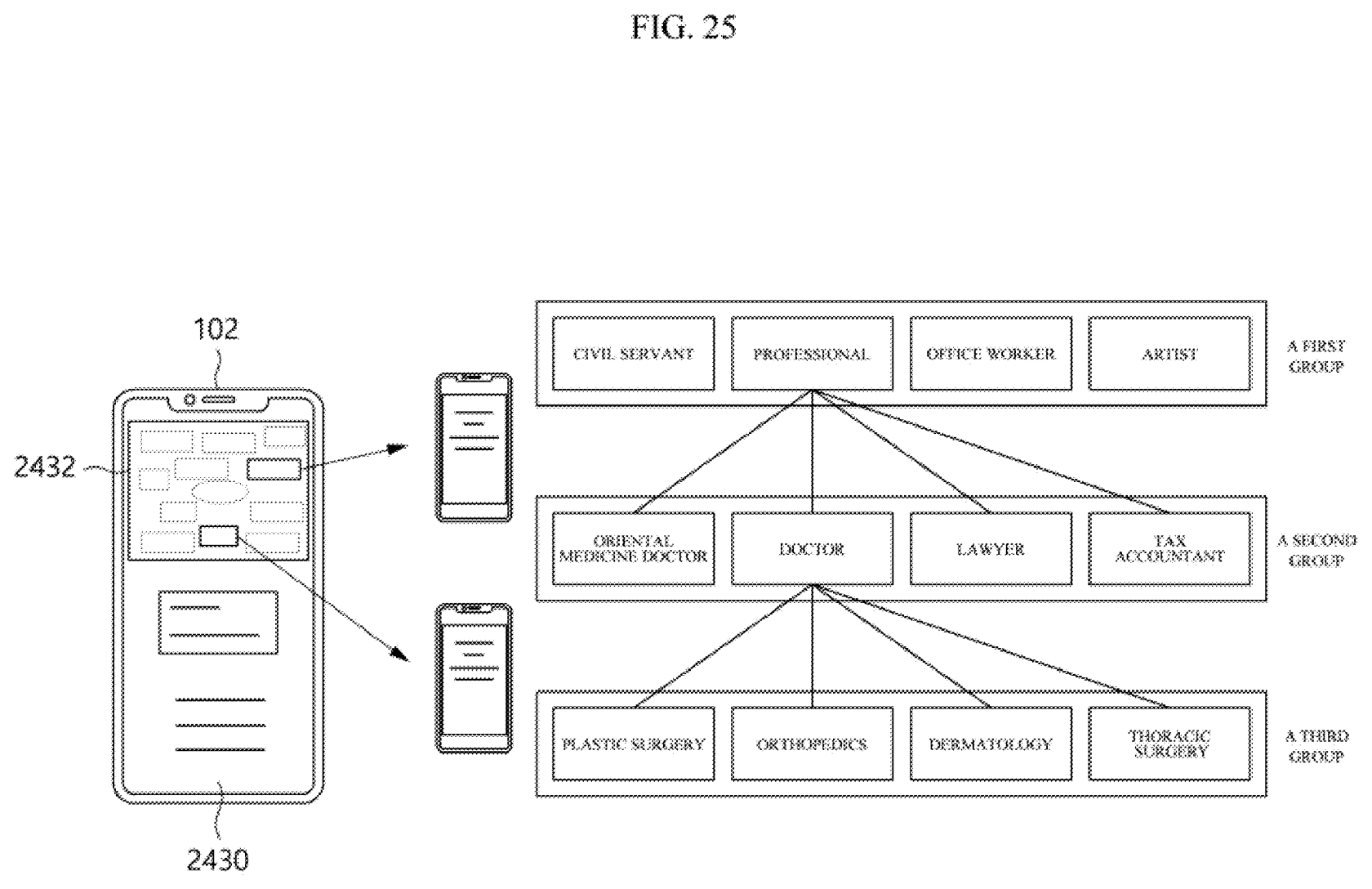
Figure 26:
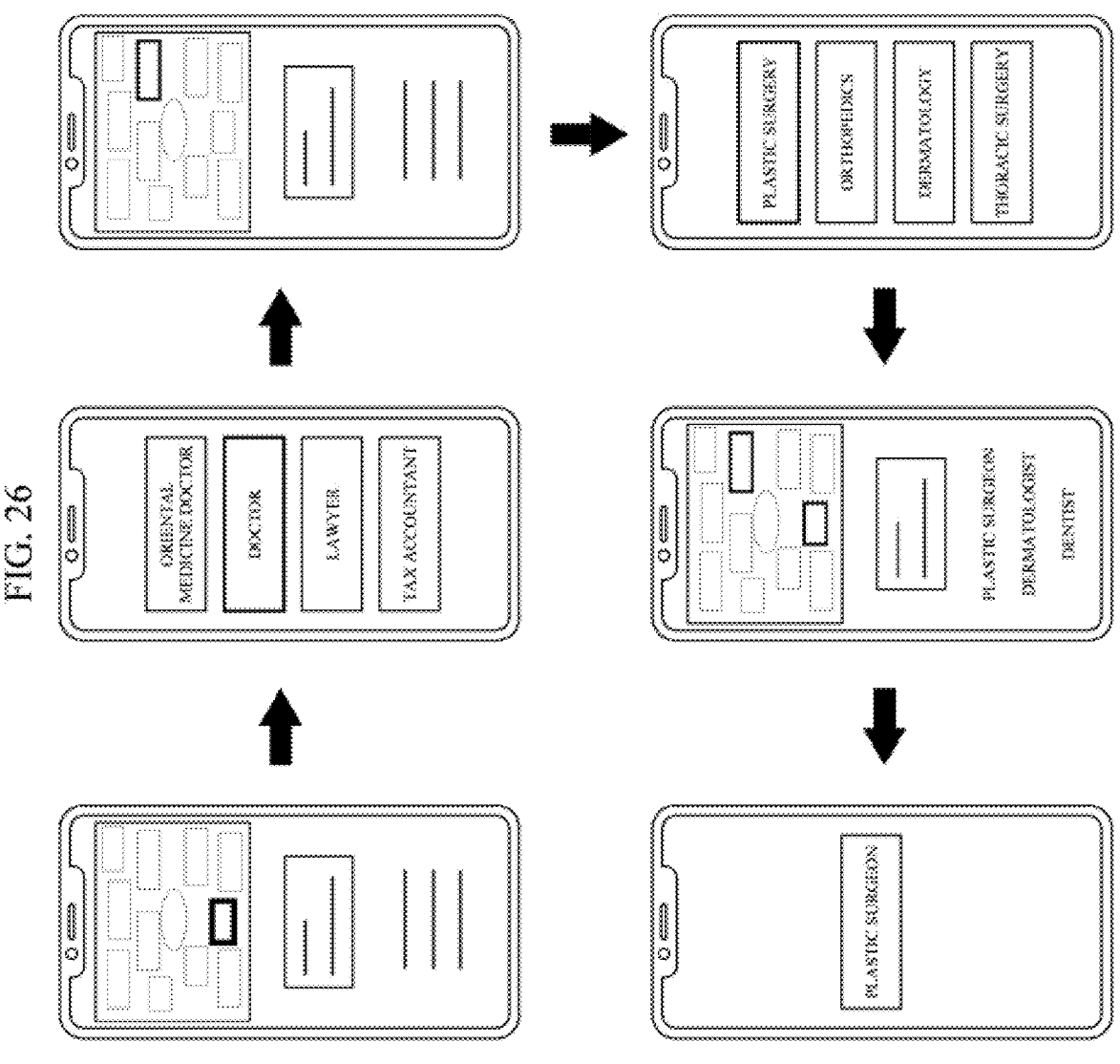

FIGS. 25 and 26 illustrate a dream materialization screen provided by the server 101 in an application according to various embodiments. However, any overlap with the above description will be omitted, and an understanding of FIGS. 25 and 26 based on the above description will be self-evident to a person of ordinary skill in the art, so a detailed description will be omitted.

[Dream Pioneer Mode].

This specification describes a method and a mode in which an application can be operated without a dream being determined using data stored in the server 101 so that people who do not yet have a dream, or who have not thought about their dreams, can smoothly use the application to discuss and communicate about their dreams and take a step closer to their dreams.

Figure 27:
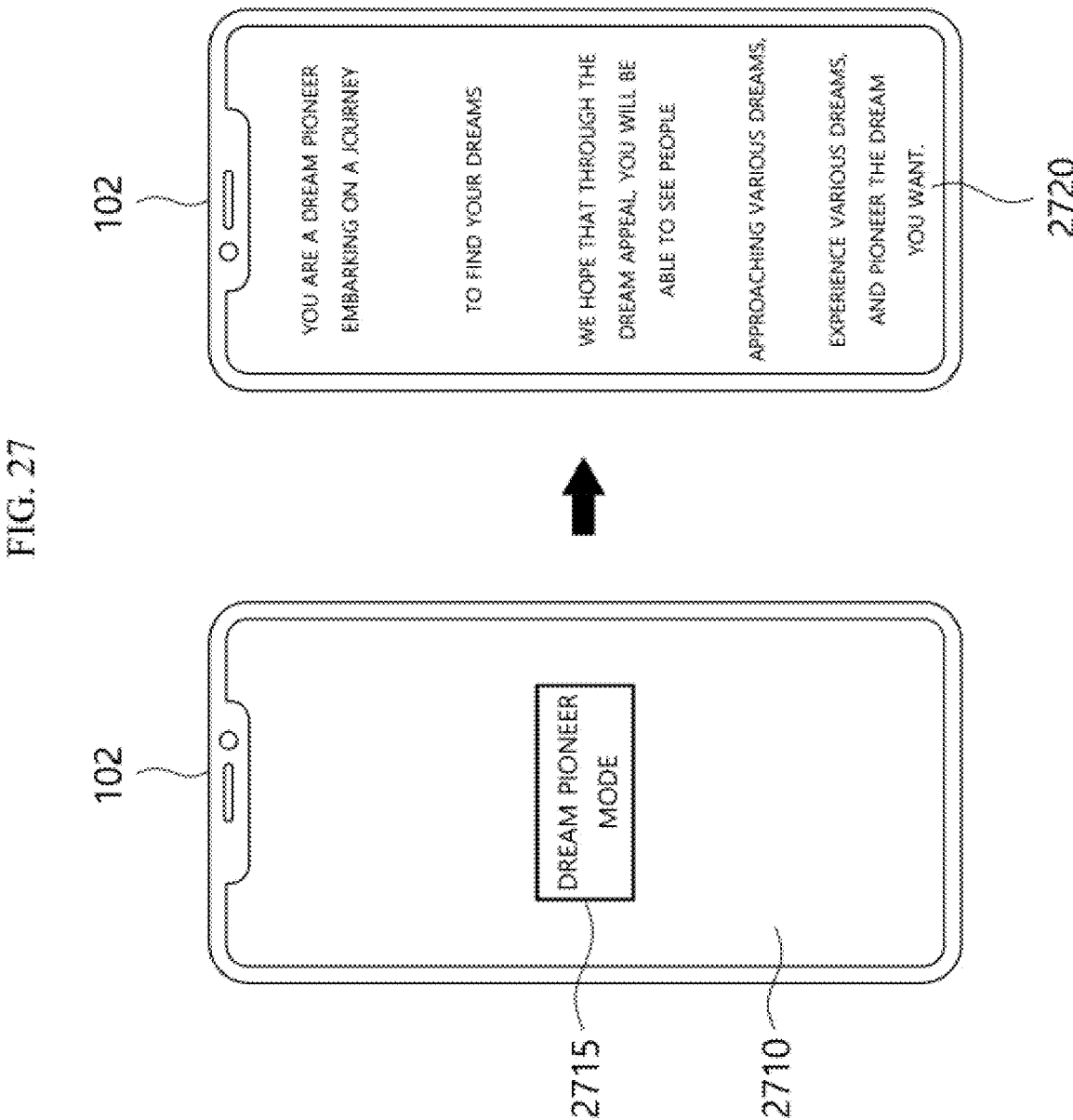
FIG. 27 illustrates a dream pioneer screen of a user account provided by a server to a user device, according to various embodiments.

FIG. 27 illustrates a dream pioneer screen for a user account served by the application from the server 101, according to various embodiments.

According to one embodiment of the present disclosure, the server 101 may provide an interface for providing the dream pioneer mode via the user device 102.

For example, the server 101 may cause the user device 102 to display a corresponding interface via the display 160 for providing the dream pioneer mode.

In one example, referring to FIG. 27, the server 101 may cause the user device 102 to display a corresponding interface via the first screen 2710 for providing the dream pioneer mode.

In this case, the above Dream Pioneer Mode may be a mode that allows users to operate the Application without entering information about their dreams, such as the name of their dreams and the name of their occupation, in their user accounts, so that users who do not have dreams for the future or whose dreams have not been materialized can find their dreams while operating the Application.

In addition, said first screen 2710 may include a first button 2715 for entering the dream pioneer mode. In one example, upon receiving a user's input for the first button 2715 displayed on the first screen 2710, the server 101 may set the user's account to the dream pioneer mode, but is not limited to.

Furthermore, the server 101 may cause the user device 102 to display a second screen 2720 to inform the user that the user's account will be set to the dream pioneer mode if the user's input to the first button 2715 displayed on said first screen 2710 is obtained via the user device 102, but is not limited to.

Figure 28:
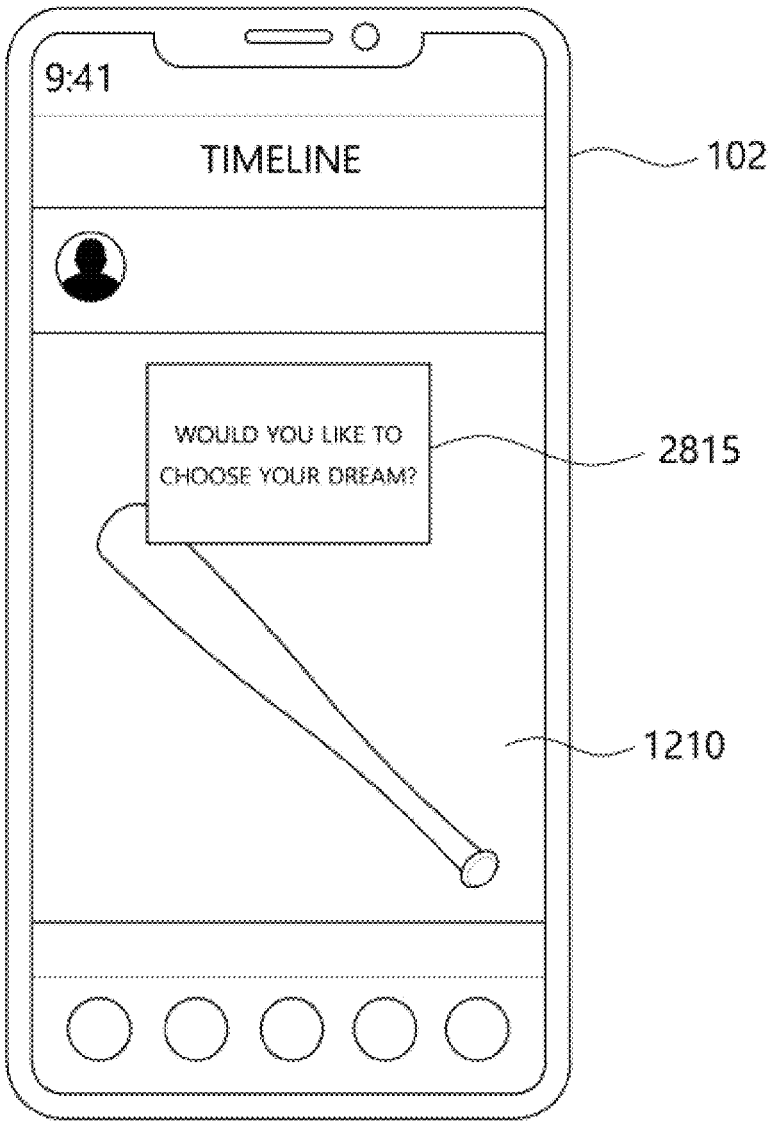
FIG. 28 illustrates a user account's dream point-of-selection screen provided by a server to a user device, according to various embodiments.
Figure 29:
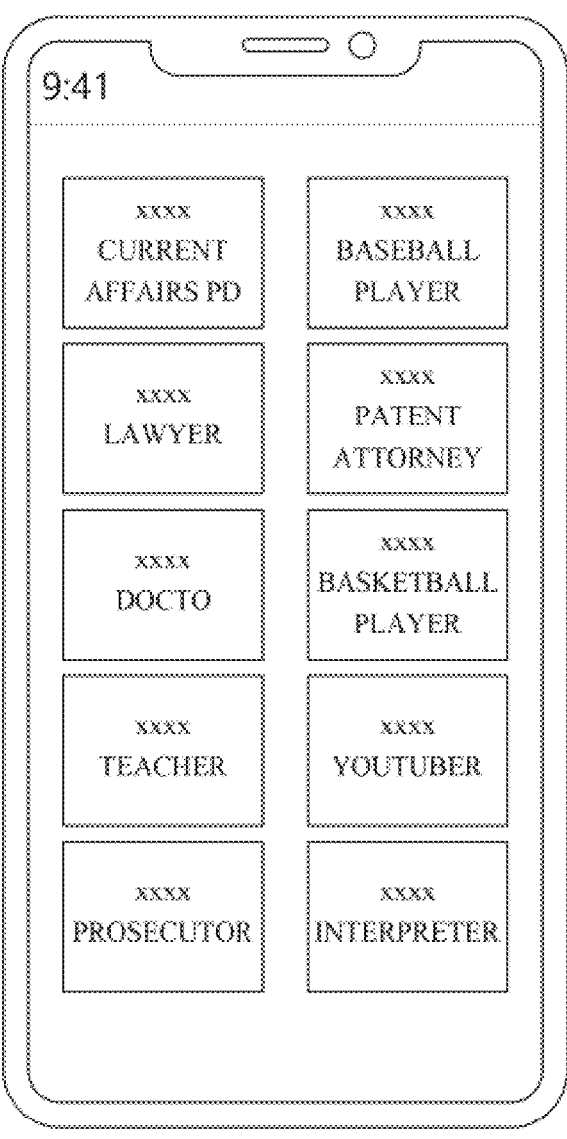
FIG. 29, FIG. 30, FIG. 31, FIG. 32, and FIG. 33 illustrate interface diagrams for an experience mode included in a dream pioneer mode provided by a server to a user device, according to various embodiments.
Figure 30:
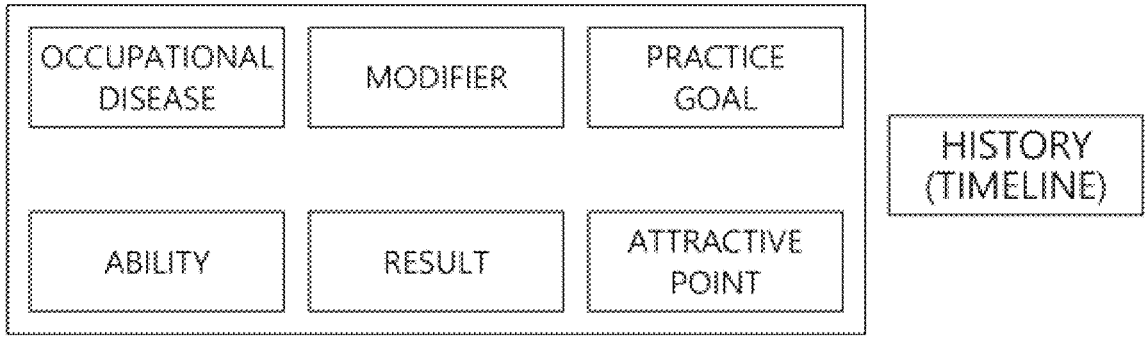
Figure 31:
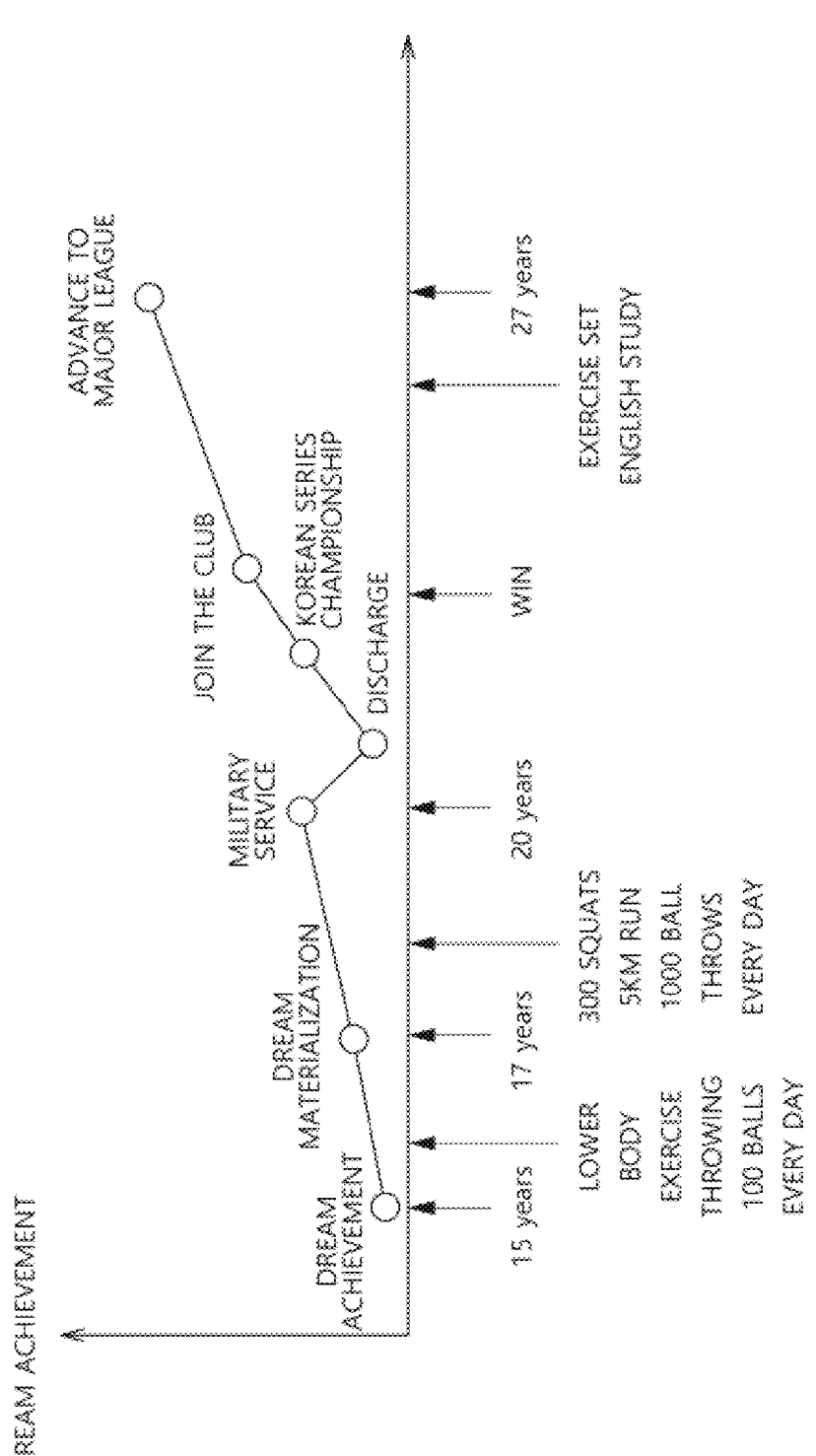
Figure 32:
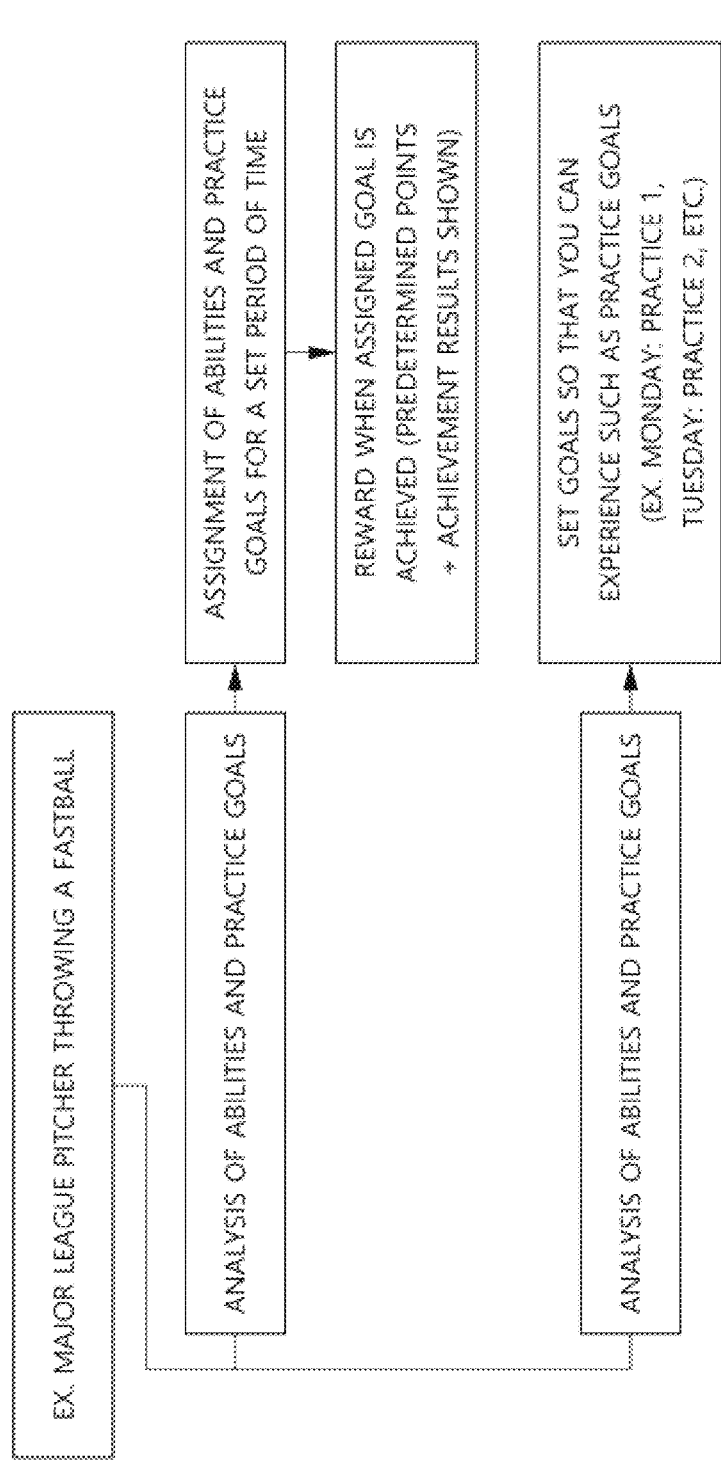
Figure 33:
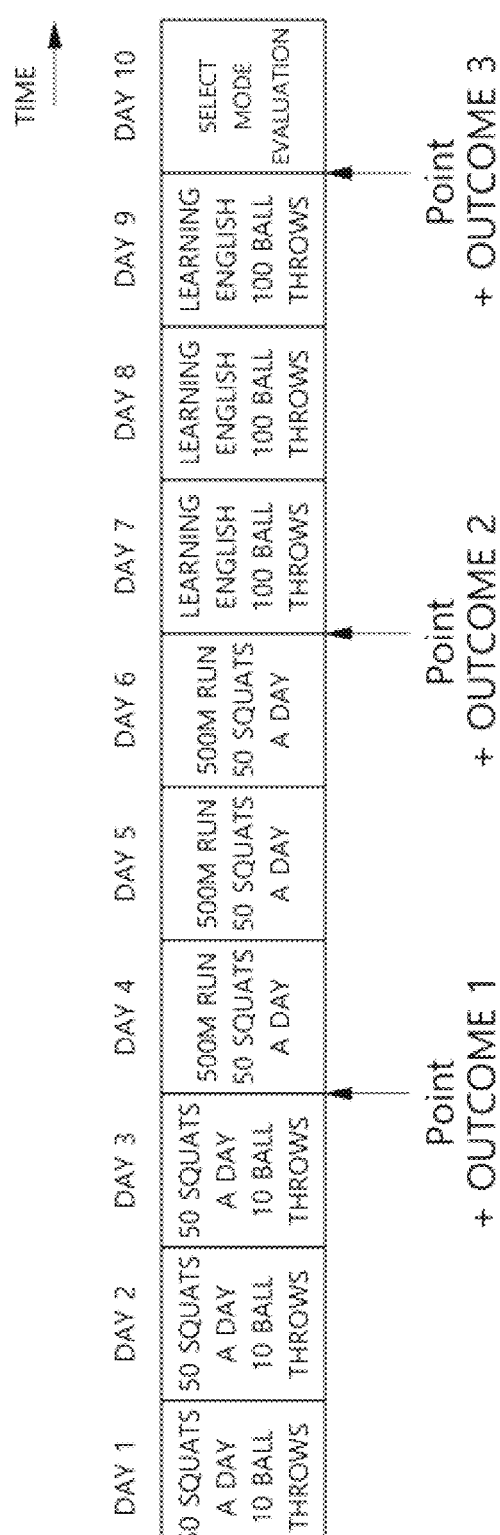

FIG. 28 illustrates a screen of a user account's dream selection point of view provided by the application, according to various embodiments of the server 101.

According to one embodiment of the present disclosure, the server 101 may provide an interface for the provision of a dream selection point of view via the user device 102.

For example, the server 101 may cause the user device 102 to display a corresponding interface via the display 160 for providing the dream selection.

In one example, referring to FIG. 28, the server 101 may provide a corresponding interface for providing the user, via the user device 102, with a dream selection point, via the first button 2815, in the form of various alarms, including but not limited to.

More specifically, the server 101 may determine a dream selection time point based on information obtained about the user's account set to the dream pioneer mode, and may cause the user device 102 to display the first button 2815 at the determined dream selection time point.

This may be to provide users who have been active in Dream Pioneer mode for a certain amount of time with an optimal time to choose or refine their dreams.

Further, the server 101 may utilize various temporal factors to obtain the dream selection time. For example, the server 101 may utilize, but is not limited to, information about when the user account was set to dream pioneer mode, information about when the user account accessed the application, and the like to obtain the dream selection time.

Further, the server 101 may utilize various activity factors to obtain the dream selection points. For example, the server 101 may utilize, but is not limited to, information about posts uploaded by the user, information about the number of posts uploaded by the user, information about comments uploaded by the user, information about the number of comments uploaded by the user, information about profiles of other users output to the user device 102, information about the number of profiles of other users output to the user device 102, information about posts of other users output to the user device 102, information about the number of posts of other users output to the user device 102, information about an activity index for the user account, and the like to obtain the dream selection time.

FIGS. 29, 30, 31, 32, and 33 illustrate interface diagrams for an experiential mode included in a dream pioneer mode provided by server 101 in an application, according to various embodiments.

In this case, the experience mode included in the Dream Pioneer mode may be a mode that utilizes other users' information and stored information to provide a roadmap for experiencing the action goals, abilities, etc. for a specific dream name, such as an abbreviated version of the goals to be practiced, abilities to be achieved, etc. to achieve that dream name.

However, redundancies in the above description will be omitted, and an understanding of FIGS. 29, 30, 31, 32, and 33 will be apparent to one of ordinary skill in the art based on the above description and the accompanying drawings, so that a detailed description will not be necessary.

[How to Deliver a Portfolio].

This specification describes a method of providing a personalized portfolio using data stored in a server 101 so that a user can have a portfolio of action goals that the user has taken while interacting with people in the process of finding a dream and growing a dream.

Figure 34:
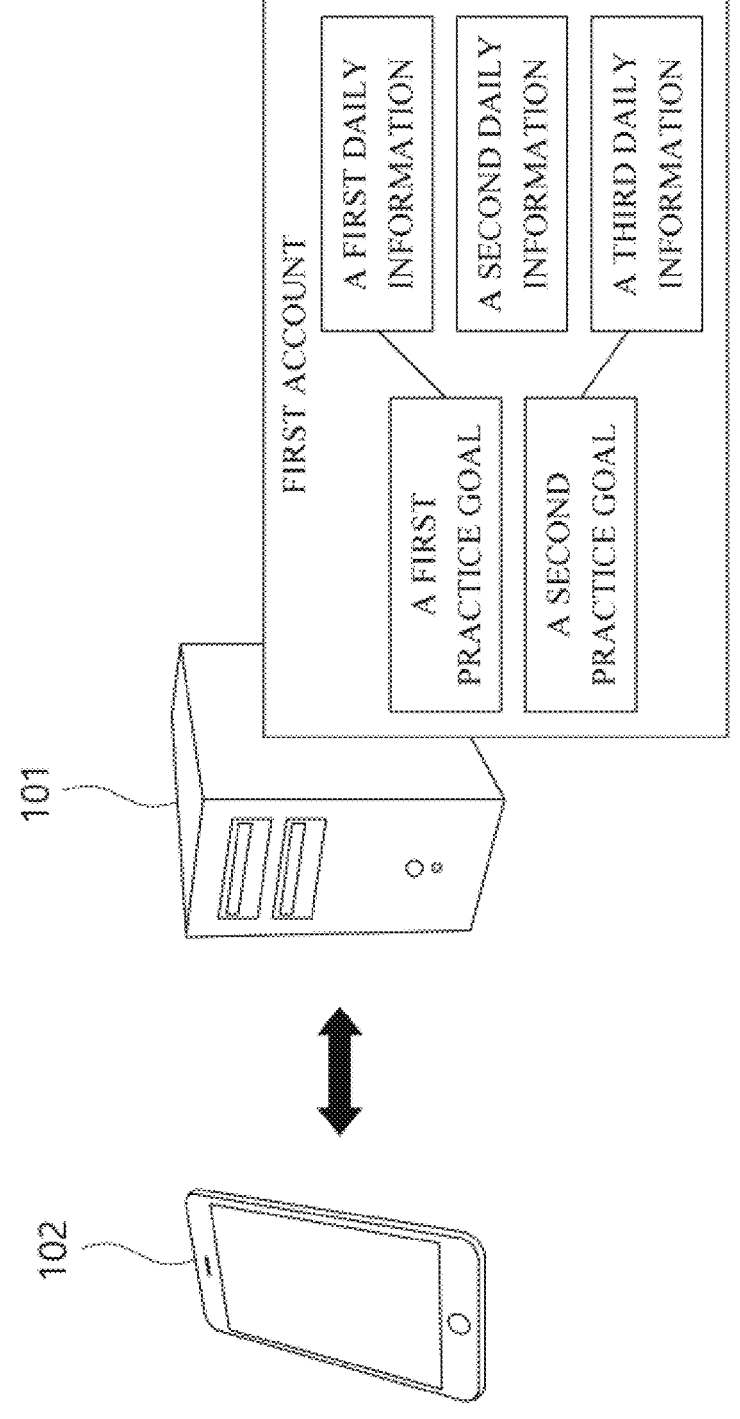
FIG. 34 is a diagram illustrating a system including a server and a user device, according to various embodiments.

FIG. 34 is a diagram illustrating a system including a server 101 and a user device 102, according to various embodiments.

The server 101 may be connected via a network to at least one user device 102. The user device 102 may act as an intermediary between the user and the server 101. According to one embodiment of the present disclosure, the server 101 may receive, via the user device 102, a dream name, a modifier for the dream, an action goal to fulfill the dream, daily information related to the action, and/or simple daily information. The user device 102 may obtain, via a user logged in with a single account, a dream name, a modifier for the dream, an action goal to fulfill the dream, daily information related to the action, and/or simple daily information. The user device 102 may transmit the obtained dream name, a modifier for the dream, an action goal to fulfill the dream, daily information related to the action, and/or simple daily information to the server 101.

The server 101 may store in the first memory 131 of the server 101 a dream name, a modifier for the dream, an action goal to fulfill the dream, daily information related to the action, and/or simple daily information obtained via the user device 102. The server 101 may store the obtained dream name, the modifier for the dream, the action goal to fulfill the dream, the daily information related to the action, and/or the simple daily information in association with the account information of the user who provided it. Here, the first memory 131 of the server 101 may be implemented in the form of storing the information as a database within the server 101, or may be implemented as a separate database server.

In a specific example, the first user may access an application provided by the server 101 and enter a dream name. In one example, the first user's dream name may be "Kim Ki-Dong, baseball player." The first user may access the application provided by the server 101 and enter a modifier. In one example, the first user's modifier may be "giving happiness to fans". The date the first user enters the dream name and the date the first user enters the modifier may be the same. The date the first user enters the dream name and the date the first user enters the modifier may be different.

The first user may access an application provided by the server 101 to enter an action goal. The first user may enter one or more action goals. The first user may enter daily information.

According to one embodiment of the present disclosure, a first user can enter daily information and select whether or not to associate it with an action. In one example, the first user may set a first action goal (e.g., volunteer) and a second action goal (e.g., do 30 minutes of upper body exercise). The first user may upload a first daily information (e.g., a photo taken at a volunteer activity on February 30). While inputting the first daily information via the user device, the first user may select the "first practice information" through the interlocking interface with the practice authentication formed on the input interface, and the first practice information and the first daily information may be stored in the first memory 131 of the server 101 in association.

According to one embodiment of the present disclosure, a first user can enter daily information without linking it to an action. For example, the first user may set a first action goal (e.g., volunteer) and a second action goal (e.g., do 30 minutes of upper body exercise). The first user may upload a second daily information (e.g., an authentic photo taken in Hawaii with a friend). The first user may enter the second daily information via the user device 102, without prompting the user to associate the information with an action certification formed on the input interface. The second daily information may be stored in the first memory 131 of the server 101 without association with the practice goal.

Figure 36:
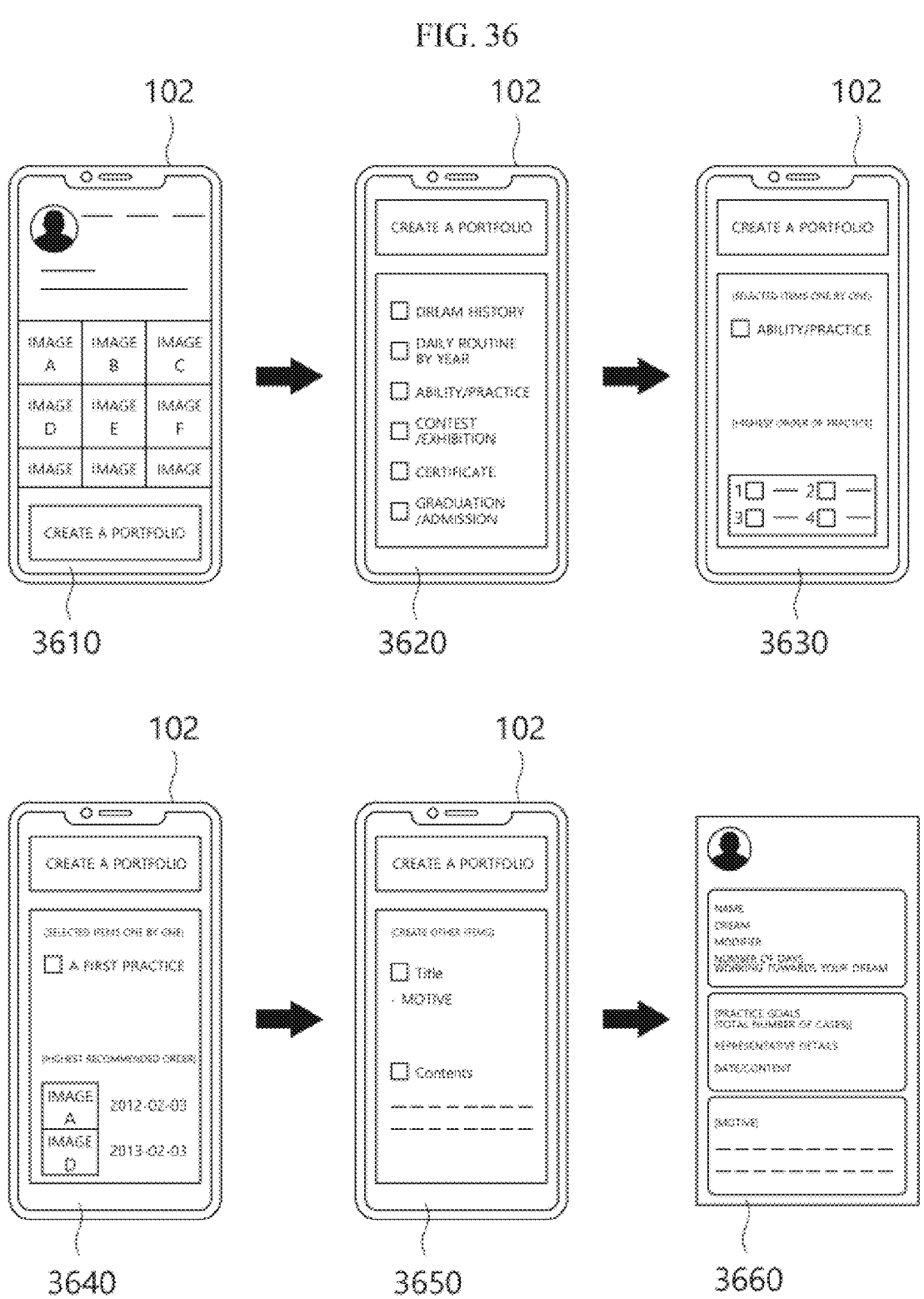
FIG. 36 is a diagram to illustrate methods of operation of a server and a user device, according to various embodiments.

FIG. 35 is a flow diagram to illustrate how the server 101 and user device 102 may operate, according to various embodiments. FIG. 36 is a diagram to illustrate how the server 101 and user device 102 may operate, according to various embodiments.

Referring to FIGS. 35 and 36, the server 101 (e.g., the first processor 121) may provide the portfolio to the user. Using information stored in the first memory 131, the server 101 may provide the user with a personalized portfolio.

In one example, at operation 3501, server 101 may receive a request from a first user, via user device 102, to provide a portfolio.

At operation 3503, the server 101 may retrieve routine information for the account corresponding to the first user.

At operation 3505, the server 101 may select the routine information associated with the practice to be included in the portfolio from the retrieved routine information. The routine information associated with the practice may be routine information that has the associated practice information entered when the routine information is uploaded, as described above.

When the server 101 selects daily information associated with an action to be included in the portfolio, the server 101 may consider the number of actions, supporters, views, most recently performed action goal, dream name, and/or modifiers. In one example, the server 101 may select one or more action goals that have received high support and select the daily information associated with the selected action goal to be representative of that action goal.

When the server 101 selects routine information associated with a practice to be included in the portfolio, the server 101 may select the practice to be included in the portfolio based on information pre-populated in the first memory 131. In one example, the server 101 may provide the user with an interface for selecting routine information to be included in the portfolio, and the user may select the selected routine information as the routine information to be included in the portfolio.

In operation 3507, the server 101 may generate a portfolio based on the selected routine information. The portfolio may be in various formats, such as, but not limited to, PDF, PPT, Word, Excel, hwp, etc. The portfolio generated by the server 101 may include, at a minimum, a selected action goal and representative thumbnails of the daily information corresponding to the action goal. The portfolio generated by the server 101 may be provided via the user device 102.

The embodiments disclosed herein may be performed by actions of the server 101 and/or the user device 102, if the server 101 and the user device 102 are connected in real time. Furthermore, the embodiments disclosed herein may be performed by the user device 102 if a particular application is already downloaded to the user device 102 from the server 101. However, the technical ideas are similar despite the different entities performing the operations, and will be described using one situation as an example.

The server 101 may cause the user device 102 to display, via the display 160, a corresponding interface for selecting daily information to be included in the portfolio by the user. For example, referring to FIG. 36, the server 101 may cause the user device 102 to display, via the display 160, a first screen 3610 for selecting "Create Portfolio" and a second screen 3620 for selecting "Items" to be included in the portfolio once "Create Portfolio" is selected. Here, the items may be dream history, yearly routines, skills/practices, competitions/exhibitions, certifications, and/or graduations/admissions. When one or more of the items exposed on the second screen 3620 is selected by the user, the server 101 may cause the user device 102 to display a third screen 3630 for selecting more details about the one selected item. If two or more of the one or more items exposed on the second screen 3620 are selected by the user, the third screen 3630 may be provided for selecting details of the two or more selected items, and the details of the two or more selected items may be selected sequentially.

Once the abilities/practices are selected via the second screen 3620 of the user device 102, a third screen 3630 may be provided via the user device 102 for selecting which abilities/practices are to be included in the portfolio. The user device 102 may expose an interface for selecting which of the abilities/practices stored in the first memory 131 of the server 101 are to be included in the portfolio, but may provide an ordering of the abilities/practices to be exposed, sorted by "highest practice".

Once the first practice is selected via the third screen 3630 of the user device 102, the server 101 may cause the user device 102 to display a fourth screen 3640 for selecting which routines associated with the first practice are to be included in the portfolio. The server 101 may cause the user device 102 to display routines that correspond to the selected first practice from the routines stored in the first memory 131 of the server 101, with the order of the routines to be displayed sorted by "most recommended".

The server 101 may cause the user device 102 to display, via the display 160, a separate fifth screen 3650 to allow the user to enter additional items that the user wishes to add in addition to the items that will be exposed via the first screen 3610. The fifth screen 3650 may be provided with an interface for entering a "Title" and "Contents". Once the input to the fifth screen 3650 is obtained from the user, the server 101 may generate a portfolio (e.g., 3660).

The created portfolio (e.g., 3660) may include, but is not limited to, your name, dream name, modifier, number of days you have been working on your dream, action goals, dream history, yearly routine, daily information, contest/ exhibition participation information, certification information, and/or school graduation/entry information.

According to one embodiment of the present disclosure, the portfolio (e.g., 3660) may be provided as a weekly, monthly, quarterly, and/or yearly report.

So far, the discussion has been based on a personalized portfolio for a user being generated by "server 101" (or user device 102).

However, according to one embodiment of the present disclosure, the portfolio may not be automatically created by the server 101, but rather, the portfolio may be provided to the user in the form of editing/portfolio creation by the administrator based on the information stored in the server 101, and the portfolio may be provided to the user device 102 via the server 101. In this case, the server 101 may evaluate the "trust index" of the user and only authorize the creation of a portfolio for the user who is determined to be above a certain trust index.

As used herein, a "trust index" may be determined by the trustworthiness of a user. Alternatively, as used in this disclosure, a "trust index" may be determined by trust in a post. Alternatively, as used in this disclosure, the "trust index" may be determined by trust in the user and trust in the post.

The trustworthiness of a user may be determined based on the user's daily number of uploads, the number of similar posts, the number of supports received, and/or an index of activity within the application (e.g., the number of adopted answers to questions). The trustworthiness of a post may be determined based on the number of supports for that post, the number of comments on that post, and/or the similarity between that post and other posts.

However, this is merely an illustrative description of how the server 101 calculates the trust index, creates the portfolio, and controls who is authorized to create the portfolio, and it is of course possible to achieve a similar effect by omitting some of the actions described above, or by performing different actions.

As used in this document, the term "module" includes a unit composed of hardware, software, or firmware, and may be used interchangeably with terms such as logic, logic block, component, or circuit. A "module" may be an integral part or a minimal unit or portion thereof that performs one or more functions. A "module" may be mechanically or electronically implemented and may include, for example, known or future application-specific integrated circuit (ASIC) chips, field-programmable gate arrays (FPGAs), or programmable logic devices that perform certain operations. At least a portion of the apparatus (e.g., modules or features thereof) or methods (e.g., operations) according to various embodiments may be implemented as instructions stored on a computer-readable storage medium (e.g., memory 130) in the form of program modules. When said instructions are executed by a processor (e.g., processor 120), the processor may perform functions corresponding to said instructions. The computer-readable recording medium may include a hard disk, a floppy disk, a magnetic medium (e.g., magnetic tape), an optical recording medium (e.g., CD-ROM, DVD), a magneto-optical medium (e.g., floppy disk), an internal memory, or the like. Instructions may include code that is generated by a compiler or code that may be executed by an interpreter. A module or program module according to various embodiments may include at least one or more of the aforementioned components, may omit some of them, or may further include other components. The operations performed by a module, program module, or other component, according to various embodiments, may be executed sequentially, in parallel, iteratively, or heuristically, or at least some of the operations may be executed in a different order, omitted, or other operations may be added.

The embodiments disclosed herein are presented for the purpose of illustration and understanding of the disclosed subject matter and are not intended to limit the scope of this disclosure. Accordingly, the scope of this disclosure should be construed to include all modifications or various other embodiments based on the technical ideas of this disclosure. [Claim Paraphrasing].

In accordance with various embodiments, a server for processing a request received from a user device and transmitting the requested information to said user device comprises a memory, and a processor operatively coupled to said memory, said processor being operatively coupled to said user device: displaying on a first region of a display of said user device a first text indicating a role name of a user account corresponding to said user device, and a second text indicating a modifier for said role name; and displaying on a second region located at a bottom of said first region of said display at least one of a number of cheers earned for said user account, a number of goals set by said user account, or a number of posts for said goals, and being set to execute instructions to cause a plurality of object regions representing at least one image of said post to be displayed on a third region located at the bottom of said second region of said display in a predetermined arrangement, wherein each of said plurality of object regions may correspond to a respective date within a particular time period.

In accordance with various embodiments, said processor may be further configured to execute instructions that cause said user device, upon displaying an image across said plurality of object regions within said third region, to display a particular date overlaid on the image corresponding to said particular date.

In accordance with various embodiments, said processor may be further configured to execute instructions that, when a portion of said plurality of object areas within said third region is disabled, cause said user device to display a particular date corresponding to said particular object area within a particular object area based on a particular criterion of said disabled portion of object areas.

In accordance with various embodiments, said processor may be further configured to execute instructions that cause said user device to change at least one of a display effect or size of a particular object region corresponding to said particular day based on a count of images for posts uploaded on said particular day.

In accordance with various embodiments, said processor may be further configured to execute instructions that cause said user device to display a thicker border of said particular object corresponding to said particular day, or to increase the size of a region of said particular object, as the number of images for posts uploaded on said particular day increases.

In accordance with various embodiments, said processor may be further configured to execute instructions that cause said user device to change the configuration and arrangement of said plurality of object regions based on settings of said user device, and to display said changed configuration and arrangement of said plurality of object regions on said third region.

In accordance with various embodiments, said processor may be further configured to execute instructions that cause said user device to display a plurality of representative images selected by said user account on a fourth region located between said second region and said third region of said display.

In accordance with various embodiments, said processor may be further configured to execute instructions that cause said user device to display, within said second area, a count of funds opened by said user account.

In accordance with various embodiments, said processor may be further configured to execute instructions to cause said user device to display a post creation screen comprising an object indicative of the degree of achievement of said first action goal or the degree of achievement of said second action goal for creating a particular post from said user account when a target number of completions of said first action goal or a target number of completions of said second action goal from said user account has been established.

In accordance with various embodiments, said processor may be further configured to execute instructions to cause said user device to display a pop-up screen for associating said particular post with other posts identified by said second action goal upon determining a selection of a first action goal and a second action goal for creating said particular post from said user account.

In accordance with various embodiments, said server further comprises a communication module, and said processor receives, via said communication module, said modifier and said role name from said user device, and determines a plurality of first action goals based on at least one keyword in said modifier, and determines at least one first action goal from said plurality of first action goals based on said number of said goals, said number of posts, and said number of total images for said posts, determining a plurality of secondary action goals based on said first specific action goal set by said user account, determining at least one secondary action goal from said plurality of secondary action goals based on said number of posts and images for said first specific action goal, and transmitting said at least one first action goal and said at least one secondary action goal to said user device via said communication module.

In accordance with various embodiments, said processor may be configured to, based on obtaining said role name: determine first modifier groups using at least one first keyword of said role name—said first modifier groups being prioritized based on said at least one first keyword; determine a plurality of first modifiers corresponding to each of said first modifier groups based on age information and gender information of said user account; and transmit said plurality of first modifiers to said user device via said communication module.

In accordance with various embodiments, said processor may be configured to, based on obtaining said modifier: determine a group of first role names using at least one second keyword of said modifier—said group of first role names being prioritized based on said at least one second keyword; determine a plurality of first role names corresponding to each of said group of first role names based on age information and gender information of said user account; and, via said communication module, transmit said plurality of first role names to said user device.

The invention claimed is:

1. A server that processes requests received from a user device and sends requested information to the user device, the server comprising:

a memory, and a processor operatively coupled to the memory, wherein the processor is configured to:

display on a first area of a display of the user device a first text indicating a role name of a user account corresponding to the user device, and a second text indicating a modifier for the role name, display at least one of a number of cheers earned for the user account, a number of goals set by the user account, or a number of posts to the goals on a second area located at a bottom of the first area of the display; and set to execute instructions to cause a plurality of objects areas representing at least one image of a post to be displayed on a third area of the display located at a bottom of the second area of the display according to a predetermined arrangement, wherein each of the plurality of object areas corresponds to a respective date within a particular time period.

2. The server of claim 1, wherein the processor is configured to:

when an image is displayed on all of the plurality of object areas within the third area, via the user device, display a specific date by overlaying on an image corresponding to the specific date.

3. The server of claim 1, wherein the processor is configured to:

when a portion of the plurality of object areas within the third area is deactivated, display, via the user device, a particular date corresponding to a particular object area within the particular object area based on a particular criterion among the deactivated portion of the plurality of object areas.

4. The server of claim 1, wherein the processor is configured to:

display, via the user device, by changing at least one of a display effect or a size of a particular object area corresponding to a particular date, based on a number of images for posts uploaded on the particular date.

5. The server of claim 4, wherein the processor is configured to: as a number of images for the posts uploaded through the user device on the particular date increases, a border of the particular object area corresponding to the particular date is displayed thickly, or the size of the particular object area is increased.

6. The server of claim 1, wherein the processor is configured to:

change, via the user device, a configuration and arrangement of the plurality of object areas according to settings on the user device, and display the plurality of object areas whose configuration and arrangement have been changed on the third area.

7. The server of claim 1, wherein the processor is configured to:

display, via the user device, a plurality of representative images selected by the user account on a fourth area located between the second area and the third area of the display.

8. The server of claim 1, wherein the processor is configured to:

display, via the user device, a number of fundings opened by the user account in the second area.

9. The server of claim 1, wherein the processor is configured to:

based on a goal completion number of a first practice goal or a goal completion number of a second practice goal of the user account, when a selection of the first practice goal or the second practice goal for creating a specific post from the user account is confirmed, display, via the user device, a post creation screen including an object indicating a degree of achievement of the first practice goal or a degree of achievement of the second practice goal.

10. The server of claim 1, wherein the processor is configured to:

when a selection of a first practice goal and a second practice goal for creating a specific post from the user account is confirmed, display, via the user device, a pop-up screen for associating the specific post with another post specified by the second practice goal.

11. The server of claim 1, further comprising a communication module, wherein the processor is configured to:

receive, via the communication module, the modifier and the role name from the user device, determine a plurality of first practice goals based on at least one keyword in the modifier, determine at least one first practice goal from the plurality of first practice goals, based on the number of the goals, the number of the posts, and a number of total images for the posts, determine a plurality of second practice goals based on a first specific practice goal set by the user account, determine at least one second practice goal from the plurality of second practice goals, based on a number of posts and images for the first specific practice goal; and transmit, via the communication module, the at least one first practice goal and the at least one second practice goal to the user device.

12. The server of claim 11, wherein the processor is configured to:

based on obtaining the role name:

determine a first group of modifiers using at least one first keyword of the role name, wherein the first group of modifiers is prioritized based on the at least one first keyword, determine a plurality of first modifiers corresponding to the first group of modifiers based on age information and gender information of the user account, transmit, via the communication module, the plurality of first modifiers to the user devices.

13. The server of claim 11, wherein the processor is configured to:

based on obtaining the modifier:

determine a first group of role names using at least one second keyword of the modifier, the first group of role names is prioritized based on the at least one second keyword:

determine a plurality of first role names corresponding to the first group of role names based on age information and gender information of the user account; and transmit, via the communication module, the plurality of first role names to the user device.

* * * * *